US006397273B2

United States Patent
Chilton

(12) United States Patent
(10) Patent No.: US 6,397,273 B2
(45) Date of Patent: *May 28, 2002

(54) SYSTEM HAVING AN ENHANCED PARITY MECHANISM IN A DATA ASSEMBLER/ DISASSEMBLER FOR USE IN A PIPELINE OF A HOST-STORAGE SYSTEM INTERFACE TO GLOBAL MEMORY

(75) Inventor: Kendell Alan Chilton, Marlboro, MA (US)

(73) Assignee: EMC Corporation, Hopkinton, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/213,139

(22) Filed: Dec. 18, 1998

(51) Int. Cl.[7] .................. G06F 13/38; G06F 11/10; G06F 11/16
(52) U.S. Cl. ............... 710/52; 711/131; 714/801
(58) Field of Search .................. 708/252, 532; 714/800, 801, 803, 804, 805; 710/52; 711/131

(56) References Cited

U.S. PATENT DOCUMENTS

| 5,355,379 A | * | 10/1994 | Hobson et al. ............. 714/808 |
| 5,608,891 A | * | 3/1997 | Mizuno et al. ............. 711/114 |
| 5,832,310 A | * | 11/1998 | Morrissey et al. ............. 710/71 |
| 5,890,219 A | * | 3/1999 | Scaringella et al. ......... 711/162 |
| 6,002,714 A | * | 12/1999 | Huscroft .................... 375/224 |

* cited by examiner

Primary Examiner—Thomas Lee
Assistant Examiner—Ilwoo Park
(74) Attorney, Agent, or Firm—Brian L. Michaelis; Brown, Rudnick, Freed & Gesmer

(57) ABSTRACT

An assembler/disassembler mechanism in a data transfer pipeline receives data from FIFOs on a write operation to a memory, and transfers data to FIFOs on a read operation from memory. An enhanced parity mechanism is implemented in the assembler/disassembler to generate a pseudo-random number for each data byte. Enhanced parity generated in another pipeline component and accompanying data transferred from the FIFO (on a write to memory) is exclusive-ORed with LFSR data generated by enhanced parity circuitry in the assembler/disassembler. Integral registers provide a pathway for a respective line processor to access the data string, and allow the processor to access the memory. A counter mechanism counts/controls the amount of data read into and out of the FIFOS. Setting the amount of data to be transferred in and out of the FIFOs, allows data transfer to effectively run independent of the line processor.

6 Claims, 38 Drawing Sheets

Table XVI 8100 030C [RW]: ADT Status/Upper & Lower Pointers
8100 070C [RW]: DMA0 Status/Upper & Lower Pointers
8100 0B0C [RW]: DMA1 Status/Upper & Lower Pointers
8100 0F0C [RW]: COPY Status/Upper & Lower Pointers

| 0 | | | | 4 | | | | 8 | | | | 12 | | | | 16 | | | | 20 | | | | 24 | | | | 28 | | | | |
|---|---|---|---|---|---|---|---|---|---|---|---|---|---|---|---|---|---|---|---|---|---|---|---|---|---|---|---|---|---|---|---|
| ERR | CTMS | ETNZ | UEC0 | UEC1 | MPE | RSVD | INITS | CC0 | CC1 | CC2 | CC3 | LEC0 | LEC1 | LEC2 | DMC | UP0 | UP1 | UP2 | UP3 | UP4 | UP5 | UP7 | LP0 | LP1 | LP2 | LP3 | LP4 | LP5 | LP6 | LP7 |
| 0 | 0 | 0 | 0 | 0 | 0 | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| RW | RW | RW | RW | RW | RW | | RW | RW | RW | RW | RW | RW | RW | RW | RW | RW | RW | RW | RW | RW | RW | RW | RW | RW | RW | RW | RW | RW | RW | RW |

Table XVI

| Mnemonic | Size | Description | Notes |
|---|---|---|---|
| ERR | 1b | 1=An Error Occurred during the transfer | |
| CTMS | 1b | 1=Count Miss occurred | |
| ETNZ | 1b | 1=Ending Transfer Count Not Zero error occurred | |
| UEC0-1 | 2b | Upper Error Codes | See table below |
| MPE | 1b | 1=Machine Parity Error occurred (CPU Parity Error / Internal Parity Error) | |
| INITS | 1b | 1=Global Memory reported Initial Status | |
| CC0-CC3 | 4b | Ending Global Memory Condition Codes | 0101=good status |
| LEC0-2 | 3b | Lower Error Codes | See table below |
| DMC | 1b | 1=DMA Operation Completed | |
| UP0-UP7 | 8b | Upper Machine DPR Pointer | |
| LP0-LP7 | 8b | Lower Machine DPR Pointer | |

M0/M1 Condition Codes:

| Condition Code | Meaning | Notes |
|---|---|---|
| 0101 (5) | Good Ending Status (No Errors) | |
| 1001 (9) | Protocol Error | |
| 1110 (E) | Count Miss | |
| 1000 (8) | R/W Mismatch | |
| 1010 (A) | Multi-bit Error | |
| 0011 (3) | Single-bit Error | |
| 0111 (7) | Memory Internal Error | |
| 1101 (D) | More Than One Ending Status Error | |

Upper Error Codes:

| Code | Meaning |
|---|---|
| 00 (0) | No Upper Machine Hardware Errors |
| 01 (1) | Short Timeout Occurred |
| 10 (2) | Long Timeout Occurred |
| 11 (3) | Lock Timeout or Upper Machine Command Parity Error Occurred |

Lower Error Codes:

| Code | Meaning |
|---|---|
| 000 (0) | No Lower Machine Hardware Errors |
| 001 (1) | Single-Bit ECAC Error Detected |
| 010 (2) | Reserved |
| 011 (3) | Multi-Bit EDAC Error Detected |
| 100 (4) | Parity Error detected on SDIO bus |
| 101 (5) | Reserved |
| 110 (6) | Illegal Lower Machine/ASMD Transfer Size Detected |
| 111 (7) | ASMD Lower Machine Command Parity Error |

ESCON FRONT END
(PRIOR ART)

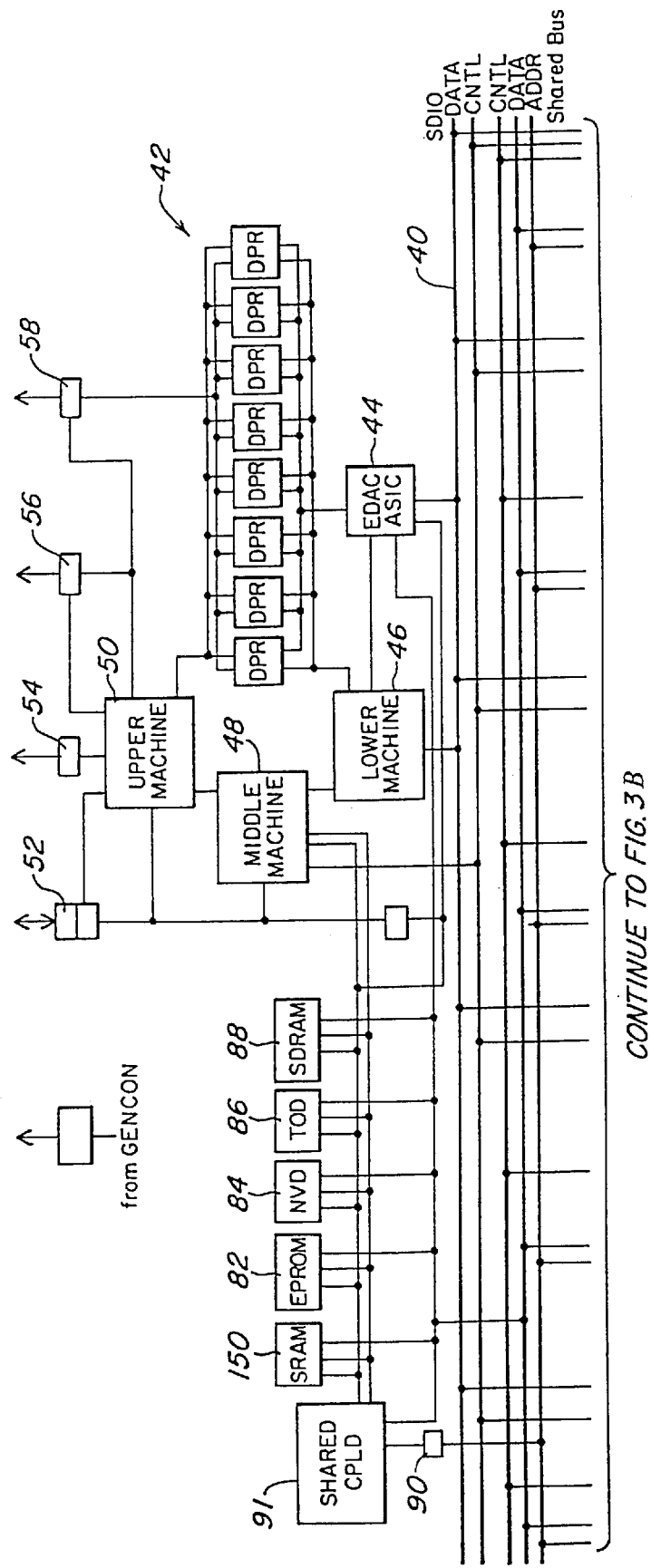

|   | 0 | 7 | 8 | 15 |
|---|---|---|---|---|
| 0 | Data Adr | | | DSLT |
| 1 | Data Len | | | |
| 2 | Fstatus | | SCRC | |
| 3 | Dest Link Addr | | 0000 | Dest Log Adr |
| 4 | Src Link Addr | | 0000 | Src Log Adr |
| 5 | Link Control | | IFI | |
| 6 | Device Adr 0 | | Device Adr 1 | |
| 7 | DHF | | XX | |

Device Frame Header Structure

FIG. 4C

|   | 0 | 7 | 8 | 15 |
|---|---|---|---|---|
| 0 | Data Adr | | | DSLT |
| 1 | Data Len | | | |
| 2 | Fstatus | | XX | |
| 3 | Dest Link Addr | | 0000 | Dest Log Adr |
| 4 | Src Link Addr | | 0000 | Src Log Adr |
| 5 | Link Control | | XX | |

Link Frame Header Structure

FIG. 4D

Store Allocation Map.

| | 0 | | 7 |
|---|---|---|---|
| 0 | Dest Link Addr | | |
| 1 | 0000 | Dest Log Adr | |
| 2 | Src Link Addr | | |
| 3 | 0000 | Src Log Adr | |
| 4 | Link Control | | |
| | DIB (Here or FIFO) · · · | | |

Link Frame Header Structure.

*FIG. 5C*

| | 0 | | 7 |
|---|---|---|---|
| 0 | Dest Link Addr | | |
| 1 | 0000 | Dest Log Adr | |
| 2 | Src Link Addr | | |
| 3 | 0000 | Src Log Adr | |
| 4 | Link Control | | |
| 5 | IFI | | |
| 6 | Device Adr 0 | | |
| 7 | Device Adr 1 | | |
| 8 | DHF | | |
| | DIB (Here or FIFO) · · · | | |

Device Frame Header Structure

*FIG. 5D*

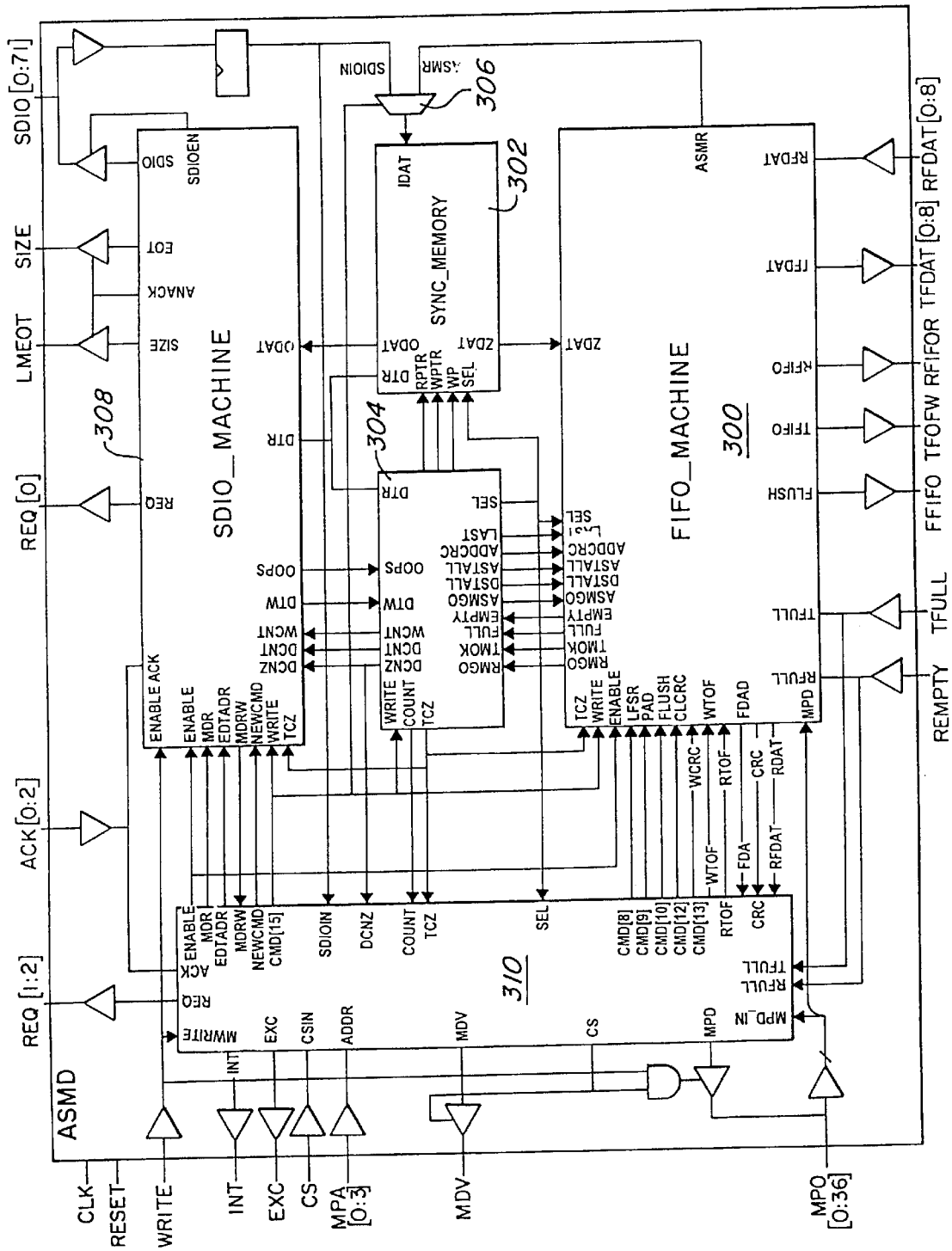

A diagram indicating how the Upper and Lower pointers would progress for a Global Memory read operation.

Table I

| Mnemonic | Size | Description |
|---|---|---|
| Data Adr | 16b | FrameStore Location of data (DIB) portion of frame. If Data Addr=0x0000, DIB is in G-FIFO. |
| DSLT | 3b | DSLT is actually the 3 low-order bits of Data Addr. If DSLT=0x0, the DIB is in G-FIFO. If DSLT=0x1 thru 0x7, the DIB is in the corresponding FrameStore slot. |
| Data Len | 11b | Length of data (DIB) portion of frame. Does not include frame header or Escon CRC. |
| Fstatus | 8b | <table><tr><td>0</td><td>3</td><td>4</td><td>5</td><td>6</td><td>7</td></tr><tr><td colspan="2">ERROR</td><td>Full</td><td>0</td><td>EOF</td><td>SOF</td></tr></table> ERROR:<br>0000 = No Error<br>0001 = CRC Error<br>0010 = Control character received in frame<br>0011 = Invalid character received in frame<br>0100 = Maximum size of frame exceeded<br>0101 = Frame reception ended by 2 IDLE characters<br>0110 = Frame reception ended by ABORT delimiter<br>0111 = Frame reception ended by Invalid EOF delimiter<br>*The following errors cause Frame Reception to stop*<br>1000 = Frame reception ended by LOS detection<br>1001 = Frame reception ended by Sequence detection<br>1010 = Frame reception by SOF delimiter<br>1100 = Frame reception ended by G-FIFO overflow<br>Full: 1=This frame caused the FrameStore header section to become Full.<br>EOF: 0=PEOF detected; 1=DEOF detected<br>SOF: 0=PSOF detected; 1=CSOF detected |
| SCRC | 8b | CRC covering DIB of received frame. Only valid for Device-frames independent of Whether the DIB goes to FrameStore or G-FIFO. |

FIG. 18

Table II 8100 0320 [WO] : ESCON Receiver Control Register

| 0 | | | | 4 | | | | 8 | | | | 12 | | | | 16 | | | | 20 | | | | 24 | | | | 28 | | | | |
|---|---|---|---|---|---|---|---|---|---|---|---|---|---|---|---|---|---|---|---|---|---|---|---|---|---|---|---|---|---|---|---|
| CMC | RSVD | RSVD | RSVD | FSt | CBER | RSVD | RSVD | EnG | G | RSVD | RSVD | RSVD | RSVD | RSVD | RSVD | RSVD | RSVD | RSVD | RSVD | RSVD | RSVD | RSVD | RSVD | EnBx | RSVD | RSVD | RSVD | BINDX | BINDX | BINDX | BINDX |
| 0 | | | | 0 | 0 | | | 0 | 0 | | | | | | | | | | | | | | | 0 | | | | 0 | 0 | 0 | 0 |
| w | | | | w | w | | | w | w | | | | | | | | | | | | | | | w | | | | w | w | w | w |

| Mnemonic | Size | Description |
|---|---|---|
| CMC | 1b | 1=Clear Machine Check conditions |
| FSt | 1b | 1=Enable Frame Reception (Clear STOPPED) Interrupt and conditions) |
| CBER | 1b | 1=Clear BER Condition |
| EnG | 1b | 1=Enable loading G bit |
| G | 1b | 1=Put next incoming frame into G-FIFO<br>0=Put next incoming frame into FrameStore |
| EnBx | 1b | 1=Enable loading BINDX |
| BINDX | 5b | Boundary Index (written only when EnBx = 1) |

Notes

*FIG. 19*

Table III 8100 0320 [RO] : ESCON Receiver Status Register

| 0 | | | | 4 | | | | 8 | | | | 12 | | | | 16 | | | | 20 | | | | 24 | | | | 28 | | | |
|---|---|---|---|---|---|---|---|---|---|---|---|---|---|---|---|---|---|---|---|---|---|---|---|---|---|---|---|---|---|---|---|
| DPE | SQI | FRI | STP | GF | FOVF | GOVF | ABN | FULL | G | BSY | FRM | SEQ | SEQ | SEQ | SEQ | SEQ | LOS | RSVD | RSVD | RSVD | WINDX | WINDX | WINDX | WINDX | WINDX | RSVD | BINDX | BINDX | BINDX | BINDX | BINDX |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| R | R | R | R | R | R | R | R | R | R | R | R | R | R | R | R | R | R | R | R | R | R | R | R | R | R | R | R | R | R | R | R |

| Mnemonic | Size | Description | Notes |
|---|---|---|---|
| DPE | 1b | 1=CPU Data Parity Error on Write (Cleared when RcvCtl/CMC is asserted | UGLY |
| SQI | 1b | 1=Sequence interrupt status (Cleared immediately after RcvStat register is read) | GOOD |
| FRI | 1b | 1=Frame interrupt status (Cleared immediately after RcvStat register is read) | GOOD |
| STP | 1b | 1=Stopped interrupt status | BAD |
| GF | 1b | 1=Receiver G-FIFO Full. This bit is "live" status of the 'Full' flag. | |
| FOVF | 1b | 1=Overflow condition detected on FrameStore (causes STP to assert) | BAD |
| GOVF | 1b | 1=Overflow condition detected on G-FIFO (causes STP to assert) | BAD |
| ABN | 1b | 1=Abnormal condition detected (causes STP to assert) | BAD |
| FULL | 1b | 1=FrameStore full. No more frames allowed in FrameStore or G-FIFO because header section of FrameStore is full as defined by BINDX (Cleared on writing RcvCtl/BINDX) | |
| G | 1b | G-bit status | |
| BSY | 1b | 1=Receiver Framestore Busy Error | BAD |
| FRM | 1b | 1=Frame was received | GOOD |
| SEQ | 5b | Sequence being received on the link:<br>1xxxx : Rsvd_Seq<br>x1xxx : IDLE<br>00100 : NOS<br>00101 : UD<br>00110 : UDR<br>00111 : OFL | GOOD |
| | | | (Cleared immediately after RcvStat register is read) |
| LOS | 1b | 1=LossOfSync (LOS) Detected | |
| WINDX | 5b | Slot number for NEXT received frame | |
| BINDX | 5b | Current Boundary Slot number | |

*FIG. 20*

Table IV 8100 0324 [RW] : ESCON Receiver Mask-Miscellaneous Register

| 0 | | | | 4 | | | | 8 | | | | 12 | | | | 16 | | | | 20 | | | | 24 | | | | 28 | | | |
|---|---|---|---|---|---|---|---|---|---|---|---|---|---|---|---|---|---|---|---|---|---|---|---|---|---|---|---|---|---|---|---|
| StpEn | LoSEn | RsqEn | IdlEn | VsqEn | FrmEn | RSVD | RSVD | RSVD | RSVD | RSVD | RSVD | RSVD | RSVD | RSVD | RSVD | HLB | EnDisp | Busy | BER | RSVD | RSVD | RSVD | RSVD | MajR | MajR | MajR | MajR | MinR | MinR | MinR | MinR |
| 0 | 0 | 0 | 0 | 0 | 0 | | | | | | | | | | | 0 | 0 | 0 | 0 | | | | | 0 | 0 | 0 | 0 | 0 | 0 | 0 | 0 |
| RW | RW | RW | RW | RW | RW | R | R | R | R | R | R | R | R | R | R | RW | RW | RW | RW | R | R | R | R | R | R | R | R | R | R | R | R |

| Mnemonic | Size | Description | Notes |
|---|---|---|---|
| StpEn | 1b | 1=Enable Stop Interrupt | |
| LoSEn | 1b | 1=Enable LOS Interrupt | |
| RsqEn | 1b | 1=Enable Rsq interrupt | |
| IdlEn | 1b | 1=Enable Idle interrupt | |
| VsqEn | 1b | 1=Enable VSQ interrupt | |
| FrmEn | 1b | 1=Enable Frame interrupt | |
| HLB | 1b | Enable Hotlink Loopback: 1=Receive data from Hotlink Transmitter 0=Receive data from Optical Link | |
| EnDisp | 1b | 1=Enable G-FIFO disparity generator | |
| Busy | 1b | 1=Software is busy. Instruct hardware to return Link-Busy for connection frames. | |
| BER | 1b | 1=Bit-error Violation detected. | Software must write '1' to clear this bit. |
| MajR | 4b | Major Revision of RCVR LCA | Read-Only |
| MinR | 4b | Minor Revision of RCVR LCA | Read-Only |

FIG. 21

Table V 8100 0328 [RW] : ESCON Receive Diagnostic Register

| 0 | | | | 4 | | | | 8 | | | | 12 | | | | 16 | | | | 20 | | | | 24 | | | | 28 | | | |
|---|---|---|---|---|---|---|---|---|---|---|---|---|---|---|---|---|---|---|---|---|---|---|---|---|---|---|---|---|---|---|---|
| RSVD | RSVD | RSVD | RSVD | RSVD | RSVD | RSVD | RSVD | RSVD | RSVD | RSVD | RSVD | RSVD | RSVD | RSVD | RSVD | RSVD | RSVD | RSVD | RSVD | RSVD | RSVD | RSVD | RSVD | WrBOF | BOFD | BOFD | BOFD | BOFD | BOFD | BOFD | BOFD |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| R | R | R | R | R | R | R | R | R | R | R | R | R | R | R | R | R | R | R | R | R | R | R | R | W | RW | RW | RW | RW | RW | RW | RW |

| Mnemonic | Size | Description | Notes |
|---|---|---|---|
| WrBOF | 1b | 1=Execute write operation to incoming G-FIFO | Write-Only |
| BOFD | 8b | Data byte to be written to incoming G-FIFO. Initializes to 00h when RCVR is reset. | |

*FIG. 22*

Table VI 8100 0340 [RW] : ESCON Transmitter Frame Register

| 0 | | | | 4 | | | | 8 | | | | 12 | | | | 16 | | | | 20 | | | | 24 | | | | 28 | | | |
|---|---|---|---|---|---|---|---|---|---|---|---|---|---|---|---|---|---|---|---|---|---|---|---|---|---|---|---|---|---|---|---|
| TxSt | G | HLOC | HLOC | DELIM | DELIM | EnP | RSVD | RSVD | RSVD | RSVD | RSVD | RSVD | RSVD | RSVD | RSVD | RSVD | RSVD | RSVD | RSVD | RSVD | FrLen | FrLen | FrLen | FrLen | FrLen | FrLen | FrLen | FrLen | FrLen | FrLen | FrLen |
| 0 | 0 | 0 | 0 | 0 | 0 | 0 | | | | | | | | | | | | | | | 0 | 0 | 0 | 0 | 0 | 0 | 0 | 0 | 0 | 0 | 0 |
| W | RW | RW | RW | RW | RW | RW | RW | RW | RW | RW | RW | RW | RW | RW | RW | RW | RW | RW | RW | RW | RW | RW | RW | RW | RW | RW | RW | RW | RW | RW | RW |

| Mnemonic | Size | Description | Notes |
|---|---|---|---|
| TxSt | 1b | 1=Start frame transmission | Write-Only |
| G | 1b | Location of Frame DIB:<br>0=DIB in Frame Store<br>1=DIB in G-FIFO | Link frames should have bit clear; Device frames can have either clear/set |
| HLOC | 2b | Location of Frame Header | |
| DELIM | 2b | Frame Delimiters:<br>00=PSOF,PEOF<br>01=CSOF,PEOF<br>10=PSOF,DEOF<br>11=Not Defined | |
| EnP | 1b | 1=Enable Pacing (pacing bytes are appended to end of this frame) | |
| FrLen | 11b | Frame Length (Header + DIB) | |

*FIG. 23*

Table VII 8100 0344 [WO] : ESCON Transmitter Control Register

| CMC | RSVD | CFE | FSEn | FEEn | CCRC | FXP | RSVD | RSVD | RSVD | RSVD | RSVD | RSVD | RSVD | RSVD | RSVD | RSVD | RSVD | RSVD | RSVD | RSVD | RSVD | RSVD | RSVD | RSVD | RSVD | RSVD | RSVD | RSVD |
|---|---|---|---|---|---|---|---|---|---|---|---|---|---|---|---|---|---|---|---|---|---|---|---|---|---|---|---|---|
| 0 |  | 0 | 0 | 0 | 0 | 0 |  |  |  |  |  |  |  |  |  |  |  |  |  |  |  |  |  |  |  |  |  |  |
| W |  | W | W | W | W | W |  |  |  |  |  |  |  |  |  |  |  |  |  |  |  |  |  |  |  |  |  |  |

0    4    8    12    16    20    24    28

| Mnemonic | Size | Description | Notes |
|---|---|---|---|
| CMC  | 1b | 1=Clear Machine Check conditions | |
| CFE  | 1b | 1=Clear Frame-Error interrupt and conditions | |
| FSEn | 1b | 1=Enable Frame-Sent interrupt | |
| FEEn | 1b | 1=Enable Frame-Error interrupt | |
| CCRC | 1b | 1=Clear the Xmit G-FIFO Symmetrix CRC | |
| FXP  | 1b | 1=Flush the entire Xmit pipeline | |

FIG. 24

Table VIII 8100 0344 [RO] : ESCON Transmitter Status Register

| 0 | | | | 4 | | | | 8 | | | | 12 | | | | 16 | | | | 20 | | | | 24 | | | | 28 | | | |
|---|---|---|---|---|---|---|---|---|---|---|---|---|---|---|---|---|---|---|---|---|---|---|---|---|---|---|---|---|---|---|---|
| DPE | FS | FE | FSEn | FEEn | GMT | OVF | GPE | FPE | IW | IRQ | XPF | XPE | GE | BSY | RSVD | GCRC | GCRC | GCRC | GCRC | GCRC | GCRC | GCRC | GCRC | MajR | MajR | MajR | MajR | MinR | MinR | MinR | MinR |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| R | R | R | R | R | R | R | R | R | R | R | R | R | R | R | R | R | R | R | R | R | R | R | R | R | R | R | R | R | R | R | R |

| Mnemonic | Size | Description | Notes |
|---|---|---|---|
| DPE | 1b | 1=CPU Data Parity Error on White (Cleared when XmtCtl/CMC is asserted) | UGLY |
| FS | 1b | Frame-Sent status | GOOD |
| FE | 1b | Frame-Error status | BAD |
| FSEn | 1b | 1=Frame-Sent interrupt enabled | |
| FEEn | 1b | 1=Frame-Error interrupt enabled | |
| GMT | 1b | 1=Xmit G-FIFO Empty (while sending frame) | BAD |
| OVF | 1b | 1=Frame Overflow (Frame > 1035 bytes) | BAD |
| GPE | 1b | 1=Xmit G-FIFO Parity Error | BAD |
| FPE | 1b | 1=Xmit FrameStore Parity Error | BAD |
| IW | 1b | 1=Illegal Write | BAD |
| IRQ | 1b | 1=Illegal Request | BAD |
| XPF | 1b | 1=Xmit Pipe Full | |
| XPE | 1b | 1=Xmit Pipe Empty | |
| GE | 1b | 1=Xmit G-FIFO Empty | live status/empty flag |
| BSY | 1b | 1=Xmit Framestore Busy Error | BAD |
| GCRC | 8b | Xmit G-FIFO Symmetrix CRC | |
| MajR | 4b | Major Revision of XMIT LCA | |
| MinR | 4b | Minor Revision of XMIT LCA | |

*FIG. 25*

Table IX 8100 0348 [RW] : ESCON Transmitter Pacing-Loop-Sequence Register

| 0 | | | | 4 | | | | 8 | | | | 12 | | | | 16 | | | | 20 | | | | 24 | | | | 28 | | | |
|---|---|---|---|---|---|---|---|---|---|---|---|---|---|---|---|---|---|---|---|---|---|---|---|---|---|---|---|---|---|---|---|
| SEQ | SEQ | SEQ | SEQ | SDO | TXEN | EnDisp | RSVD | Pace | Pace | Pace | Pace | Pace | Pace | Pace | Pace | BIST | SVS | RSVD | RSVD | RSVD | RSVD | RSVD | RSVD | BLC | BLC | BLC | BLC | BLC | BLC | BLC | BLC |
| 0 | 0 | 0 | 0 | 0 | 0 | 0 | | 0 | 0 | 0 | 0 | 0 | 0 | 0 | 0 | 0 | 0 | | | | | | | 0 | 0 | 0 | 0 | 0 | 0 | 0 | 0 |
| RW | RW | RW | RW | RW | RW | RW | RW | RW | RW | RW | RW | RW | RW | RW | RW | RW | RW | RW | RW | RW | RW | RW | RW | RW | RW | RW | RW | RW | RW | RW | RW |

| Mnemonic | Size | Description | Notes |
|---|---|---|---|
| SEQ | 4b | Sequence Identifier<br>1111 : Offline<br>1001 : Not Operational<br>1011 : UD<br>1101 : UDR<br>xxx0 : Idle<br>0xx1 : Reserved | |
| SDO | 1b | 1=Enable Pseudo Frame condition | |
| TXEN | 1b | 0=Enable Fiber-Optic Transmitter | Active-Low |
| EnDisp | 1b | 1=Enable Xmit G-FIFO disparity checker | |
| Pace | 8b | Pacing Count – 1's complement | |
| BIST | 1b | 0=Enable Hotlink Built-In Self-Test (diagnostic) | not yet implemented |
| SVS | 1b | 1=Send Violation Sequence (diagnostic) | not yet implemented |
| BLC | 8b | BIST Loop Counter (diagnostic) | not yet implemented |

*FIG. 26*

Table X 8100 034C [RO] : ESCON Transmitter Bottom-Of-FIFO Register

| 0 | | | | | 4 | | | | 8 | | | | 12 | | | | 16 | | | | 20 | | | | 24 | | | | 28 | | |
|---|---|---|---|---|---|---|---|---|---|---|---|---|---|---|---|---|---|---|---|---|---|---|---|---|---|---|---|---|---|---|---|
| RSVD | RSVD | RSVD | RSVD | RSVD | RSVD | RSVD | RSVD | RSVD | RSVD | RSVD | RSVD | RSVD | RSVD | RSVD | RSVD | RSVD | RSVD | RSVD | RSVD | RSVD | RSVD | RSVD | RSVD | BOFD | BOFD | BOFD | BOFD | BOFD | BOFD | BOFD | BOFD |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| R | R | R | R | R | R | R | R | R | R | R | R | R | R | R | R | R | R | R | R | R | R | R | R | R | R | R | R | R | R | R | R |

| Mnemonic | Size | Description | Notes |
|---|---|---|---|
| BOFD | 8b | Data byte read from outgoing G-FIFO | Read-Only |

*FIG. 27*

Table XI 8100 0310 [RW]: Assembler / Disassembler Command Register

| 0 | | | | | 4 | | | 8 | | | | | | | | 12 | | | | | | | | 16 | | | | | | | | 20 | | | | | | | | 24 | | | | | | | | 28 | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| EnXfr | DIR | EnDSP | wCRC | FF | RSVD | RSVD | PAD | Acrc0 | Acrc1 | Acrc2 | Acrc3 | Acrc4 | Acrc5 | Acrc6 | Acrc7 | XC0 | XC1 | XC2 | XC3 | XC4 | XC5 | XC6 | XC7 | XC8 | XC9 | XC10 | XC11 | XC12 | XC13 | XC14 | XC15 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| RW | RW | RW | RW | RW | R | R | RW | RW | RW | RW | RW | RW | RW | RW | RW | RW | RW | RW | RW | RW | RW | RW | RW | RW | RW | RW | RW | RW | RW | RW | RW |

| Mnemonic | Size | Description | Notes |
|---|---|---|---|
| EnXfr | 1b | 1=Enable Transfer | |
| Dir | 1b | 1=Write (line to DPR) 0=Read (DPR to Line) | |
| EnDSP | 1b | 1=Enable disparity generator | |
| wCRC | 1b | 1=Enable appending CRC to end of data | |
| FF | 1b | 1=Flush FIFO | |
| PAD | 1b | 1=Enable 0 padding through ADT pipe | |
| Acrc0-Acrc7 | 8b | Accumulated CRC for current transfer | |
| XC0-XC15 | 16b | Number of bytes to transfer | Readback gives # of bytes remaining to transfer |

*FIG. 28*

Table XII 8100 0314 [RW] : Assembler / Disassembler Status Register

| 0 | | | | 4 | | | 8 | | | | 12 | | | 16 | | | | 20 | | | | 24 | | | | 28 | | | |
|---|---|---|---|---|---|---|---|---|---|---|---|---|---|---|---|---|---|---|---|---|---|---|---|---|---|---|---|---|---|
| CC | Idle | REQ | CRCnz | RxFnE | TxFF | RSVD | PAD | XPErr | PDErr | PAErr | PRErr | RSVD | RSVD | RSVD | MajR | MajR | MajR | MajR | MajR | MajR | MajR | MajR | MinR | MinR | MinR | MinR | MinR | MinR | MinR | MinR |
| 0 | 1 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 |
| RW | R | R | R | R | R | R | RW | RW | RW | RW | RW | R | R | R | R | R | R | R | R | R | R | R | R | R | R | R | R | R | R | R |

| Mnemonic | Size | Description | Notes |
|---|---|---|---|
| CC | 1b | 1=Machine is Idle | |
| REQ | 1b | 1=ADT Request Outstanding to Middle Machine | *H/W diagnostic use* |
| PFErr | 1b | 1=Parity Error in SCSI transfer | BAD |
| Pderr | 1b | 1=Processor Data Bus Parity Error detected | BAD |
| Paerr | 1b | 1=Processor Address Bus Parity Error Detected | BAD |
| CRCErr | 1b | 1=CRC not zero | |
| Acrc0-Acrc7 | 8b | Accumulated CRC for current transfer | |
| CC0-CC15 | 16b | Current transfer count | |

Table XIII

| 8100 0300 | [RW]: | ADT Primary Address Pointer |
| 8100 0700 | [RW]: | DMA0 Primary Address Pointer |
| 8100 0B00 | [RW]: | DMA1 Primary Address Pointer |
| 8100 0F00 | [RW]: | COPY Primary Address Pointer |

| 0 | | | | 4 | | | | 8 | | | | 12 | | | | 16 | | | | 20 | | | | 24 | | | | 28 | | | | |
|---|---|---|---|---|---|---|---|---|---|---|---|---|---|---|---|---|---|---|---|---|---|---|---|---|---|---|---|---|---|---|---|
| AD0 | AD1 | AD2 | AD3 | AD4 | AD5 | AD6 | AD7 | AD8 | AD9 | AD10 | AD11 | AD12 | AD13 | AD14 | AD15 | AD16 | AD17 | AD18 | AD19 | AD20 | AD21 | AD22 | AD23 | AD24 | AD25 | AD26 | AD27 | AD28 | AD29 | AD30 | AD31 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| RW | RW | RW | RW | RW | RW | RW | RW | RW | RW | RW | RW | RW | RW | RW | RW | RW | RW | RW | RW | RW | RW | RW | RW | RW | RW | RW | RW | RW | RW | RW | RW |

| Mnemonic | Size | Description |
|---|---|---|
| AD0-AD31 | 32b | Primary Global Memory Dword Address, or Source Address for COPY operation |

Notes

FIG. 31

Table XIV

| 8100 0304 | [RW]: | ADT Mirror / Copy Address Pointer |
| 8100 0704 | [RW]: | DMA0 Mirror / Copy Address Pointer |
| 8100 0B04 | [RW]: | DMA1 Mirror / Copy Address Pointer |
| 8100 0F04 | [RW]: | COPY Mirror / Copy Address Pointer |

| 0 | | | | 4 | | | | 8 | | | | 12 | | | | 16 | | | | 20 | | | | 24 | | | | 28 | | | | |
|---|---|---|---|---|---|---|---|---|---|---|---|---|---|---|---|---|---|---|---|---|---|---|---|---|---|---|---|---|---|---|---|
| AD0 | AD1 | AD2 | AD3 | AD4 | AD5 | AD6 | AD7 | AD8 | AD9 | AD10 | AD11 | AD12 | AD13 | AD14 | AD15 | AD16 | AD17 | AD18 | AD19 | AD20 | AD21 | AD22 | AD23 | AD24 | AD25 | AD26 | AD27 | AD28 | AD29 | AD30 | AD31 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| RW | RW | RW | RW | RW | RW | RW | RW | RW | RW | RW | RW | RW | RW | RW | RW | RW | RW | RW | RW | RW | RW | RW | RW | RW | RW | RW | RW | RW | RW | RW | RW |

| Mnemonic | Size | Description |
|---|---|---|
| AD0-AD31 | 32b | Mirror Global Memory Dword Address for Mirror Write Operations, or Destination Address for COPY operation |

Notes

FIG. 32

Table XV 8100 0308 [RW]: ADT Command & Transfer Length Register
8100 0708 [RW]: DMA0 Command & Transfer Length Register
8100 0B08 [RW]: DMA1 Command & Transfer Length Register
8100 0F08 [RW]: COPY Command & Transfer Length Register

| 0 | | | | 4 | | | | 8 | | | | 12 | | | | 16 | | | | 20 | | | | 24 | | | | 28 | | | |
|---|---|---|---|---|---|---|---|---|---|---|---|---|---|---|---|---|---|---|---|---|---|---|---|---|---|---|---|---|---|---|---|
| RSVD | TL0 | TL1 | TL2 | TL3 | TL4 | TL5 | TL6 | TL7 | TL8 | TL9 | TL10 | TL11 | TL12 | TL13 | RSVD | RSVD | MIR | COPY | FP | IEC | FE | EOT | RSVD | RW | XOR | SVC | LOCK | RSVD | SPAR | EC | |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | |
| RW | RW | RW | RW | RW | RW | RW | RW | RW | RW | RW | RW | RW | RW | RW | RW | RW | RW | RW | RW | RW | RW | RW | RW | RW | RW | RW | RW | RW | RW | RW | |

| Mnemonic | Size | Description | Notes |
|---|---|---|---|
| TL0-TL13 | 14b | Number of Dwords to read or write | |
| MIR | 1b | 1=Mirror all Global Memory writes to the Mirror Address given in the Mirror Address Pointer | RW must be set; SVC&MIR are illegal; XOR may be used |
| COPY | 1b | 1=Perform a true DMA operation; Reads occur from the Primary Address Pointer, Writes are destined for the Copy Address Pointer; Transfer length is given by TL0-13. | Must be set to '1' |
| FP | 1b | Middle Machine First Pass internal arbiter bit | Must be set to '1' |
| IEC | 1b | Middle Machine Internal Enable Channel | |
| FE | 1b | 1=Fatal Error Occurred During Transfer | When Read |
| EOT | 1b | 1=End Of Transfer has occurred | When Written |
| | | 1=Force End Of Transfer protocol in Middle Machine | |
| RW | 1b | 1=Read<br>0=Write | |
| XOR | 1b | 1=XOR the new data with the current data in Global Memory, then store the result in Global Memory | Only valid for Writes with or without Mirror |
| SVC | 1b | 1=Backplane cycles will be initiated as Service Cycles | |
| LOCK | 1b | 1=Lock Memory | |
| RSVD | 1b | Reserved Command bit | Mustbe set to '0' |
| SPAR | 1b | Backplane SPARE bit | Must be set to '0' |
| EC | 1b | 1=Enable Channel<br>0=Disable Channel | An interrupt will be generated after the Middle Machine completes current pass |

Table XVI 8100 030C [RW]: ADT Status/Upper & Lower Pointers
8100 070C [RW]: DMA0 Status/Upper & Lower Pointers
8100 0B0C [RW]: DMA1 Status/Upper & Lower Pointers
8100 0F0C [RW]: COPY Status/Upper & Lower Pointers

| 0 | | | | 4 | | | | 8 | | | | 12 | | | | 16 | | | | 20 | | | | 24 | | | | 28 | | | |
|---|---|---|---|---|---|---|---|---|---|---|---|---|---|---|---|---|---|---|---|---|---|---|---|---|---|---|---|---|---|---|
| ERR | CTMS | ETNZ | UEC0 | UEC1 | MPE | RSVD | INITS | CC0 | CC1 | CC2 | CC3 | LEC0 | LEC1 | LEC2 | DMC | UP0 | UP1 | UP2 | UP3 | UP4 | UP5 | UP6 | UP7 | LP0 | LP1 | LP2 | LP3 | LP4 | LP5 | LP6 | LP7 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| RW | RW | RW | RW | RW | RW | | RW | RW | RW | RW | RW | RW | RW | RW | RW | RW | RW | RW | RW | RW | RW | RW | RW | RW | RW | RW | RW | RW | RW | RW | RW |

FIG. 33
PART I

Table XVI

| Mnemonic | Size | Description | Notes |
|---|---|---|---|
| ERR | 1b | 1=An Error Occurred during the transfer | |
| CTMS | 1b | 1=Count Miss occurred | |
| ETNZ | 1b | 1=Ending Transfer Count Not Zero error occurred | |
| UECO-1 | 2b | Upper Error Codes | See table below |
| MPE | 1b | 1=Machine Parity Error occurred (CPU Parity Error / Internal Parity Error) | |
| INITS | 1b | 1=Global Memory reported Initial Status | |
| CC0-CC3 | 4b | Ending Global Memory Condition Codes | 0101=good status |
| LEC0-2 | 3b | Lower Error Codes | See table below |
| DMC | 1b | 1=DMA Operation Completed | |
| UP0-UP7 | 8b | Upper Machine DPR Pointer | |
| LP0-LP7 | 8b | Lower Machine DPR Pointer | |

*M0/M1 Condition Codes:*

| Condition Code | Meaning | Notes |
|---|---|---|
| 0101 (5) | Good Ending Status (No Errors) | |
| 1001 (9) | Protocol Error | |
| 1110 (E) | Count Miss | |
| 1000 (8) | R/W Mismatch | |
| 1010 (A) | Multi-bit Error | |
| 0011 (3) | Single-bit Error | |
| 0111 (7) | Memory Internal Error | |
| 1101 (D) | More Than One Ending Status Error | |

*Upper Error Codes:*

| Code | Meaning |
|---|---|
| 00 (0) | No Upper Machine Hardware Errors |
| 01 (1) | Short Timeout Occurred |
| 10 (2) | Long Timeout Occurred |
| 11 (3) | Lock Timeout or Upper Machine Command Parity Error Occurred |

*Lower Error Codes:*

| Code | Meaning |
|---|---|
| 000 (0) | No Lower Machine Hardware Errors |
| 001 (1) | Single-Bit ECAC Error Detected |
| 010 (2) | Reserved |
| 011 (3) | Multi-Bit EDAC Error Detected |
| 100 (4) | Parity Error detected on SDIO bus |
| 101 (5) | Reserved |
| 110 (6) | Illegal Lower Machine/ASMD Transfer Size Detected |
| 111 (7) | ASMD Lower Machine Command Parity Error |

*FIG. 33*
PART II

SYSTEM HAVING AN ENHANCED PARITY MECHANISM IN A DATA ASSEMBLER/ DISASSEMBLER FOR USE IN A PIPELINE OF A HOST-STORAGE SYSTEM INTERFACE TO GLOBAL MEMORY

FIELD OF THE INVENTION

The present invention relates to storage devices, and more particularly to adapters for interfacing a storage device to a host for high speed, high reliability and high availability data storage.

BACKGROUND OF INVENTION

Various interfaces are known for interconnecting host computer systems to storage systems, such as disk drive mass storage systems. Particular interfaces involve respective particular data transfer protocols and system interconnections. The IBM Enterprise System Connection Architecture (ESCON) is a flexible interface or interconnection environment that is used to move data from a host source to storage and back. ESCON, as it is known in the art, combines technology and architecture to include fiber optic cabling for transmission and reception of data. ESCON implements dynamic connectivity through switched point to point topology and data flow interconnectivity with other networks. The ESCON I/O architecture exploits the fiber optic technology implementation and the concept of dynamic connectivity in providing a flexible, extensible interface.

The ESCON architecture has become a widely accepted standard for data communications in large scale computer environments, replacing the more traditional IBM "Bus and Tag" protocol. ESCON employs serially encoded data transmission techniques in place of parallel data protocols.

The ESCON architecture provides inherent advantages such as: information transfer using fiber optic technology; higher rates of data transfer (17 MBytes/sec); extended distances (3 km typical with extension to 60 km); dynamic connectivity through switched point-to-point data flow; and interconnectivity with local and wide area networks Application of ESCON as the means for data communications can, in addition to the asserted enhancements in data throughput rates and distance, provide other meaningful benefits such as: greater connection flexibility of equipment; reduced floor loading due to significant cable weight and size reductions; customer configuration expansion or reconfiguration with minimal or no disruption; increased data integrity and security; and reduced cost of ownership through more effective utilization of equipment.

The ESCON architecture has been adopted by many other manufacturers of computer equipment as a basic input/ output protocol and it has been accepted as an ANSI Standard ("SBCON"). The technical details of the IBM ESCON interface are described, among other places, in various IBM publications including INTRODUCING ENTERPRISE SYSTEMS CONNECTION, IBM 3990 ESCON FUNCTION, INSTALLATION AND MIGRATION, IBM 3990 STORAGE CONTROL ESCON FEATURES PRESENTATION GUIDE, ENTERPRISE SYSTEMS ARCHITECTURE/390 ESCON I/O INTERFACE AND ENTERPRISE SYSTEMS ARCHITECTURE, which are incorporated herein by reference.

The various devices interconnected to a host system with ESCON I/O include storage systems known as "Integrated Cached Disk Arrays," ("ICDAs"), which are typically an array of small inexpensive disk drives integrated into a single chassis. High speed caches are implemented between the host and disks in ICDAs to yield improved performance. One family of known ICDA products, known as SYMMETRIX produced by EMC Corporation, Hopkinton, Mass., provides a high reliability array of drives, and offers great flexibility in terms of performance enhancements such as: mirroring; greater data availability; greater data transfer rates over distributed buses; and various levels of redundancy implemented in systems referred to as "RAID systems" ("Redundant Arrays of Inexpensive Disks").

The $EMC^2$ Symmetrix architecture, generally illustrated in FIG. 1, integrates a high speed cache or global memory between a disk array and a host computer or CPU. The functional elements generally required to integrate the cache include a host-to-cache interface (which in one implementation is an IBM standard ESCON interface referred to as a host "ESCON Adapter"—EA), and a cache-to-disk drives interface (which may be a Small Computer Systems Interface, "SCSI", referred to as a "Disk Adapter"—DA). The EA and DA interface boards are generically referred to as "Directors". The Symmetrix architecture operates under a "cache all" policy, meaning that all transfers, i.e. from the host to the drives or from the drives to the host, go through cache. The principal function of the Directors is the movement of data between the host and Global Memory (cache) or between Global Memory and the Disk Drives.

The Global Memory Bus (GMB), between the EA and cache and between the DA and cache in Symmetrix, actually consists of two portions or identical buses designated "A" and "B". The use of two buses improves performance and eliminates a possible single point of failure. Each bus has independent arbitration and consists of a 32 bit address bus plus 1 parity, a 64 bit data bus with 8 bits of Error Correction Code (ECC) check bits and a number of control lines with parity. The smallest data transfer that may take place over the GMB is 64 bits during each access (however, byte, word and longword operations are performed within a Director). The SYMMETRIX family of ICDAs are described in detail in the Symmetrix Product Manuals (for Models 5500, 52XX, 5100, 3500, 32XX and 3100) which are incorporated herein by reference.

The ESCON adapter interface(s) and disk adapter interface(s), i.e. the bus(es) between the host and EAs and between the disk array and DAs respectively, are 8 bit and in some cases 16 bit interfaces in Symmetrix. Thus the bytes received from a host have to be assembled into a 64-bit memory word for transfer to Global Memory, i.e. cache. Similarly, 64-bit memory words from Global Memory have to be disassembled into bytes for transmission over the interface(s). Assembly/disassembly of data to/from Global Memory is carried out by plural gate arrays located on each Director.

The Symmetrix family of ICDAs is designed around a pipelined architecture. A pipeline or pipe in the system is a registered path along which data is clocked to move it from one location to another.

The Directors, generally, are designed around a common pipelined architecture moving data along the "pipe" or pipeline under microprocessor control. It is the pipelines that move the data when the system is operating, not the controlling microprocessors. The microprocessors set-up the pipes to perform a transfer and monitor the pipelines for errors during the transfer. The Directors in known Symmetrix systems incorporate a dual control processor architecture including a first processor referred to as "X" and a second processor referred to as "Y". The dual processor architecture is configured to share substantial resources in order to keep hardware requirements to a minimum. Each control processor in a "front end" Director, i.e. transferring data to/from Global Memory, is typically responsible for two pipelines designated "A" and "B" and respective Direct Multiple Access (DMA) and Direct Single Access (DSA) pipelines, for Global Memory access.

Known Symmetrix systems can be configured with ESCON adapter circuitry for communication with hosts having ESCON I/O, as disclosed in U.S. patent application Ser. No. 08/753,673, now U.S. Pat. No. 5,884,055 which is incorporated herein by reference. FIG. 2 illustrates a known ESCON front end Adapter or Director, configured for transferring data between a host ESCON I/O (not shown) according to the IBM Bus ESCON standard known in the art and the ICDA incorporating the Global Memory. Data in accordance with the ESCON protocol is received on the ESCON Director by ESCON Receiver/Transmitter Gate Arrays (Rx/Tx GA) which receive and transmit ESCON data between the host ESCON I/O and the ESCON Director pipes in accord with the ESCON I/O protocol. ESCON data is transmitted in two physical pipes that are configured to operate as four pipes, two on each side: an A and B pipe (XA and XB for transmit and receive, respectively) on the X side controlled by an X control processor, and an A and B pipe (YA and YB for transmit and receive, respectively) on the Y side controlled by a Y control processor. Parallel ESCON data is passed in the pipes on the ESCON front end Director on a bidirectional bus connected to respective ESCON Receiver/Transmitter Gate Arrays (Rx/Tx GA), which in turn assemble/disassemble 64 bit memory words. Error detection and correction is performed in the ESCON pipe using a pass through EDAC device. Dual Port Ram (DPR) is implemented in the pipe for buffering data transferred between the ESCON host (not shown) and Global Memory.

Each processor on the ESCON Director has its own Memory Data Register (MDR) to support DMA/DSA activity. The MDR provides a 72 bit wide register set, 64 bit data and 8 bits parity, comprised of upper and lower words that can be independently read or written by the respective microprocessor. Similarly, the MDR performs the assembly and disassembly of 64 bit Global Memory words.

The two microprocessors on the known ESCON Director perform functions associated with managing data flow to and from Global Memory, and additionally are accessible as individual points of contact for a user to configure memory and/or test and exercise the memory and pipelines (e.g. for diagnostic purposes). Such an implementation can disadvantageously interfere with the data flow management and adds complexity to the system. Complexity is inherent in the configuration(s) known in the art, in that the individual pipeline or line processor's activities, beyond data flow management, must be coordinated with other line processors' activities. Furthermore, involving line processors in other than data flow management leads to bottlenecks on the backplane bus that negatively affect system performance. For example, inter-processor communication, i.e. communication between line processors, interferes with the system's data flow capabilities.

Known ICDA implementations, such as known Symmetrix systems, are designed according to a two level architecture. That is, the Director interface is a first level interface that works in conjunction with a second level adapter board that is directly connected to the host ESCON I/O. The ESCON Receiver/Transmitter Gate Arrays (Rx/Tx GA) on the Director transmit data to or receive data from the second level ESCON adapter board that effects data conversion using devices known in the art. The second level adapter board converts parallel data to serial ESCON data using a Cypress CY7B923 device (for transmission to the host), or converts serial ESCON data to parallel with a Cypress CY7B933 (for receipt by the ESCON Director). A processor on the second level adapter board handles protocol operations and basically translates ESCON information into a generic interface protocol, or interchange format. The adapter board includes memory associated with the adapter processor, and all of the data from the ESCON protocol engines is stored temporarily in this memory. The processor on the adapter then has to figure out by looking through the stored data where header information is and where the data is. The adapter processor then writes in the adapter memory information about where the data starts and ends. In addition, the processor interprets commands from the host and writes into the adapter memory what the command is and what the ESCON command means in a generic fashion.

The Director card processor then finds this information. The processor on the Director(s) polls through the adapter memory space to find directives from the adapter. For example, an ESCON Director polling the adapter memory could find a write operation along with an indication of where the data to be written is located. The converted ESCON information found can then be handled by the processor(s) on the Director(s), which take the data and actually do transfers to/from the Global Memory.

Such a two level architecture results in significant loss of performance, in part because of the polling for the data transfer information. With the two levels, the adapter card at one level has to figure out what the command is, where the data is, translate it to the interchange format and store all this in the adapter memory. At the second level, the Director polls and retrieves the interchange information. There is very little pipelining that can be effected in such an implementation. Inefficiencies result from the architecture wherein operations are completed at one level and handed off to another level. Parallelism is not exploited.

Similarly, known ICDA implementations, and other arrays of inexpensive disks that transfer data according to the known ESCON protocol, receive user data for disk storage in the context of a frame that includes header information and frame information. Known integrated cache systems typically store the data in the cache memory along with the header and frame information. Such an implementation is not an efficient use of the cache memory capacity. Disadvantageously, complex software has to be configured to effectively track the location of the data in memory among ESCON header/frame information. Movement of cached data, i.e. going to or from the disk array, in known systems requires that the data be discriminated from extraneous cached protocol information which negatively affects transmission speed and efficiency.

Additionally, storage of user data among header/frame information increases the chances of conflicts arising between line processors accessing the cache to retrieve user data and other line processors perusing the cache to ascertain pertinent header/frame information. Complex pointer management is required to maintain coherency between multiple processors accessing cache storing data and header/frame information.

SUMMARY OF INVENTION

The present invention provides an ESCON interface for a high performance integrated cache storage device implemented in an architecture having a high degree of parallelism and a single level of protocol conversion.

According to the invention, the ESCON interface is implemented as an interface between a host ESCON I/O and global memory and has an architecture that includes a plurality of pipelines each of which is controlled by a respective line processor. In one implementation, two pipelines are controlled by one processor and the interface is flexibly configured, under software control, to implement four or eight pipelines. Each pipeline receives/transmits ESCON I/O information over a respective fiber optic transceiver. An onboard ESCON protocol conversion device or protocol engine in each pipe is configured with the capability of distinguishing data which is customer, or user, data that is to be stored on a disk or is read from disk versus the headers and information that defines control frames in which the data is presented. Transmit and receive frame dual port rams ("xmit frame DPR" and "receive frame DPR", respectively), for storing transmitted frame and received frame information, are connected to the protocol engines which strip the frame/header information from the user data. The control information is put into a format accessible via ring pointers and into a structure, i.e. the DPR, that is easily manipulated using the onboard line processor. The user data that is to be stored in Global Memory ("GM") separated from the control information that comes from the host computer is stored temporarily in First In First Out registers (FIFOs). Thus, the architecture according to the present invention implements hardware that effects discrimination between header/frame information and user data, and effects stripping and storage of header/frame information apart from user data processed for storage in cache.

In further accord with the invention, user data processed for storage in cache, which is effectively concatenated by stripping the frame/header information and storing the separated user data in the FIFOs, is subjected to enhanced error detection. The protocol engine is configured to compute Cyclic Redundancy Check (CRC) error detection information on the separated (concatenated) user data after stripping the frame/header information. Thus although any CRC data transferred from the host with the data frame is stripped, CRC information is computed for the separated data at a point close to the physical interface delivering the data to the ESCON interface according to the invention. The integrity of the data can therefore be tested again as the data moves through the pipelines).

Additionally, data integrity is further ensured by checking the integrity of the simplified pointer management implemented upon entering the user data in the FIFOs. The order, and thus integrity, of data moving through the FIFOs is checked by an enhanced parity mechanism. The user data is stored as bytes in the FIFOs which are nine bits wide to facilitate a parity bit, as known in the art. This parity check mechanism is enhanced by a pseudo-random number generated in a linear feedback shift register (LFSR) in the protocol engine field programmable gate array (FPGA). The pseudo-random number is used to determine whether the parity should be odd or even for that byte when the data bytes exit the FIFOs.

An assembler/disassembler in each pipeline according to the invention receives data from FIFOs (on a write operation to GM), and transfers data to FIFOs (on a read operation from GM). A substantially identical enhanced parity mechanism as implemented in the protocol engine is implemented in the assembler/disassembler to generate a pseudo-random number for each data byte. The enhance parity accompanying data transferred from the FIFO (on a write to GM) is exclusive-ORed with LFSR data generated by enhanced parity circuitry in the assembler/disassembler which effectively reproduces the original parity for the data. If the pointers in the FIFOs become disjoined so that data is essentially being read out-of-sequence from the FIFOs, the condition will be detected in a significant number of the cases as it shows up as a parity error. Thus addressing errors in the FIFOs will manifest themselves as parity errors if the data is stored in the FIFOs with opposite parity than what is detected at the assembler/disassembler (on a write to GM), or vice versa (on a read from GM). Data transferred from the assembler/disassembler to the FIFO (on a read from GM) is processed using the enhanced parity mechanisms in substantially the same manner.

The assembler/disassembler also contains a counter mechanism that counts/controls the amount of data that is read into and out of the FIFOs. When the data transfer starts, the line processor can set how much data will be transferred to memory and from memory in and out of the FIFOs, which allows the entire data transfer to effectively run independent of the line processor. When the transfer count is exhausted/reached, the pipeline hardware can flush the data to memory and initiate end of transfer checks. The data can be tagged with the additional error detection and information, i.e. control status information including CRC information can be updated and/or appended to the data progressing through the pipeline. This effects an additional level of error detection by ensuring at the assembly/disassembly part of the transfer that all of the expected data was transferred into or out of the FIFO (in agreement with a count in the Middle Machine described hereinafter). Other mechanisms in the pipe, e.g. the Middle Machine, can then be most expeditiously informed whether a complete transfer was effected.

The assembler/disassembler according to the invention is configured to assemble or accumulate burst data, as opposed to moving one piece of data at a time, for transfer on the data bus en route to the GM. Thus when a threshold quantity of data is accumulated for an efficient transfer (on a write to GM), the assembler/disassembler passes the burst of data along the pipeline. Similarly, a burst transfer is effected on a read from GM, when a threshold level of space is available in the assembler/disassembler for receipt of data for an efficient transfer.

A buffer dual port ram (DPR) is configured to receive data for buffering read operations from and write operations to the GM. Data is transferred between the assembler/disassembler and the buffer DPR efficiently with a maximum burst size of sixteen, 64 bit memory words. The DPR is used to buffer and speed-isolate the different transfer rates of the backplane to/from GM and various data paths on the ESCON interface circuit board. Data transfers between the assembler/disassembler and the buffer DPR pass through Error Detection And Correction circuitry (EDAC) implementing a modified hamming algorithm as known in the art.

According to the invention, a plurality of state machines arranged into three functional units, an Upper Machine, Middle Machine and a Lower Machine facilitate movement of user data between the buffer DPR and the Global Memory (GM).

The Middle Machine controls all data movement to and from the GM. Although not directly in the data path, it is responsible for coordinating control between the various elements that comprise the data transfer channels. The Middle Machine is interconnected to the Upper Machine and Lower Machine, and to various global memory and line processor interface, address and control elements.

The Middle Machine provides control and coordination between the Upper and Lower sides of the buffer DPR. The Lower Machine connects to the assembler/disassembler of each pipe and controls the EDAC. The Upper Machine connects to the backplane, which in turn connects to Global Memory. The actual data transfers between the buffer DPR and GM are controlled by the Upper Machine, and transfers between the buffer DPR and the assembler/disassembler are controlled by the Lower Machine.

On the Lower side, the Lower Machine handles the handshake protocol between the assembler/disassembler, the EDAC and the DPR. When an assembler/disassembler needs to transfer data, it sends a request to the Middle Machine. The Middle Machine arbitrates among the plurality of Lower side requesters, and begins a Lower grant cycle. The Middle Machine provides the number of the pipe that won the arbitration (the "won pipe number"), along with a Dual Port RAM pointer to the Lower Machine. When the Lower Machine accepts this data, it sends an acknowledge back to the assembler/disassembler which won the arbitration, and begins a data transfer between the assembler/disassembler and the DPR, through the EDAC. Upon completion of the transfer, status and ending pointer information are returned to the Middle Machine.

Similarly, the Upper Machine implements the backplane protocol to accomplish data transfers between the Global Memory connected to the backplane and the buffer DPR on the ESCON interface according to the invention. The Middle Machine determines a pipe that needs servicing. When the Middle Machine finds a candidate it provides the won pipe number along with a DPR pointer to the Upper Machine. The Upper Machine requests backplane access and provides the address, command and transfer length to the backplane. When the data transfer phase begins, the Upper Machine manages the DPR address and control signals. Upon completion of the transfer, status and ending pointer information are returned to the Middle Machine Status Register.

The Middle Machine maintains a transfer counter, which is used to pace a transfer and to calculate appropriate backplane burst sizes. The Middle Machine is further responsible for error management. When an error occurs during a transfer (either Upper or Lower), the Middle Machine will collect status from the Upper and Lower machines, appropriately post the error condition in the Status Register, and disable the failing transfer.

The architecture according to the invention further incorporates substantial shared resources including a service processor that provides, among other things, configuration and maintenance services. The service processor facilitates messaging between line processors and provides a single point of contact for a user interfacing with the line processor(s). There is also shared EPROM or FLASH memory from which the service processor and line processors get their initialization or boot program. Shared non-volatile static RAM (SRAM) is provided to store the ESCON interface board configuration data and trace logs. A shared time of day chip records the actual time and date of the real world that is shared between all the processors.

The shared resources include shared Dynamic RAM (DRAM) and Static RAM (SRAM)("shared memory"). The DRAM can be used to store code, such as diagnostic code, that is not performance critical. When an error is received in a pipeline diagnostics may be run by the processor in that line. Since the diagnostic code is the same to all processors on the board there is no reason to keep multiple copies of it, so it is kept in the shared memory. The shared memory may also be used to store portions of code that is too large to store locally with the respective line processor.

The shared memory SRAM is further used to provide the ability for the line processors and service processor to communicate via a messaging system. The shared memory includes mailboxes that are used to communicate between the line processors and the service processor. The service processor has the capability of issuing a system management interrupt to any or all of the line processors. This interrupt is an indication to the line processor(s) that it should go out to the shared memory and read its respective mailbox. In operation, the service processor can deliver a message, i.e. command, to a line processor's mailbox, for example to tell a line processor to go off-line or on-line. The service processor will write the command into the mailbox and then assert the system management interrupt on the appropriate line processor that it wants to read the mailbox. The line processor receiving the interrupt will take the interrupt vector, read the mailbox, interpret the command and deliver the appropriate response to the mailbox. Each line processor has a system management interrupt line going back to the service processor. Once the line processor has put its response or its request into a mailbox, it will then assert its system management interrupt line to the service processor. The service processor is central to the interrupt/messaging scheme in that it can interrupt any line processor and any line processor can interrupt the service processor.

The shared resources including the service processor are used at start-up to boot the ESCON interface, and ultimately control the functional of the line processors. The service processor also provides system wide services. When there is a system wide interrupt it is delivered to the service processor. The service processor decides what to do with it. It decides whether it needs to interrupt the data transfer that is in progress. While line processors are responsible for doing data transfer tasks, they can consolidate certain tasks onto the service processor to increase system performance. That is, the service processor can consolidate some of the operations from each of the line interfaces to reduce the number of accesses to the backplane thus saving backplane bandwidth. This is accomplished through the messaging system between the processors that is implemented in shared memory.

Features of the invention include provision of an ESCON I/O interface that effects high-speed, high efficiency transfer of data between an ESCON I/O host and Global Memory (GM) in an integrated cache disk array system. Separation of control information and user data early in the pipeline transfer facilitates highly efficient processing and simplified manipulation of user data traversing the pipeline(s). Segregation of user data into a FIFO avoids complex pointer management. Higher levels of data integrity are ensured by enhanced error detection implemented in the initial stages of the data traversing the pipes. Data order checking provides further enhancement of error detection ensuring the integrity of transferred data.

Further features include increased pipelining and data transfer rates facilitated by the assembler/disassembler which assembles data in order to burst data to the buffer DPR. Bursts of data are more efficient and yield higher performance than doing single beat data transfers. The implementation of upper, lower and middle machines to coordinate data transfers modularizes data management and facilitates pipelining and parallelism.

Avoidance of multiple copies of the code for each processor in each pipeline avoids wasting resources, such as EPROM or FLASH, and conserves board real estate. The sharing of substantial resources by the line processors keeps hardware requirements to a minimum. High levels of integration are achieved in the interface according to the invention as various mechanisms are implemented in very large scale application specific integrated circuits (ASICs) and programmable gate arrays. Thus fewer devices are used and higher reliability is attained.

Separation of facilities and code separates tasks for line processors and the service processor which simplifies source code modifications and maintenance. Maintenance and error detection and correction handled by the service processor minimizes affects on data transfers, as line processors handle data transfers maximizing data throughput and bandwidth. Implementation of a processor messaging system which can be used to prioritize transfers based on most desired operations improves overall system performance.

BRIEF DESCRIPTION OF THE DRAWINGS

The foregoing and other features and advantages of the present invention will be more fully understood from the following detailed description of illustrative embodiments, taken in conjunction with the accompanying drawing in which:

FIGS. 3a and 3b are a block diagram of an ESCON interface for interfacing a host ESCON I/O to a backplane connecting to Global Memory in and integrated cache disk array according to the invention;

FIG. 4c is a map of a Device frame header structure as stored in the DPR of FIG. 4b;

FIG. 4d is a map of a Link frame header structure as stored in the DPR of FIG. 4b;

FIG. 5c is a link frame header structure as constructed by the ESCON interface of FIGS. 3a and 3b for transmitting link frames;

FIG. 5d is a device frame header structure as constructed by the ESCON interface of FIGS. 3a and 3b for transmitting device frames;

FIG. 6 is a block diagram of an assembler/disassembler in the ESCON interface of FIGS. 3a and 3b;

FIG. 18 (Table I) is a description of header fields particular to the header structure of FIGS. 4c and 4d and processed by the ESCON interface of FIGS. 3a and 3b;

FIGS. 19–22 (Tables II–V) are diagrams of pipeline processor interface registers implemented in the receiver logic of FIG. 4a;

FIGS. 23–27 (Tables VI–X) are diagrams of pipeline processor interface registers implemented in the transmitter logic of FIG. 5a;

FIGS. 28 and 29 (Tables XI and XII) are diagrams of a command register and a status register implemented in the assembler/disassembler of FIG. 6; and FIGS. 30–33 (Tables XIII–XVI) are primary address pointer, secondary address pointer, command and transfer length, and status registers, respectively, comprising a register file in the middle machine state machine of FIG. 8.

DETAILED DESCRIPTION

The mechanisms according to the present invention are implemented in an integrated cache data storage system involved primarily with moving data between a host computer and at least one array of storage devices, such as a disk drive array. More specifically, the mechanisms are implemented as functional elements in a front end ESCON interface, or controller, which moves data between an ESCON I/O interface in the host, as known in the art, and a Global Memory or cache integrated in the storage system.

ESCON Interface Overview

The ESCON architecture interface protocol as known in the art generally comprises three levels of communication between devices connected over the ESCON link or interconnection. At a physical level, "sequences" are passed between devices over the ESCON link. ESCON sequences are bits that are specially formatted and/or combined to have special meanings relating to the interconnection or physical interface. Link level frames or "link frames" are a second level of ESCON communication that further deal with or define the physical interconnection of the ESCON interface protocol at a higher level than the sequences. Basically, link frames are used to maintain the virtual connection between ESCON clients, i.e. the devices interconnected over ESCON. A third level, the highest level, of ESCON communication is effected via "device frames." Device frames are used to pass control and status information between ESCON clients, and they are used to facilitate the functionality derived from the interconnection between ESCON clients.

In this illustrative embodiment describing an ICDA interconnected to a host computer over ESCON, device frames are the primary mechanism for passing "user data" or customer data that is being passed between the cache and the host for storage in the ICDA. Device frames or link frames can be used to pass control information in the form of commands and parameters controlling the operation of the ESCON interface according to the invention and/or the ICDA. Each frame or packet of ESCON information, generally, contains a header identifying the frame and frame type, a trailer and a data information block (DIB or user data). The trailer portion of the frame is usually Cyclical Redundancy Check (CRC) information. CRC information, as known in the art, is used in checking for errors in data transmission. In this illustrative embodiment, ESCON device frames are user data frames having information in the DIB portion that is to be stored in or has been retrieved from disk. The user data (DIB) portion of the ESCON standard link control frame typically are parameters to a command argument. Parameters issued as part of an ESCON frame include an indication that the data is information about the transfer that is not part of the transfer.

Figure 1:
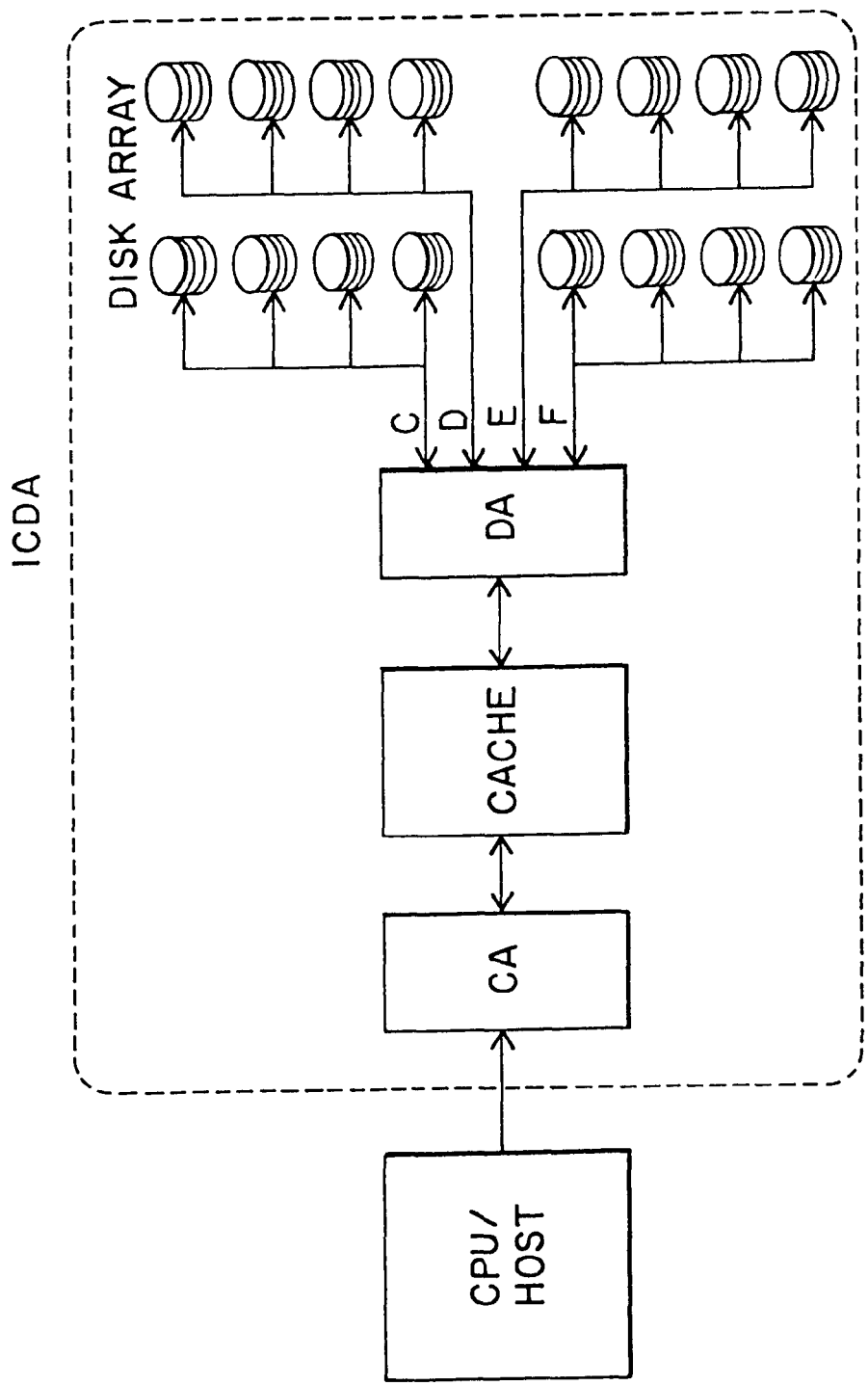
FIG. 1 is a block diagram of an architecture of an integrated cache disk array according to the prior art.
Figure 2:
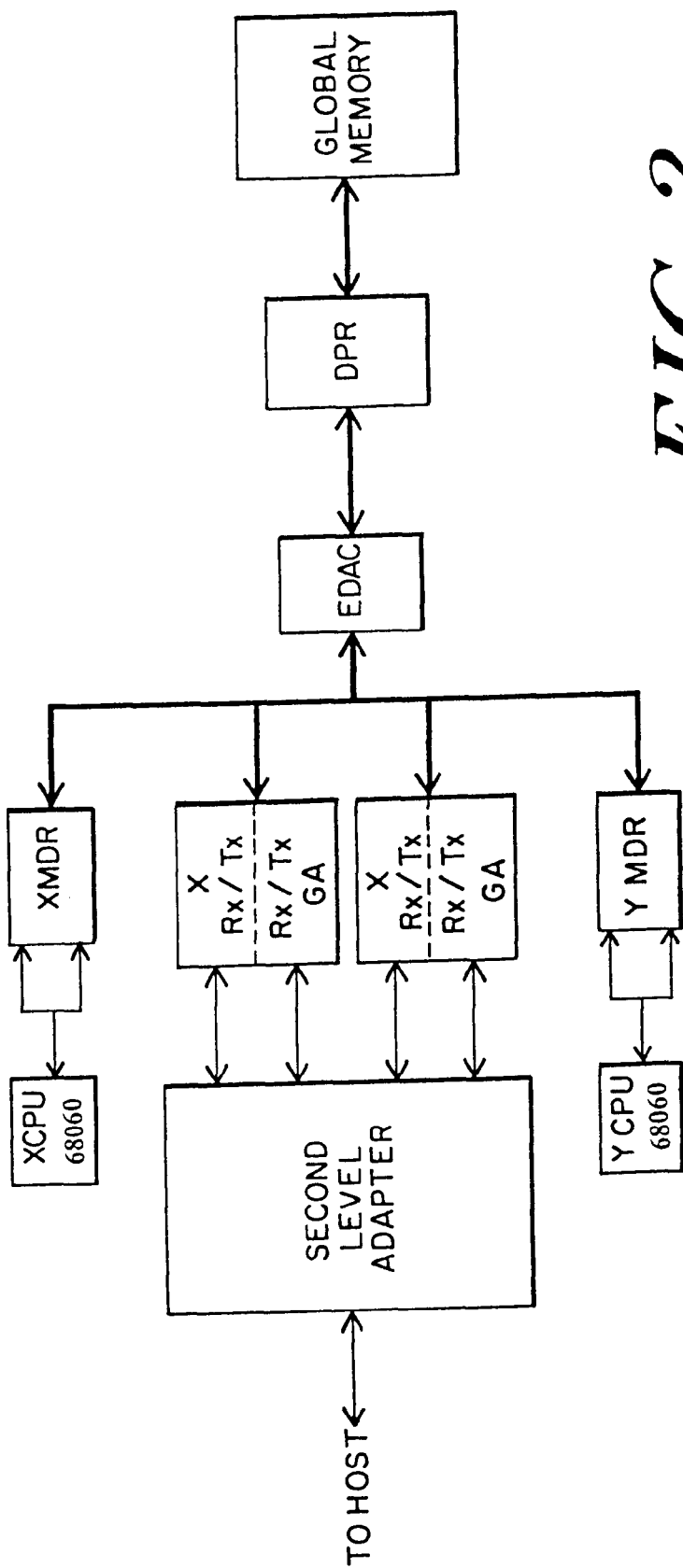
FIG. 2 is a block diagram of an ESCON front end Director of interface in a two-level, dual processor implementation, including ESCON pipes for transferring data between a host and Global Memory according to the prior art.
Figure 3B:
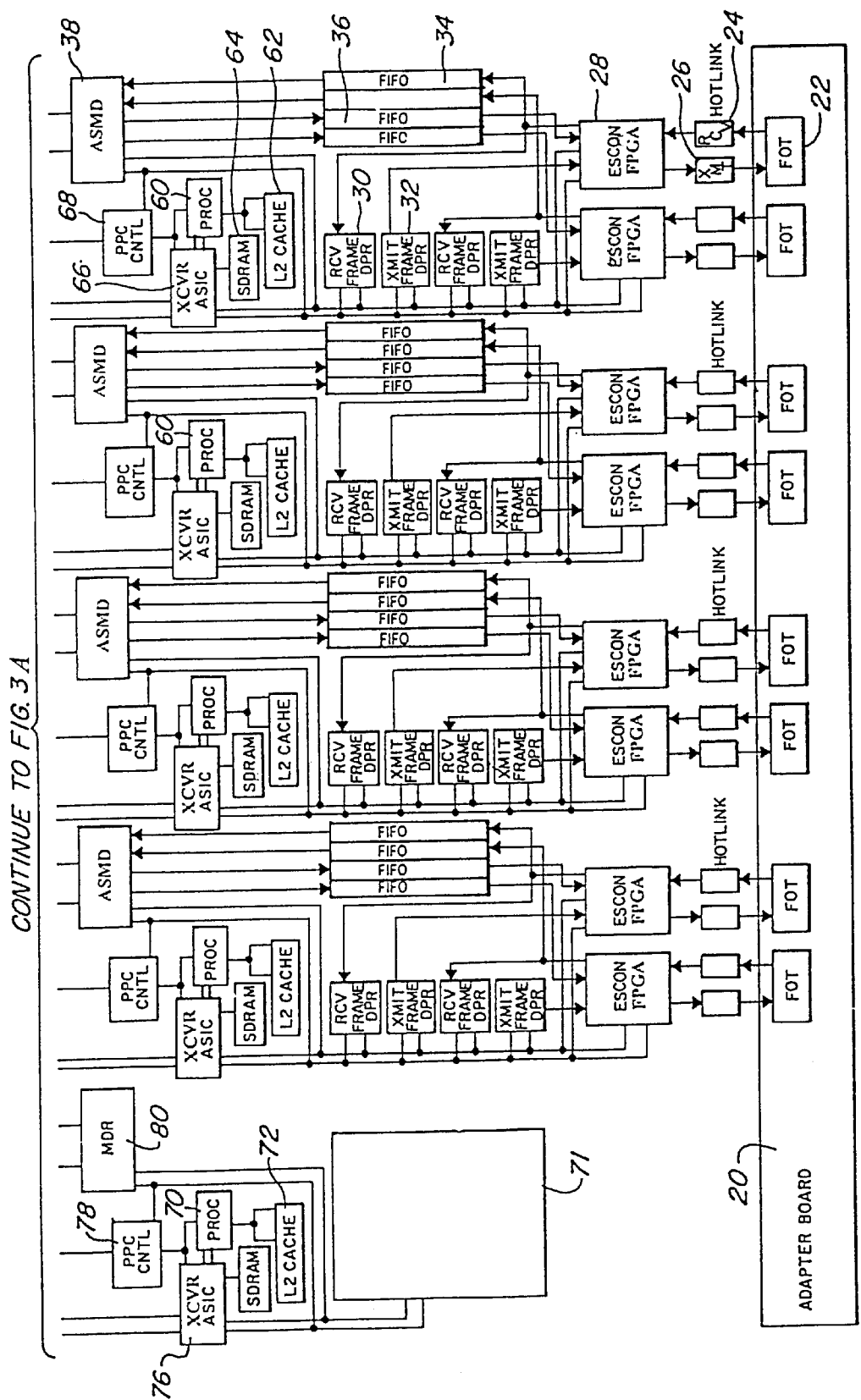

An ESCON interface circuit board illustrated in FIGS. 3a and 3b, generally, is an eight pipeline interface between the host and Global Memory ("GM"). Each of the eight pipelines or pipes moving data is substantially identical in terms of structure and functionality. In the illustrative embodiment of the invention in FIGS. 3a and 3b, the ESCON interface according to the invention is implemented as a circuit board that is connected to an adapter board 20 that is physically connected to the host ESCON I/O fiber optic cabling (not shown) for ESCON communication. The adapter board 20 comprises a plurality of fiber optic transceivers 22 (FOT) that receive information from the host formatted according to the ESCON protocol known in the art.

Each FOT on the adapter board 20 in this illustrative embodiment is a conventional Part No. 1401BB made by Seimens. The FOTs 22 on the adapter board 20 pass ESCON standard serial information going to the ESCON interface board to a respective HOTLINK receiver 24 (Cypress Part No. CY78933) in the pipeline. The HOTLINK receivers 24 convert the ESCON standard serial data into ESCON standard parallel data. The receiver 24 uses 8b10b encoding to take 10 serial bits from the fiber optic channel and convert that to 8 bits parallel plus parity. The receiver 24 then adds a special character to the data as a flag to indicate that there is actually 8 bits of data and to indicate where a data frame starts and where the frame ends.

Similarly, HOTLINK transmitters 26 (Cypress Part No. CY78923) in the pipeline receive ESCON standard parallel information coming from the ESCON interface board for transmission to the FOTs 22 on the adapter board 20. The HOTLINK transmitters 26 convert the ESCON standard parallel data into ESCON standard 10 bit serial data for receipt by the FOTs 22 and transmission to the fiber optic channel. The HOTLINK receivers and transmitters are described in detail in the Cypress Data Book, which is incorporated herein by reference.

In a pipeline, a HOTLINK receiver 24 and a transmitter 26 are paired and electrically interconnected to an ESCON protocol engine 28 implemented in a Field Programmable Gate Array (FPGA) (Part No. XC4013E-3). Parallel ESCON standard data is transferred between the protocol engine 28 and the HOTLINK receiver 24 and transmitter 26. The ESCON protocol engine is comprised of receiver logic that interfaces with the HOTLINKS receiver 24 and ESCON transmit logic that interfaces to the HOTLINKS transmitter 26. The protocol engine in a pipe processes the information, e.g. frames, sent from/to the ESCON host I/O, as described in detail hereinafter.

The protocol engine 28 ESCON receive logic is electrically interconnected to a receive frame dual port ram (DPR) 30 providing a frame header store. The receive frame DPR 30 stores headers and other information, such as commands and parameters, which is not customer data to be stored on disk. If the frame is something other than a user data frame, such as a command frame or a link control frame, then the protocol engine sends the frame information to the receive frame DPR 30. Because the receive frame DPR 30 is a dual port ram the protocol engine 28 can be storing data over one port while a line processor is reading it out of the other port.

The protocol engine 28 ESCON transmit logic is electrically interconnected to a transmit frame DPR 32. ESCON frame information being sent from the ESCON interface according to the invention is assembled in the transmit frame DPR. Ultimately, an assembled ESCON frame, including any required user data, is transmitted through the protocol engine and to the adapter board 20 for transmission to the host ESCON I/O.

In addition to being connected to the receive frame DPR 30, the protocol engine 28 ESCON receive logic is electrically connected to a set of receive First-In-First-Out registers ("receive FIFO") 34. The protocol engine 28 discriminates between frame/header information and user data, and stores the user data in the receive FIFO 34, as data progresses through the pipeline(s) toward GM (Global Memory) as described in detail hereinafter. Similarly, the protocol engine transmit logic is electrically connected to a set of transmit FIFOs 36. User data to be constructed into ESCON frames for transmission back to the host ESCON I/O is stored temporarily in the transmit FIFO 36.

An assembler/disassembler 38 according to the invention is electrically interconnected to the receive FIFO 34 and to the transmit FIFO 36. The assembler/disassembler 38 is in turn electrically interconnected to a data bus ("the SDIO bus") 40 over which data is transferred going to/from the backplane and GM. On a write to GM the assembler/disassembler 38 receives user data from the receive FIFO 34 and assembles the data into memory words and/or blocks of memory words for bursting onto the SDIO bus 40. On a read from GM the assembler/disassembler 38 receives memory data from the SDIO bus 40 and disassembles it into bytes for temporary storage in the transmit FIFO 36.

The SDIO bus 40 facilitates communication of data transferred between a buffer dual port ram (DPR) 42 and the assembler/disassembler 38. The buffer DPR 42 is configured to receive data for buffering read operations from and write operations to the GM. Data transfers between the assembler/disassembler 38 and the buffer DPR 42 pass through Error Detection And Correction circuitry (EDAC) 44.

An arrangement of state machines, three in this illustrative embodiment comprising a Lower Machine 46, a Middle Machine 48 and an Upper Machine 50, facilitate movement of user data between the buffer DPR 42 and the backplane to Global Memory (GM).

The Lower Machine ("LM") 46 controls "lower side" data transfers, including the handshake protocol between the assembler/disassembler 38, the EDAC 44 and the buffer DPR 42, for transferring data on GM reads and writes. For example, when an assembler/disassembler 38 needs to transfer data to GM (i.e. a write operation), it sends out a request, which is subject to arbitration as described in detail hereinafter. The LM 46 receives information regarding a pipeline data transfer and sends an acknowledge back to the assembler/disassembler which won the arbitration. The assembler/disassembler that owns the right to transfer begins a data transfer over the SDIO bus 40, through the EDAC 44 to the buffer DPR 42. Similarly, on read operations the LM 46 controls transfers from the buffer DPR 42 through the EDAC 44 over the SDIO bus 40 to the assembler/disassembler(s) 38.

The Middle Machine 48 ("MM") effectively oversees control of all data movement to and from the GM. Although not directly in the data path, it is responsible for coordinating control between the various elements that comprise the data transfer channels. The MM 48 is interconnected to the LM 46 and the Upper Machine 50, and various global memory data path elements. The MM 48 provides control and coordination between the upper and lower sides of the buffer DPR 42. The lower (or Lower Machine) side of the MM 48 connects to the assembler/disassembler 38 of each pipe and the LM 46. The upper (or Upper Machine) side of the MM 48 connects to the backplane and the Upper Machine, which in turn connects to GM. The actual data transfers between the buffer DPR and GM are controlled by the Upper Machine and Lower Machine.

Figure 7:
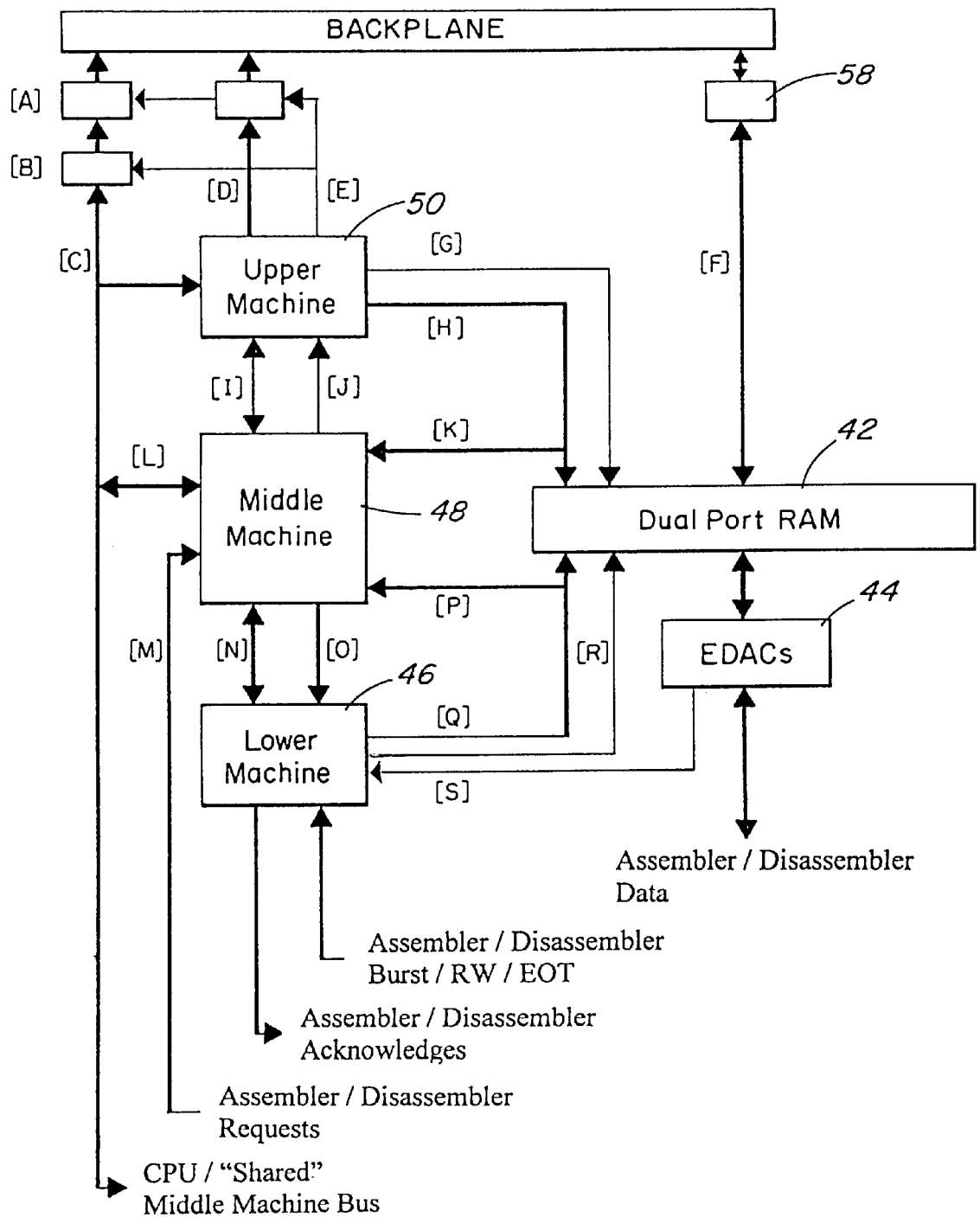
FIG. 7 is a block diagram of interconnections between Lower, Upper and Middle machine functional units implemented via data transfer state machines according to the invention.

The Upper Machine 50 ("UM") implements the backplane protocol to accomplish data transfers between the GM connected to the backplane and the ESCON interface according to the invention. The MM 48 determines a pipe that needs servicing. The UM 50 receives, from the MM 48, information regarding the pipe to be serviced and requests backplane access. The MM 48 provides the address and the UM 50 provides the command and transfer length to the backplane over a plurality of transceivers 52, 54, 56. When the data transfer phase begins, the UM 50 manages the buffer DPR 42 address and control signals, and provides a clock on write operations. Data is transferred from the buffer DPR 42 to the backplane over a backplane transceiver 58, as shown in FIG. 7.

Referring still to FIGS. 3a and 3b. The pipeline elements generally described hereinbefore, and pipeline transfers described in greater detail hereinafter, are controlled in each pipeline by a respective pipeline processor 60. That is, commands from the host ESCON I/O for transferring data or otherwise interfacing with GM through the ESCON interface according to the invention are received and executed by the pipeline processor. In this illustrative embodiment the pipeline processors are power PC 603E or the like. Each pipeline processor 60 has local resources including a second level cache 62 which is used for operating software, local variables, and control information. Each line processor 60 has a dynamic RAM store 64 for various processor storage tasks, such as configuration information and trace logs. A transceiver ASIC 66 implements a bus gasket function that effectively provides a plurality of selectable transceivers for interconnections between the line processor 60 and the various busses to which it has access. A processor controller 68, in the form of a MACH5LV-384/192, implements control logic for controlling a respective power PC line processor 60 and transceiver ASIC 66 according to the functionality described hereinafter.

The architecture according to the invention further incorporates substantial shared resources, configured as illustrated in FIGS. 3a and 3b, including a service processor 70 that provides configuration, maintenance and operation services. The service processor 70 facilitates messaging between line processors and provides a single point of contact for power-up and for a user interfacing with the ESCON interface(s). The service processor 70 has the same local resources as the line processors, including a second level cache 72, a dynamic ram store 74, a transceiver ASIC 76 and a processor controller 78. The service processor 70 communicates with GM via a Memory Data Register device ("MDR") 80, rather than through an associated assembler/disassembler because the service processor has no need to assemble/disassemble bursts of data for transmission to/from GM. It should be noted that the MDR is substantially similar to the assembler/disassembler 38 described hereinafter, except that it does not include a FIFO mechanism for assembling bursts of memory data words. The line processors 60 also have an MDR, implemented in the assembler/disassembler 38, used to transfer cache management and control information to/from the GM.

The service processor 70 provides a single point of contact, through a Small Computer System Interface (SCSI) ASIC 71, for monitoring operating parameters in the ICDA. The SCSI ASIC 71 includes an RS 232 interface as known in the art, over which information relating to operating parameters such as power and temperature can be transmitted and received. Similarly, network connection can be effected and monitored by the service processor acting as a single point of contact for communication over Ethernet facilities as known in the art, which are included in the SCSI ASIC 71.

Other shared resources available to and shared by the line processors and service processor, include shared EPROM or FLASH memory 82 from which the service processor and line processors get their initialization or boot program. Shared non-volatile dynamic RAM (NVD) 84 is provided to store the ESCON interface board configuration data and trace logs, including error messages. A shared time of day chip 86 that is shared between all the processors records the actual time and date of the real world. The shared resources further include shared, synchronous Dynamic RAM (DRAM) ("shared memory") 88 used to store code, such as diagnostic code, and device tables and/or other large data that is not performance critical relating to the circuit board. When an error is received in a pipeline, diagnostics may be run by the processor in that line. Since the diagnostic code is the same to all processors on the board there is no reason to keep multiple copies of it, so it is kept in the shared memory. The shared memory may also be used to store portions of code, or data, too large to store locally with the respective line processor, and which is not performance critical. The shared memory is further used to provide the ability for the line processors and service processor to communicate via a messaging system, described in detail hereinafter. The shared resources are accessible over various busses, including a shared bus (cntl, data and addr) via transceivers 90, illustratively implemented using Philips 899 transceiver logic. Access to the shared resources described hereinbefore is provided to the line processors 60 and service processor 70 as a result of arbitration effected by a shared controller CPLD 91. In addition to an arbitration mechanism that determines which line processor (or the service processor) gets access to the shared resources, the shared controller CPLD 91 effects control of timing of access to the shared resources, and includes a DRAM controller for the SDRAM 88.

The ESCON Protocol Engine

Figure 4A:
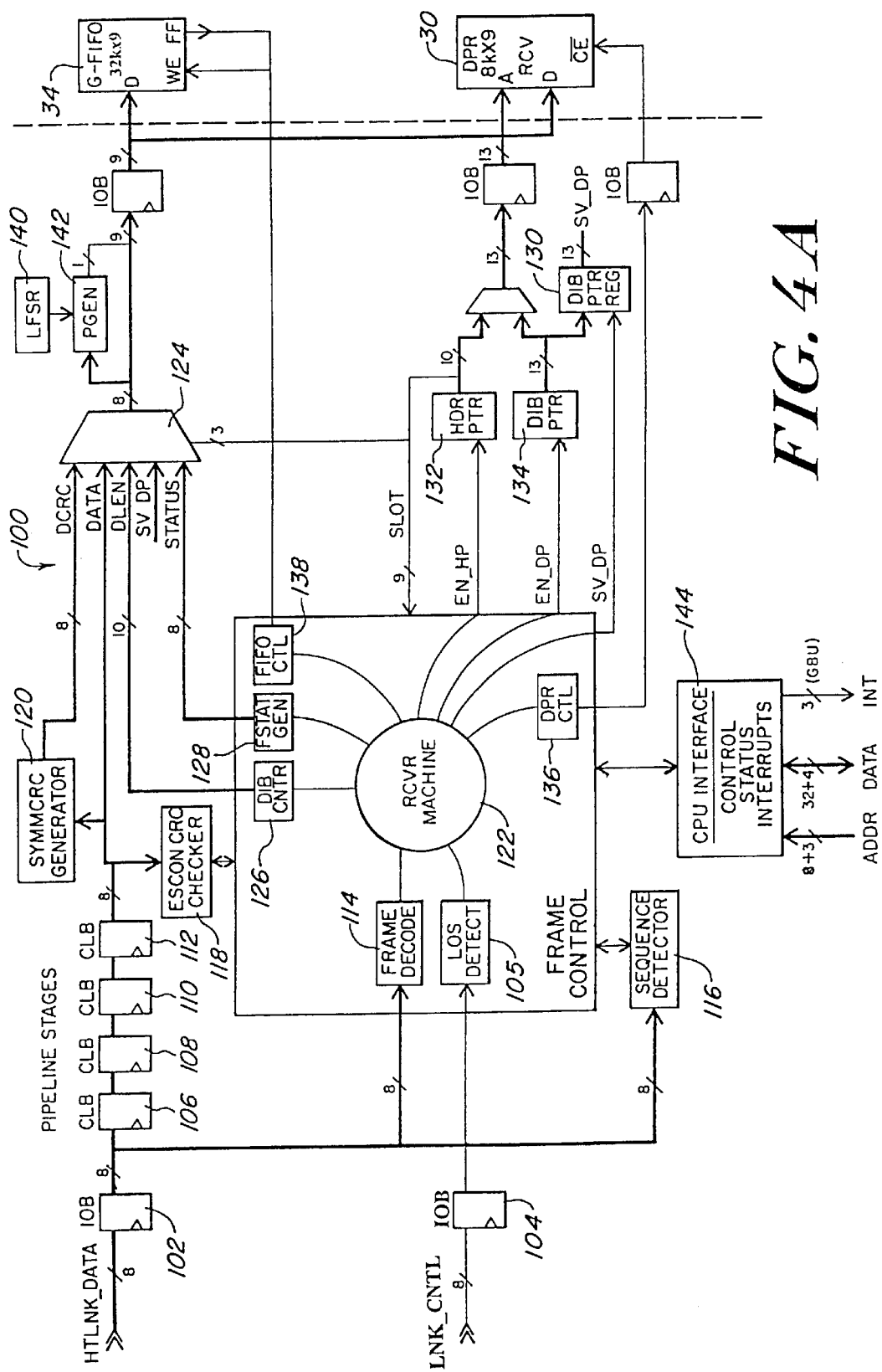
FIG. 4a is a block diagram of receiver logic or hardware implemented in an ESCON protocol engine in the ESCON interface of FIGS. 3a and 3b.
Figure 5A:
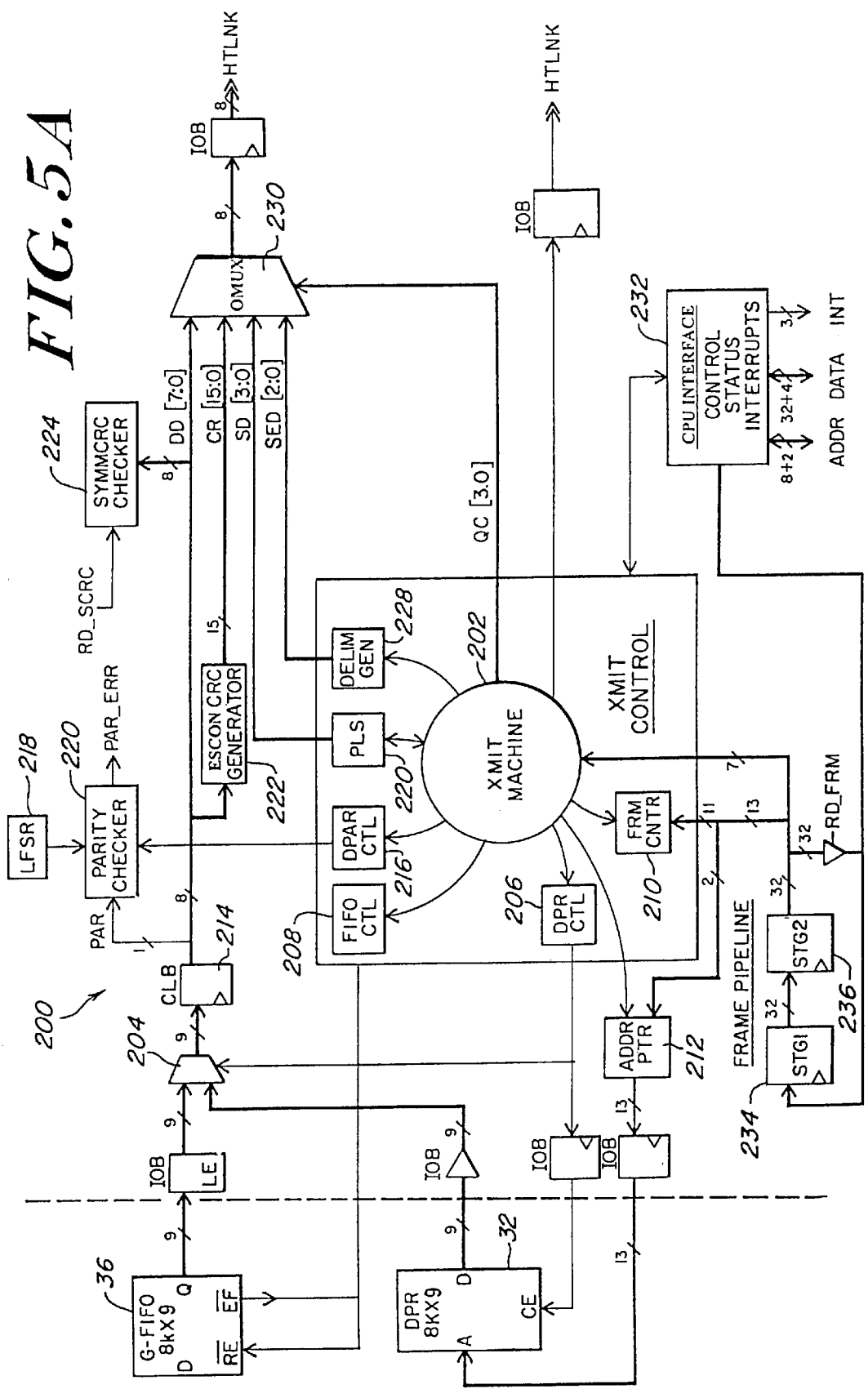
FIG. 5a is a block diagram of transmitter logic or hardware implemented in the ESCON protocol engine in the ESCON interface of FIGS. 3a and 3b.

Referring now to FIGS. 3b and 4a, the ESCON interface according to the invention includes an onboard ESCON protocol conversion device or protocol engine 28 in each pipeline. Each protocol engine 28 comprises receiver logic 100 (FIG. 4a) and transmitter logic 200 (FIG. 5a). Generally, the protocol engine 28 is configured with the capability of distinguishing data which is customer, or user, data that is to be stored on a disk or is read from disk versus the headers and information that defines control frames in which the data is presented. The receiver logic 100 is electrically connected for passing data to the receive frame DPR or Frame Store 30 and the receiver FIFO 34.

The receiver logic or frame reception logic 100 comprises an input register 102 that receives eight bit wide data from the HOTLINK receiver 24. The input register 102 is a register located in the I/O section (an "IOB") of the FPGA device implementing the protocol engine (rather than one of the internal registers or "CLBs"). A second input register 104 is used to receive HOTLINK control information from the receiver 24. HOTLINK control information is received by Loss of Synch detection logic (LoS DETECT) 105. The LoS detect logic checks to see if there has been a loss of sync condition on the ESCON link. Loss of synch is checked for adherence to the ESCON protocol standard, in terms of the loss of sync definition.

At the input to the receiver logic 100 an input pipeline is implemented having five stages, the first being the input register 102. As each byte of information is received it is initially buffered in the input register 102 as a first stage of the input pipeline. Four internal registers 106, 108, 110, 112, comprise the remaining four registers in the input pipeline. The 8 bit wide data path defined by the input pipeline facilitates operations on fields of the input data before any user data is buffered downstream in the receive FIFO 34 or the receive frame store DPR 30.

As a data byte goes from the first pipeline buffer 102 to the second pipeline buffer 106 it is available to frame decode circuitry 114. The frame decode circuitry 114 is logic in the protocol engine FPGA that checks that the structure of the frame is correct in terms of ESCON protocol. For instance, starting and ending delimiters are checked which designate the start and end of a frame, and headers and trailers of the packets or frame that are coming in are checked to determine that they are the proper size. The frame decode logic 114 is configured as a function of the requirements of the ESCON protocol.

Sequence detector logic 116 in the protocol engine FPGA also receives each data byte as it goes from the first pipeline buffer 102 to the second pipeline buffer 106. The sequence detector 116 checks for the special ESCON protocol defined sequences that have special meanings in the protocol. ESCON sequences are not part of normal frames. The sequence detector 116 facilitates generation of interrupts to the line processor as a function of changes in state indicated by ESCON sequences as described in detail hereinafter.

Data bytes transferred through the input pipeline stages 102, 106, 108, 110, 112 are processed by an ESCON CRC checker 118. The ESCON CRC checker checks data integrity according to the CRC algorithm that is defined in the ESCON protocol specification. The ESCON CRC checker 118 issues an ESCON CRC error if the CRC for the ESCON frame is erroneous. A local CRC generator 120 accumulates a CRC on the data, i.e. non-header/frame information, as it goes out to the receive FIFO 34. The local CRC generator provides an exclusive-OR operation of the data field(s) during transfer. Thus the ESCON CRC checker 118 checks the integrity of the entire frame, headers, trailers, and information therebetween. The local CRC generator 120 turns on when the data portion of this field is beginning. The accumulated local CRC is calculated from the data that is stored in the receive FIFO 34, and stored with the frame header in the receiver DPR 30.

Figure 4B:
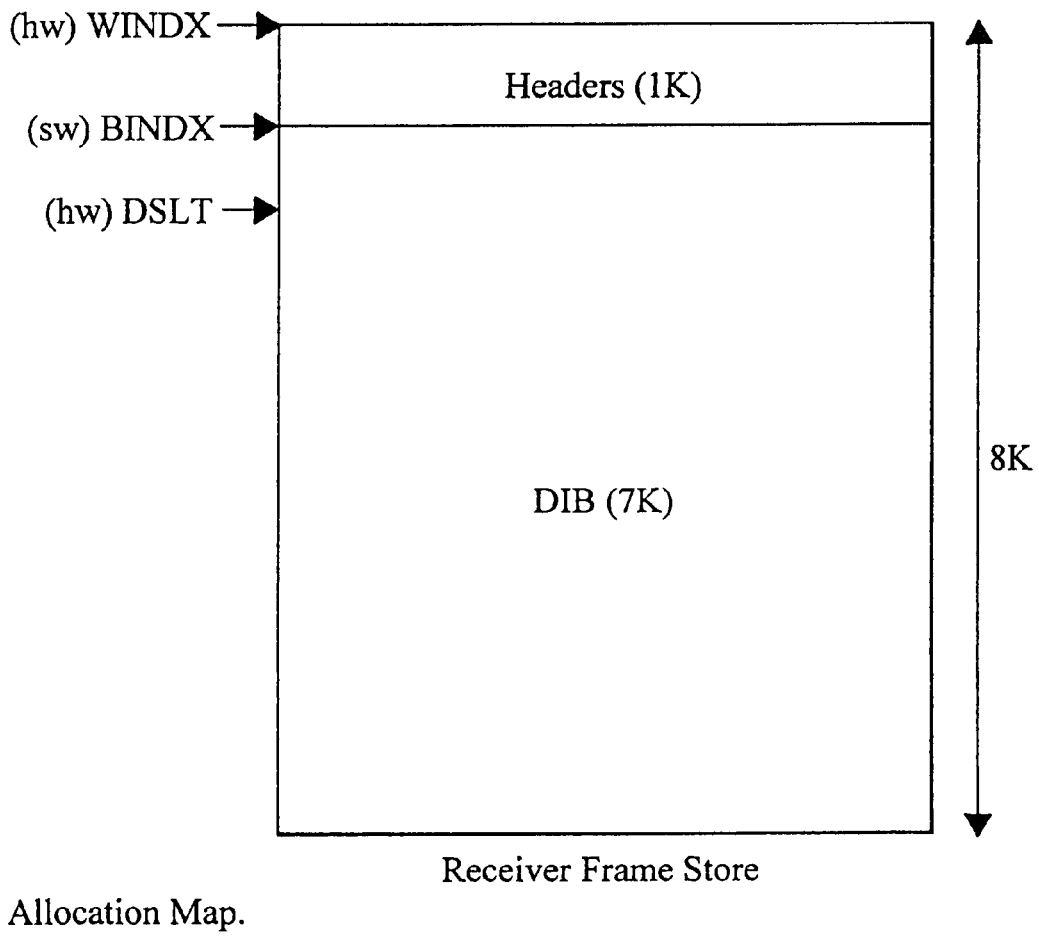
FIG. 4b is a memory allocation map for a receiver frame store or dual port ram (DPR) in the ESCON interface of FIGS. 3a and 3b.

A receiver machine or state machine 122, along with providing other functionality and timing relationships as described herein, controls when the ESCON CRC and the local CRC mechanisms turn on and off, based on frame structure. The receiver machine is started when a new frame is being detected in the pipeline stages as coming in from the HOTLINK interface 24. The machine is idle when there is nothing going on, i.e. it is receiving idle character sequences. When the frame decode logic 114 indicates a delimiter that is a start of frame, the receiver state machine triggers and then sequences through all the incoming frame fields (the header fields for device frames and link frames are illustrated in FIGS. 4b–4d). The receiver state machine is controlling the building of particular fields that will be stored with the header, such as the local CRC (SCRC) and parsing of other fields, such as the information field identifier (IFI) which identifies whether a device frame is a data frame or a control frame.

The receiver machine provides control signals for running the mechanisms for building the header fields. Along with building the SCRC into the header, the receiver machine 122 starts a DIB counter 126 which counts bytes of the data information block in order to generate a DIB length field (DLEN) which is provided to the frame MUX 124. The DIB length is built into the header information stored in the receiver DPR so that pipeline control software (running on the pipeline processor) can access the DPR and know how big the user data portion of the frame is so it can then instruct the assembler/dissembler (FIG. 3b, 38, described in detail hereinafter),to move data accordingly based on its size.

A Frame Status Generator 128 provides a status register that accumulates an Fstatus field to append on the frame header for storage in the DPR. The status field indicates whether any errors occurred during reception of the frame. The Fstatus field provides status per frame in the dual-port ram.

The status field (status), local CRC (SCRC), data length (DLEN) and DIB data are provided as inputs to a frame MUX 124. The frame MUX 124 also receives as an input a DIB pointer (SV_DP) from a DIB pointer register 130. The frame MUX 124 is controlled as well by the receiver machine 122. The frame MUX 124 is sequenced to provide the header fields for storage. The receiver machine issues control signals to appropriately position information in the data path to determine how the data is formatted inside the receive FIFO 34 and inside the receive frame DPR 30.

The receiver state machine 122 also controls addressing of the receive FIFO 34 and the receive frame DPR 30. As the headers are stored in the receive frame DPR 30 the location in the FIFO or DPR is added to the header as a Data Address (Data Adr) and DSLT field via a header pointer register 132 and a DIB pointer register 134. Thus the status field (status), local CRC (SCRC), data length (DLEN), DSLT and Data Adr fields are determined and available. The destination link address and other header fields are available coming off of the link. Accordingly such information can be appended and the frame header stored in the receiver frame store or DPR 30. The receiver state machine includes DPR control logic 136 which controls the chip enable for the DPR.

The dual-port ram 30 is divided up into slots and basically one slot is dedicated to one frame. When a frame is received it is provided with its set of parameters or fields in the DPR 30. With the header information conveniently available in the frame store DPR 30, the line processor can read out all the information for a slot/frame and act accordingly. The line processor can subsequently move to the next slot in the dual-port ram and get the next receive frame and parameters. Frame status can be checked on a per frame basis, and the software can implement commands such as retry or resend the information. Likewise, the software can give the hardware instructions to move the data that is in the FIFO up the pipeline, through the assembler/disassembler 38 and eventually into the global memory.

The receiver state machine 122 includes FIFO control logic 138. When it is determined that a write (i.e. toward GM) is necessary and DIB information is to be written to the FIFO, the receiver machine controls the write enable for the FIFO 34. There is an FF (FIFO Full) flag on the FIFO that comes back into the FIFO control 138. The FF signal indicates that the FIFO 34 is full. If the FIFO is full and a write is attempted, an error condition results in the form of a FIFO overflow.

The linear feedback shift register 140 in conjunction with the parity generator 142 in the data path implement the enhanced parity mechanism as described hereinafter. Substantially identical circuitry is implemented in the assembler/disassembler 38 to check addressing integrity across the FIFO. The enhanced parity circuitry in the ESCON protocol device is configured to run in synch with the enhanced parity circuitry in the assembler/disassembler 38.

The line processor interface to the receiver logic 144 is implemented in a plurality of registers contained in the ESCON protocol engine FPGA. The control and status registers include an ESCON receiver control register, an ESCON receiver status register, ESCON receiver mask register and an ESCON receiver diagnostic register. These control and status registers are illustrated in Tables II–V, FIGS. 19–22 respectively. The line processor 60 has access to these registers through the transceiver ASIC 66 in order to control and check the status of the ESCON protocol engine receiver logic.

The ESCON interface protocol engine frame reception logic receives ESCON frames transferred by the host ESCON I/O according to the ESCON format. The frame reception logic processes the ESCON frames via the receiver logic frame control circuitry including the receiver machine. The receiver logic can be in one of several states, including: a Stopped state; a No Frames Received state; a Receive Frame state; a Receiver Full state; or a Receiver Overflow state. The Stopped state is entered upon power-up or Reset. The receiver also stops when an overflow condition is detected or when a frame being received is terminated due to a severe error condition. When no frames are being received by the receiver logic of the protocol engine, and it is not in the Stopped or other state, it is in the No Frames Received (or "idle") state. In the Receive Frame state one or more frames are being or have been received and the number of frames received is less than a limit specified by a parameter RcvCtlBINDX. In the Receiver Full state the Frame Store buffer is full according to the limit specified by RcvCtlBINDX. The receiver hardware will not store anymore received frames while in the Receiver Full state. The receiver logic of the protocol engine 28 goes into the Receiver Overflow state when a frame is received while the Frame Store buffer is full. After a Receiver Overflow the receiver hardware goes into the Stopped state, and needs to be explicitly re-started by software via the RcvCtl register.

Various error conditions that may occur during receipt of frames are detected by the protocol engine receiver logic. The error conditions that the receiver logic is configured to detect can be divided into two categories: errors that cause the current frame reception to stop and disable further frame reception; and. errors that only cause the current frame reception to stop.

Errors that cause the current frame reception to stop and disable further frame reception, require that the protocol engine receiver logic be re-enabled under software control. Such errors include: frame reception ended by detection of a new sequence; frame reception ended by detection of a Start of Frame (SOF) delimiter; detection of a loss of synchronization between the host ESCON I/O and the ESCON interface receiver logic; detection of a Frame Store Overflow; and detection of a FIFO Overflow.

During frame reception, if the receiver logic detects an error condition of the second type, i.e. errors that only cause the current frame reception to stop, the error is reported in the frame status field of the frame header. Errors that only cause the current frame reception to stop include: ESCON-CRC errors; a frame reception ended by detection of a Control character; a frame reception ended by detection of an Invalid character (violation); incoming frame size exceeding 1035 bytes; frame reception ended by detection of two consecutive Idle characters; frame reception ended by detection of an ABORT delimiter; and frame reception ended by detection of an end-of-frame (EOF) delimiter.

Even though frame reception is stopped if the foregoing error conditions are detected by the protocol engine receiver logic, ESCON sequence reception continues. That is, the protocol engine receiver logic 100 continues to monitor the receiver channel for a data stream from the host ESCON I/O. The receiver logic 100 continuously monitors the received data stream for the following ESCON I/O sequences:

| IDLE | 16 or more consecutive K28.5 chars |
|------|-------------------------------------|
| UD   | Unconditional Disconnect            |
| UDR  | Unconditional Disconnect Response   |
| NOP  | Not Operational                     |
| OFL  | Offline                             |
| RSVD | Reserved                            |

The receiver logic 100 is configured to receive and check an ESCON CRC, or cyclic redundancy check information, provided by the host ESCON I/O with its data transmission. The ESCON-CRC is not stored by the receiver logic. It is checked for correctness and flagged in a Frame Status register (Fstatus) if it is not correct.

Synchronization between the host ESCON I/O and the ESCON interface receiver logic is required in order to avoid an error which will cause the current frame reception to stop and disable further frame reception. Accordingly, the receiver hardware always monitors the received data stream to update its synchronization state according to the ESCON specification. A Loss of Sync is detected if 4 or more code-violations are received without any intervening sequence of 16 consecutive Idle characters. Synchronization is regained when 16 or more Idle characters are received.

Bit Error Rate (BER) monitoring is done by software in the illustrative implementation in order to measure line degradation. A bit (BER bit) is set by Receiver hardware whenever a code-violation is detected in the received data stream and this bit is monitored and cleared by software.

The ESCON Processor in the receiver logic 100 of the ESCON protocol engine 28 receives data streams from the host ESCON I/O and effects discrimination between user data (DIB) in a frame and frame/header information. The protocol engine 28 receiver logic 100 is connected to the receive frame DPR ("Frame Store") 30, and the protocol engine 28 ESCON receiver logic 100 is electrically connected to a set of receive First-In-First-Out registers ("receive FIFO") 34.

As illustrated in FIG. 4b, the receiver Frame Store is an 8K-byte buffer divided into two sections of fixed size. A first portion comprising 1K-bytes is allocated for storage of all frame headers. A second portion comprising the remaining 7K-bytes is reserved for storage of frame data. The 1K-byte frame header section is divided into 32 slots of 32 bytes each. The 7K byte frame data section is divided into 7 slots of 1k-byte each. The frame header section of received Frame Store 30 is operated upon as a circular queue of 32 slots, meaning that up to 32 consecutive frames can be received and buffered before frames start getting discarded.

The frame header section circular queue is managed by two pointers: a Write Index (WINDX); and a boundary index (BINDX). WINDX represents the header slot to which the NEXT received frame will be written by hardware. WINDX is updated on any new frame reception by the ESCON receiver logic. Before reading WINDX, it must be updated to ensure that the most current value is read back. BINDX represents the last slot that can be used to receive frames. BINDX is set by software to the slot number of the last frame that is allowed to be received by the receiver hardware. The receiver hardware checks the WINDX pointer against the BINDX pointer. These two pointers are aligned to 32 byte boundaries. Each frame header received from the link is put into a separate header slot indicated by WINDX. In addition to the actual frame header received from the link, the receiver hardware also stores some extra information pertaining to the status of the received frame. Once the ESCON protocol engine receiver hardware detects that WINDX=BINDX+1 it will discard further incoming frames until BINDX is updated by the software.

User data or DIB information (i.e. to ultimately be written to disk) is stored either in the Frame Store buffer 30 or in the receive FIFO 34, depending on the frame type and instruction from the software. The DIB portion of Link-Control frames are always stored in the Frame Store buffer with the header. The header structure of a link control frame is illustrated in FIG. 4d. The DIB portion of Device frames is stored in the Frame Store buffer if a receiver control bit (RcvCtl.G) is equal to zero or in the receive FIFO if that receiver control bit (RcvCtl.G) is equal to one. The header structure of a device frame is illustrated in FIG. 4c. The definition of bits in the frame headers is set forth in Table I, FIG. 18. If the device frame DIB is stored in receive FIFO, the DSLT field, the three lower order bits in the data address (Data Adr) in the frame header will be 0×0. If the Device frame DIB is stored in the Frame Store the DSLT field will 0×1 through 0×7 depending on which of the 7 1k-byte slots the hardware put the frame into. All data written to the Receive Frame Store will have ODD parity.

The user data is effectively concatenated by stripping the frame/header information and storing the separated user data in the FIFOs. The user data is subjected to enhanced error detection as it moves through the pipeline(s) according to the invention. The protocol engine is configured to compute Cyclic Redundancy Check (CRC) error detection information on the separated (concatenated) user data after stripping the frame/header information. Thus although the CRC data transferred from the host with the data frame is stripped, i.e. not stored, CRC information is computed by the protocol engine for the separated user data at a point close to the physical interface delivering the data to the ESCON interface according to the invention. The integrity of the data can therefore be tested again as the data moves through the pipeline(s), i.e. from the FIFO to the assembler/disassembler 38.

Synchronization between the receive FIFO 34 and the assembler/disassembler 38 is ensured in the implementation according to the invention by checking the integrity of the simplified pointer management implemented upon entering the user data in the FIFOs. Effectively no pointer management is required, given the nature of the FIFO and that the first data entering the FIFO is the first data available from the FIFO. The order, and thus integrity, of data moving through the FIFO is checked by an enhanced parity mechanism. The user data is stored as bytes in the FIFO which is nine bits wide to facilitate a parity bit, as known in the art. This parity check mechanism is enhanced by a pseudo-random number generated in the linear feedback shift register in the protocol engine FPGA. The pseudo-random number is used to determine whether the parity should be odd or even for that byte when the data bytes enter the assembler/disassembler 38, i.e. exits the receive FIFO 34.

The enhanced parity mechanism effectively checks for any disparity between parity in the receiver logic of the protocol engine and the assembler/disassembler (which has substantially identical LFSR/enhanced parity circuitry). Thus longitudinal data synchronization can be maintained across the FIFO. In this implementation, the receiver logic alternately generates even/odd parity for each byte that is written to the receive FIFO based on the pseudo-random repeating pattern. The assembler/disassembler alternately checks the even/odd parity on each byte that it reads from the FIFO based on the pattern. The receiver logic and the assembler/disassembler will continue to run in this mode until an error is detected or a reset occurs. This enhanced parity mechanism is disabled after reset and can be enabled by asserting a signal RcvMM.EnDisp. If RcvMM.EnDisp is not set, i.e. RcvMM.EnDisp=0, then all data written to the FIFO will have odd parity.

The enhanced parity LFSR is implemented according to particular rules. The LFSR is initialized to a "seed" value at power-up and upon reset. After reset, the LFSR will be enabled only when bytes are written to or read from the receive FIFO 34. The LFSR implements a polynomial to generate the pseudo-random number, as known in the art, which is of a length so that the repeating pattern is matched to the depth of the FIFO. The pseudo-random number generated in this illustrative embodiment implements parity according to a repeating pattern wherein the first byte written into the receiver FIFO is even parity, the second byte is odd parity, the third byte is even parity, and the fourth, fifth and sixth bytes are odd parity. The LFSR will run continuously in this mode until a reset occurs or the receive FIFO is flushed by the assembler/disassembler. This ensures that the receiver logic in the protocol engine and the assembler/disassembler hardware are always in sync. A substantially similar mechanism is implemented to synchronize the assembler/disassembler 38 and the transmit FIFO 36 for data bytes being transferred therebetween, i.e. on a read operation.

The receiver logic is configured to generate interrupts to the respective line processor in the case of four types of events, defined as: Machine Check Interrupts: Frame Interrupts, Sequence Interrupts, and Stopped Interrupts. For all of the interrupts, a bit is provided to enable/disable or mask a specific source of the interrupt.

Machine Check Interrupt occurs when there is a data parity error on a write to any receiver register, or when there is an address parity error on a read/write to any receiver logic register. If a data parity error is detected on a write to any register, a Data Parity Error (DPE) interrupt is generated. Receiver status register bit RcvStat.DPE indicates this condition. The DPE interrupt and RcvStat.DPE are cleared when a receiver control signal RcvCtl.CMC is asserted to clear Machine Check Interrupts. If an address parity error is detected on a read or write to any register, an Address Parity Error (APE) interrupt is generated. There is no status bit in the receiver status register to indicate this condition. The APE interrupt is cleared when RcvCtl.CMC is asserted. Machine Check Interrupts may be indicative of a major malfunction in the ESCON interface and are always enabled.

Frame Interrupt occurs anytime a new frame is received by the ESCON protocol engine receiver logic and the receiver logic is enabled to generate frame interrupts, by a frame enable interrupt signal FrmEn. Thus Frame Interrupt is generated when a frame is received and FrmEn=1. Frame Interrupt is indicated in the receiver control register by RcvCtlFRI. In addition to the FRI bit in the control register, there is another bit in the Receiver Status register called RcvStat.FRM which independently indicates frame. RcvStat.FRM can be polled even if the interrupt is disabled.

Sequence Interrupt occurs when various sequences are detected in the data stream as the receiver logic monitors the data stream for ESCON protocol sequences. Sequence Interrupt occurs whenever any of the ESCON protocol IDLE Sequence, RSVD Sequence, Valid Sequences (UD, UDR, OFL, NOP), or Loss of Sync (LoS) are detected. Sequence Interrupt is affected by enables VsqEn, IdlEn, RsqEn, and LoSEn. It is generated when a Valid sequence is detected and VsqEn=1, when Idle Sequence is detected and IdlEn=1, when Rsvd Sequence is detected and RsqEn=1, or when Loss Of Sync is detected and LoSEn=1. It should be noted that during frame reception, the Idle sequence might be detected between frames. To avoid these interrupts IdlEn should be off when frame reception begins. It should also be noted that Sequence Interrupt will be active due to LoS as long as the LoS condition persists. The LoSEn should be turned OFF after software detects this condition, until sync is regained (which is indicated by the detection of the Idle sequence).

All of the Sequence Interrupt conditions are indicated by RcvCtl.SQI in the receiver control register. The current state of Sequence-reception and Synchronization can be read from the receiver status register (RcvStat) independent of the Interrupt enables. Receiver status register bits RcvStat.Seq and RcvStat.LoS indicate that the referenced Sequences and Loss of Synchronization conditions, respectively, have occurred some time in the past. A receiver status bit RcvStat.SQI, and RcvStat.Seq and RcvStat.LoS are cleared immediately after the RcvStat register has been read by the ESCON Processor. RcvStat.Seq and RcvStat.LoS are immediately updated with the current state of sequence reception and sync detection.

Stopped Interrupt is generated by the receiver logic if the receiver logic goes into the Stopped state due to a severe error, such as a Frame Store or FIFO Overflow condition. The receiver logic could also go into a Stopped state, causing a Stopped Interrupt, when a received frame is terminated by detection of Loss of Synch or a Start Of Frame delimiter, or when the frame is terminated by IDLE characters.

The Stopped Interrupt is enabled by asserting RcvMM.StpEn. It is generated when the frame reception logic goes into the STOPPED state and the enable is set to one (i.e. RcvMM.StpEn=1). As discussed hereinbefore, frame reception stops in the event of: a Frame Store Overflow; a FIFO Overflow during frame reception; a sequence RSVD during frame reception; a LoS detected during frame reception; and a SOF detected during frame reception.

A receiver status register bit, RcvStat.Stp, indicates the STOPPED state (i.e. whether the frame reception is stopped or not) and is independent of the state of RcvMM.StpEn. There is no status bit indicating that a Stopped Interrupt was generated. Since the only condition that causes Stopped Interrupt without Frame Interrupt is Frame Store Overflow, the software has to check a receiver status register bit RcvStat.FOVF to detect the Stopped condition if the Frame Interrupt status bit is equal to zero (RcvStat.FRI=0). The status bits RcvStat.Stp, RcvStat.FOVF, RcvStat.GOVF and RcvStat.ABN are cleared by asserting a receiver control signal RcvCtl.FSt.

The Stopped Interrupt remains active as long as the receiver is in the Stopped state. If the frame reception is not restarted when the STOPPED condition has been detected, then a signal to deactivate the Stopped Interrupt, RcvMM.DtpEn, should be off until the frame reception is restarted by the FrmStart command. The RcvMM.StpEn bit can then be asserted.

On Power Up or After Reset command, the receiver logic will be in an initial state wherein WINDX=BINDX=0, i.e. the header portion of the Frame Store will be empty. Also, Frame Reception will be in the Stopped state, and the receiver logic enhanced error detection mechanism will be off. All interrupts after power-up or reset are disabled, except the Machine-check interrupt. In order to reset the receiver logic, a Reset command, RSTO, is issued as an output signal from the line processor. The receiver Reset command RSTO is activated by the RESET instruction executed by the line processor.

Referring now to FIGS. 3b and 5a, each protocol engine 28 comprises transmitter logic 200 (illustrated in the block diagram of FIG. 5a) that is configured to receive information from the transmit FIFO 36 and the transmit frame DPR 32. The ESCON interface protocol engine frame transmission logic assembles ESCON frames for transfer to the host ESCON I/O according to the ESCON format. The transmit logic 200 comprises a transmit data path that effectively represents a convergence point for the transmit FIFO 36 and the transmit frame DPR 32. The transmit frame DPR is a source for header information and the transmit FIFO 36 is the source for user data coming from the GM and being transmitted to the host ESCON I/O over the ESCON link. A transmit state machine 202 controls the timing relationships and functionality, described in detail herein, required to build frames for transmission over the link in accordance with the ESCON protocol.

A nine bit data path from the transmit FIFO 36 and a nine bit data port from the transmit DPR 32 are provided as inputs to a transmit frame assembly MUX 204. The transmit state machine 202 implements transmit frame DPR control logic 206 and transmit FIFO control logic 208 which, among other things, control the transmit frame MUX 204 to selectively provide header information (and/or DIB information) from the transmit frame DPR 32 and DIB or user data information from the transmit frame FIFO 36 for convergence into frames on the transmit data path. The DPR control logic 206 also provides the chip enable signal(s) to the transmit frame DPR 32 for accessing the information therein. The transmit FIFO control logic 208 provides the enable signal(s) for the transmit FIFO 36, and receives an error signal (EF) indicative of a transmit frame FIFO error.

Basically, under control of the transmit state machine 202 the transmit FIFO is accessed to obtain user data for building device frames to transmit customer data to the host ESCON I/O. The transmit frame DPR is selectively accessed to obtain header information built in the DPR for constructing control and data device frames, or command and parameter information for constructing control device frames or link control frames. A transmit frame counter 210 generates an address pointer stored in an address pointer register 212 for the DPR 32 so that it sequences through the dual port ram and retrieves all the required header information for constructing a frame. For user data device frames, once the appropriate number of header bytes is counted/provided the transmit state machine 202 indicates the end of the header and starts to read the transmit FIFO. At that point the input select for the transmit frame MUX 204 is changed so that the data from the transmit FIFO follows the header information from the DPR onto the transmit frame data path.

The constructed frame moves through a buffer 214 in the data path. Data parity control logic effects parity checking of the assembled frame. Again, the enhanced parity mechanism is implemented in the form of a transmit linear feedback shift register (LFSR) 218 and parity checker 220 that are synchronized with substantially identical enhanced parity logic on the assembler/disassembler 38 to ensure integrity of the data through the transmit FIFO 36.

An ESCON CRC generator 222 accumulates a frame long ESCON CRC that covers the entire frame. Local CRC checker logic 224 calculates a local CRC associated only with the data (DIB) portion. The local CRC is not transmitted with the frame. The local CRC checker logic 224 accumulates the CRC on the data with an exclusive-or operation. The software compares the local ESCON CRC with a CRC generated at the other end of the pipeline at the assembler/disassembler, calculated over the same data portion.

Pacing, loopback and sequence logic (PLS) 226 implemented in the transmit logic FPGA provides control mechanisms to implement three different functions. The first is the implementation of pacing. Pacing generally relates to the rate of transfer of information or frames, and is specified in the ESCON protocol specification. In communicating with ESCON clients, the ESCON interface according to the invention implements pacing by this control logic mechanism that introduces appropriate pacing into the transmit data stream. Secondly, loopback control logic is implemented for diagnostic purposes, and allows a pipeline's transmit data path to be looped back to that pipeline's receiver channel. Thirdly, sequence logic provides for the generation of ESCON sequences for purposes of communicating at the physical level with the host ESCON I/O.

The transmitter logic 200 further includes a delimiter generator 228, that generates the delimiters for establishing the frame according to the ESCON protocol, as known in the art. The ESCON frame delimiters are generated for transmitted frames by the delimiter generator, which provides and formats delimiters for frames in accordance with the ESCON protocol as a function of the type of ESCON frame transfer in progress.

An output MUX 230 is controlled by the transmit state machine 202 to selectively pass the information components that constitute a frame for transfer. Initially, the output MUX passes the starting delimiter from the delimiter generator 228 (on a line "SED"). Following the starting delimiter in the frame the output MUX passes the header and the data (on a line "DD"). Then the output MUX 230 passes the CRC data which comes last in the frame (on a line "CR"), followed only by the end of frame delimiter (on the line SED). The output MUX 230 passes ESCON protocol sequence data (on a line "SD") from the sequence generator 226 for low level ESCON communications.

The data outputs from the output MUX are buffered for transmission to the HOTLINK transmitter 26. The transmit state machine 202 also issues control signals to the HOTLINK transmitter that handles the encoding of data and serialization for ESCON transmission.

The line processor 68 interfaces to the transmit state machine 202 in the ESCON protocol engine 28 through a plurality of registers in a CPU interface 232 in the FPGA, illustrated in TABLES VI–X, FIGS. 23–27. A two-stage pipeline comprised of a first pipeline register 234 and a second pipeline register 236 stage the line processor communications to the CPU interface in the transmit state machine. The pipeline is written by the software running on the line processor which defines the structure of frames by communicating with a transmitter frame register. Basically the line processor writes this register whenever there is a transmission that needs to be done. The CPU/line processor writes the first stage register 234 with fields that tell the transmitter hardware what the frame will be. Ultimately, the frame content, e.g. in terms of header content, data length and content, etc., is defined by the information written by the line processor into the CPU interface register(s). All of the parameters of the frame are provided in one access done by the processor and then the hardware takes care of the rest, and at the end generates an interrupt to indicate that the job is done. The frame pipeline stages allow the hardware to be in progress on data transmission and while that is happening it will allow the line processor to program the next transmit operation. In this manner any undue latency is avoided.

Again, the ESCON interface protocol engine frame transmission logic 200 assembles ESCON frames, including device frames with data, for transfer to the host ESCON I/O according to the ESCON format. That is, on reads from the ICDA data is retrieved from the disk array, stored in cache and ultimately transferred to the host ESCON I/O after being processed from the cache by incorporating the data into ESCON frames including frame headers as required by the ESCON protocol known in the art.

Figure 5B:
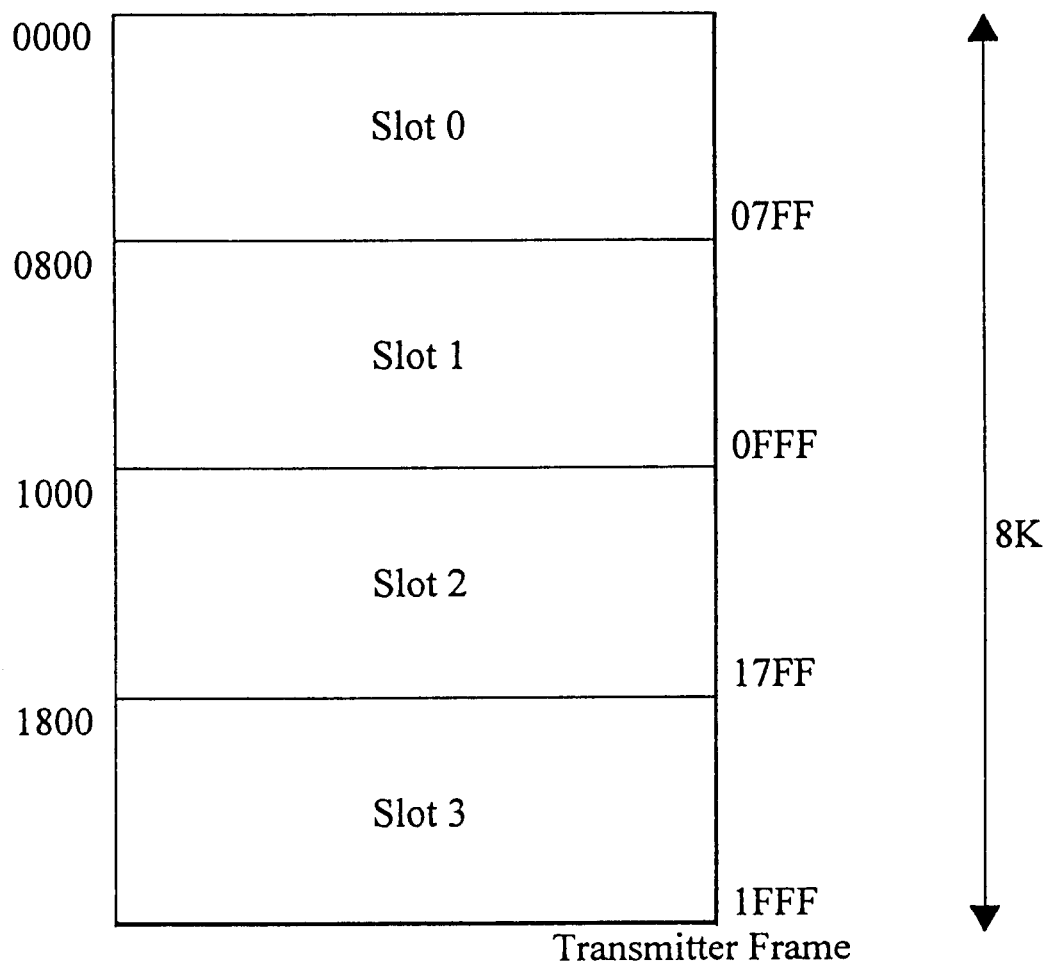
FIG. 5b is a memory allocation map for a transmitter frame store or dual port ram (DPR) in the ESCON interface of FIGS. 3a and 3b.

Frame headers for transmission are built in the transmit frame DPR 32 by the pipeline processor under software control. The transmit frame DPR 32 is 8k-bytes deep and is divided into four 2-kbyte sections (slots), as illustrated in FIG. 5b. Each slot holds only one frame at a time. Link Control Frames are built entirely in the transmit frame DPR 32. This means that both the frame header and user data or DIB portion are built by the software in contiguous address space within the given slot. The Link Control frame headers are built according to the structure illustrated in FIG. 5c. Device Frames are handled somewhat differently than Link Control Frames. Headers for Device Frames are always built in the transmit frame DPR 32, according to the structure illustrated in FIG. 5d. However, subject to program control, the DIB can be built either in contiguous transmit DPR space or the user data can be sent from the transmit FIFO 36.

The transmit FIFO 36 is a data buffer which collects DIB data retrieved from cache and then indicates when it has enough data to send out to the ESCON interface. If a bit in the transmitter frame register (TABLE VI, FIG. 23) is not set (i.e. XmitFrm.G=0), the transmit logic will retrieve the DIB portion from the transmit frame DPR 32. If the bit is set, (i.e. XmtFrm.G=1) the DIB will be retrieved from the transmit FIFO 36. It should be noted that all data read from the transmit DPR or Frame Store 32 will be checked for ODD parity.

Once the frame is assembled based on a DIB portion either in the transmit DPR 32 or the transmit FIFO 36, a command can be written to the transmitter frame register (XmtFrm Register), to initiate the frame transmission.

Upon initiation of frame transmission, the delimiter generator 228 of the transmit machine 202 will insert the appropriate starting/ending delimiters on the frame data. A local/data CRC is accumulated on the user data portion of the frame retrieved from memory (by the local CRC checker logic 224), and an ESCON CRC is accumulated by the ESCON CRC generator 222 for all frame data and appended onto the outgoing ESCON frame. After the frame is assembled it is passed through the output MUX or transmission multiplexor 230 and sent along with Hotlink control signals issued by the transmit machine 202 to the HOTLINKS transmitter 26 for transmission over the ESCON link.

The XmtFrm Register in the CPU interface 232 is implemented as the transmit pipeline with the first stage 234 and the second stage 236. This means that once a transmit operation has been initiated, the software running on the line processor can prepare the next outgoing frame in the transmit frame DPR 32. New command parameters can also be written in the XmtFrm Register while the previous transmit is in progress. The transmit logic monitors the pipeline and indicates when the transmit pipe is full by asserting a XmitPipeFull (XPF) bit in the transmitter status register (XmtStat, Table VIII, FIG. 25). The hardware also makes sure that the pipeline control software does not erroneously attempt to write the XmtFrm Register while the transmit pipe is full. If this occurs the hardware will prohibit the write operation and will proceed to assert the Frame Error interrupt.

When the current frame is being transmitted, the hardware checks if a new frame is ready for transmission by checking a next frame ready bit (NxtFrmRdy) in the transmit status register XmtStat. If the bit is set, the new frame transmission will begin immediately after the current frame is completed, except if a sequence transmission has also been activated, in which case, the sequence transmission takes priority.

When a frame error is detected during frame transmission, frame transmission is disabled after the current frame and the transmit pipe will not be advanced. Reading the XmtFrm register at this point will yield the command parameters for the frame that was sent in error. If there is a pending frame waiting in the transmit pipe it will not be sent because the pipe will automatically be flushed by the hardware. Frame transmission must then be re-enabled by clearing the frame error condition.

When the transmit pipeline is empty, as indicated by a bit set in the transmitter status register (i.e. XmtStat.XPE=1), then a single write to the XmtFrm register will start the frame transmission. A second write is not necessary to fill the transmit pipe to allow the first frame to be sent. Also, the pipeline processor software has the ability to flush the entire transmit pipeline. By asserting a control signal in the transmitter control register (XmtCtl.FXP, Table VII, FIG. 24), the pipeline processor software will instruct the hardware to flush the transmit pipeline.

The transmit logic 200 is configured to undertake pseudo frame transmission operations. Pseudo frame transmission means that the transmit logic or hardware goes through all of the actions involved in frame transmission, as described hereinbefore, except actually sending the frame data to the ESCON Hotlink transmitter chip 26 for transmission over the ESCON link. During this pseudo frame transmission operation the transmit logic will instruct the Hotlink transmitter 26 to send IDLE characters onto the ESCON link. The transmit logic will retrieve data from the appropriate buffers and accumulate a data CRC. Pseudo frame transmissions are used for on-line tests to ensure hardware function by checking CRC and status. Pseudo mode is enabled by setting a pseudo mode enable bit (XmtPLS.SDO=1) in the transmitter Pacing-Loop-Sequence register (See TABLE IX, FIG. 26). It should be noted that for normal operation the XmtPLS.SDO bit must be clear.

Communication over an ESCON link as known in the art generally requires a capability to perform sequence transmission over the link. The transmitter PLS logic 226 can be instructed to send a continuous stream of sequence data. To do this the transmitter Pacing-Loop-Sequence register sequence bit (XmtPLS.SEQ) must be loaded by software with a sequence identifier corresponding to the required sequence. If the transmit logic is transmitting a frame when the XmtPLS register is loaded with a valid sequence, the frame transmission in progress will complete normally before transmitting the sequence. If the software instructs the transmit logic to transmit a frame while a sequence transmission is in progress, the frame transmission is delayed until the time that the sequence transmission is stopped by the software, i.e. the transmit logic is instructed to send the IDLE sequence.

A flow control mechanism is provided in the transmit logic by implementation of a pacing count. The pacing count, effected by the PLS logic 226, facilitates changes in the rate of transmissions onto the ESCON link. The control software can specify the pacing count by writing to the register XmtPLS.PACING. The transmit logic uses this pacing count to insert IDLE characters between frames. Control software can also be used to instruct the transmit hardware to disregard the pacing count for certain frames. Asserting a transmit frame control signal XmtFrm.EnP will instruct the hardware to enable the pacing parameter. When pacing is not enabled/specified, a minimum of four IDLE characters are inserted between frames. When pacing is enabled the number of IDLE characters inserted is computed as:

$$4+2*(255-\text{Pacing Count})$$

The local CRC checker 224 in the transmit logic can accumulate a data CRC over all data bytes of device data frames coming from the transmit FIFO 36. The CRC value can, and should, be cleared under software control before data transfer begins, by asserting a clear CRC bit in the transmitter control register (XmtCtl.CCRC). The data CRC value can be read from the CRC checker by asserting a status bit in the transmitter status register (XmtStat.GCRC), at the end of the data transfer. If it is not cleared between frames the data CRC is accumulated over multiple frames. If the CRC is read while frame transmission is in progress, the value read is not guaranteed to be valid. To ensure a valid data CRC, it should be read after the frame transmission is complete and the transmit pipe is empty. This can be checked by verifying that the XmtStat.XPE bit was set when a FrameSent interrupt was generated. In this illustrative embodiment, there is CRC coverage only on the user data from the transmit FIFO 36. There is no CRC coverage on header or other data from the transmit frame DPR 32. Only parity protection is provided for header or other data coming from the transmit frame DPR 32.

As mentioned hereinbefore, the assembler/disassembler (38, FIG. 3, described in detail hereinafter), has substantially identical LFSR/enhanced parity circuitry as is implemented in the protocol engine 28. The enhanced parity circuitry (FIG. 5a, 218, 220) is used to ensure synchronization between the protocol engine 28 and the assembler/disassembler 38, for data transfers going in either direction (i.e. through either the receive FIFO 34 or transmit FIFO 36). In the case of data transfers from the ESCON interface according to the invention (i.e. to the host ESCON I/O), the transmit logic and the assembler/disassembler employ the enhanced parity mechanism to ensure longitudinal data synchronization across the transmit FIFO 36. In this implementation, the transmit logic alternately checks for even/odd parity for each byte that is read from the transmit FIFO 36 based on the same pseudo-random repeating pattern discussed hereinbefore with respect to the LFSR in receiver logic. The assembler/disassembler 38 alternately generates even/odd parity on each byte that it writes to the transmit FIFO 36 based on the same pattern. The transmit logic and assembler/disassembler will continue to run in this mode until an error is detected or until the assembler/disassembler flushes the transmit FIFO. This enhanced parity mechanism is disabled after reset and can be enabled by asserting XmtPLS.EnDisp. If XmtPLS.EnDisp is not asserted (i.e. XmtPLS.EnDisp=0), then all data read from the transmit FIFO will be checked for odd parity. It should be noted that all data read from the transmit frame DPR 32 will be checked for odd parity.

The transmit logic is configured to generate interrupts to the respective line processor in the case of four types of events, including a Normal Interrupt; Access Error Interrupts; Frame Error Interrupts; and Machine Check Interrupts.

The Normal Interrupt on the transmit side is a FrameSent interrupt which is an indication to the line processor that the transmit logic has successfully sent an outgoing frame as instructed by the line processor. This condition is indicated by a frame sent status bit in the transmitter status register (i.e. XmtStat.FS=1). The interrupt is enabled by asserting a control bit XmtCtl.FSEn. XmtStat.FS is cleared automatically by the hardware when the XmtStat register is read.

Two types of access error interrupts are generated when requests are made of the transmit logic which can not be serviced. An illegal write interrupt (IllegalWrt) is generated if there is an attempt to write to the XmtFrm Register requesting that a new frame transfer be undertaken while the transmit pipe is full. The IllegalWrt interrupt is indicated in the transmit status register by setting a bit XmtStat.IW=1. An illegal request interrupt (IllegalRqst) is generated if there is a request to start a frame transmission while an ESCON sequence transmission other than IDLE is in progress. The IllegalRqst interrupt is indicated by setting a transmit status bit XmtStat.IRQ=1.

Each of these access error conditions will also set the frame error status bit XmtStat.FE=1. Before a new frame transmission can be initiated, the interrupt and status bits must be cleared by software asserting XmtCtl.CFE. The Access Error Interrupts are enabled by asserting an enable XmtCtl.FEEn.

Several kinds of frame error interrupts are generated to indicate error conditions related to various aspects of transmit frame processing.

A frame store or transmit DPR parity error, FSParErr, is generated to indicate that the transmit logic has detected a parity error while reading the transmit frame DPR 32. Such an error is indicated by a set transmitter status register bit (XmtStat.FPE=1).

A transmit FIFO parity error, GFIFOParErr, is generated upon an indication that the transmit logic has detected a parity error while reading the transmit FIFO 36. Such an error is indicated by a set status register bit (XmtStat.GPE=1).

A frame store or transmit DPR overflow condition, FrameOvf, is generated upon an indication that the transmit logic has detected a case where an outgoing frame has exceeded the maximum size of 1035 bytes. Such an error is indicated by a set status register bit (XmtStat.OVF=1).

A transmit FIFO empty error condition, XmitFIFOEmp, is generated upon an indication that the transmit logic detected that the transmit FIFO became empty while DIB data was being retrieved from it. Such an error is indicated by a set status register bit (XmtStat.GMT=1).

If any of the above Frame Error conditions occur, the current frame transmission is ended with an abort delimiter and the transmit pipe (if loaded) will not advance. Each of these Frame Error conditions will also set the Frame Error status bit XmtStat.Fe=1). Before a new frame transmission can be nitiated, the interrupt and status bits must be cleared by oftware asserting the control bit XmtCtl.CFE. The Frame Error nterrupt is enabled by asserting XmtCtl.FEEn.

The transmit logic issues Machine-Check Interrupts indicative of significant hardware errors, in the form of data parity errors and address parity errors. A data parity error, DatPE, is generated upon an indication that a data parity error was detected during a write to one of the transmitter logic registers. This condition is indicated by XmtStat.DPE. This interrupt and XmtStat.DPE can be cleared by asserting XmtCtl.CMC. This interrupt is not maskable (i.e. it is always enabled).

An address parity error, AddrPE, is generated upon an indication that incorrect address parity was detected during a read or write to/from one of the transmit logic registers. There is no status bit to indicate this condition. This interrupt can be cleared by asserting XmtCtl.CMC. This interrupt is not maskable.

On Power-Up and after Reset, the transmit logic comes up in the following state:

transmit logic is transmitting the Offline sequence;

XmtStat.XmitPipeFull=0;

XmtStat.XmitPipeEmpty=1;

Enhanced Parity Disparity checker is OFF;

XmtPLS.EnDisp=0;

All interrupts are disabled except for Machine-check.

The ESCON interface transmitter and receiver logic according to the invention provide a mechanism by which pipeline processor software can inform the protocol engine hardware that it is busy and, as a result, the hardware will hold off any connection requests from the host. In this scenario, the receiver logic 100 will look for any incoming connection frames from the host ESCON I/O and then instruct the transmitter logic 200 to respond to these connection frames by returning a link-busy frame to the host. It should be noted that the receiver logic will not buffer the incoming connection frames and will not interrupt the pipeline processor. This behavior will continue until the software instructs the hardware to return to normal operation.

A BUSY bit is provided in the receiver mask/miscellaneous register (RcvMM Register, Table III, FIG. 20). This bit is READ/WRITE. Setting this bit tells the hardware to begin returning link-busy frames in response to incoming connection requests. Clearing this bit tells the hardware to return to normal operation. The CPU interface is asynchronous to the ESCON clock. Therefore, there is no guarantee that once the BUSY bit is set, frame interrupts will cease. There may be cases when one more frame is received and buffered after the BUSY bit is set.

Assembler/Disassembler

Referring now to FIGS. 3 and 6, the assembler/disassembler 38 is interposed between the FIFOs (transmit and receive) 34, 36 and the SDIO bus 40 connected to the buffer DPR 42 that receives user data going to/from Global Memory (GM), through the EDAC. The primary role of the assembler/disassembler 38 is the actual assembly and disassembly of data moving along a pipeline to/from GM. On a write to GM the user data that comes from the receive FIFO 34 is 9 bits wide of which 8 bits is data, plus one enhanced parity bit. The receive FIFO data is assembled by the assembler/disassembler on a write into 64 bit memory words plus 8 bits of parity. On a read from GM, the 72 bit memory data, again a 64 bit memory word and 8 bits of parity, is disassembled by the assembler/disassembler 38 into 9 bit wide data, an 8 bit data byte plus one bit of parity, for storage in the transmit FIFO 36. The assembler/disassembler 38, in this illustrative embodiment functions to handle assembly and disassembly selectively for two pipelines. That is, each assembler/disassembler 38 services two pipelines each comprised of respective transmit and receive FIFOS, respective transmit and receive frame DPRs, respective protocol engines and respective transmit and receive HOTLINK devices.

The assembler/disassembler 38, as illustrated in greater detail in FIG. 6, comprises a FIFO machine 300 that interfaces with the receive FIFO 34 via a 9 bit wide receive FIFO data bus (RFDAT) and with the transmit FIFO 36 via a 9 bit wide transmit FIFO data bus (TFDAT). The FIFO machine 300 monitors the status of the FIFOs and determines if it should be reading the receive FIFO 34. If the receive FIFO 34 is empty, on a write to GM, the FIFO machine will stop reading. If the FIFO machine 300 is writing the transmit FIFO 36, on a read from GM, and the transmit FIFO becomes full, the FIFO machine will stop writing the transmit FIFO. The FIFO machine 300 basically handles all the protocol for transferring data in and out of the FIFOs 34, 36.

The assembler/disassembler 38 includes a synchronous memory 302 and associated counters 304. The FIFOs machine 300 also handles the protocol for transferring data in and out of the synchronous memory 302. On a write to GM, the FIFO machine 300 assembles 72 bit data and transfers it to the synchronous memory 302 through a memory multiplexor (MUX) 306 to an input data bus (IDAT). The 72 bit global memory data bus (ODAT) ultimately destined for the SDIO bus 40. On a read from GM, the synchronous memory 302 receives the 72 bit global memory data over the SIDO bus 40 through the memory MUX 306. The synchronous memory 302 effectove;u dosasse,b;es tje global memory data by transferring it to the FIFO machine 300 a byte at a time over a nine bit wide bus (ZDAT), transferring 8 bits of data and one parity bit.

The assembler/disassembler 38 also contains a counter mechanism that counts the amount of data that is read into and out of the FIFOs. When the data transfer starts, the line processor can set how much data will be transferred to memory and from memory in and out of the FIFOs, which allows the entire data transfer to effectively run independent of the line processor. When the transfer count is exhausted/reached, the pipeline hardware can flush the data to memory and initiate end of transfer checks. The data can be tagged with the additional error detection and information, i.e. control status information including CRC information can be updated and/or appended to the data progressing through the pipeline. This effects an additional level of error detection by ensuring at the assembly/disassembly part of the transfer that all of the expected data was transferred into or out of the FIFO (in agreement with a count in the Middle Machine described hereinafter). Other mechanisms in the pipe, e.g. the Middle Machine, can then be most expeditiously informed whether a complete transfer was effected.

The counters machine 304 implements the counter mechanism in the form of pointers for the synchronous memory to facilitate transfers in and out of the synchronous memory 302 (i.e. into and out of the FIFOs 34, 36 via the FIFO machine 300). The counters machine 304 includes a read pointer (RPTR) and a write pointer (WPTR) issued to the synchronous memory as a function of the operation being performed. The read pointer and the write pointer are each actually used in two instances on a read and two instances on a write. The read pointer is used when data is being transferred from the SDIO bus to the synchronous memory and also when data is being transferred from the synchronous memory to the FIFO machine. The write pointer is used when data is being transferred from the FIFO machine to the synchronous memory and again when data is being transferred from the synchronous memory to the SDIO bus.

In the assembler/disassembler 38, the synchronization between the memory ports (i.e. read port(s): IDAT/ZDAT, and write port(s): IDAT/ODAT) has to be tightly controlled. The addressing to the read port has to be very tightly coupled to its counter/pointer and the write port has to be very tightly coupled to its counter/pointer in order to maximize performance. So the counters themselves and the pointers that they define are specialized, as a read pointer or a write pointer, as a function of their selective operation in reading data from the SDIO into the synch memory or reading data from the synch memory into the FIFO machine, or writing data from the FIFO machine to the synch memory or writing data from the synch memory to the SDIO. The pointers get loaded with initial values at the beginning of the data transfer. The initial values and the operation being performed, i.e. a read from GM or a write to GM, determines whether the read pointer is acting as a pointer for reading data from the SDIO into the synch memory or reading data from the synch memory into the FIFO machine, and whether the write pointer is acting as a pointer for writing data from the FIFO machine to the synch memory or writing data from the synch memory to the SDIO bus 40.

The assembler/disassembler 38 includes an SDIO machine 308 that is primarily a protocol machine to run the protocol on the synchronous SDIO bus 40. The SDIO machine 308 communicates with the lower machine 46, described in detail hereinafter, to handle data transfers to the global memory or from the global memory. The protocol in both directions is substantially the same, but the placement of data is different.

A processor machine 310 in the assembler/disassembler 38 incorporates registers that provide a pathway for the respective line processor to get access into the data string, and allow the processor to access the GM, effectively replacing the known MDR pipeline. The processor machine 310 also implements a processor interface, in the form of an assembler/disassembler control register illustrated in Table XI, FIG. 28 and an assembler/disassembler status register illustrated in Table XII, FIG. 29. The processor interface in the processor machine(s) 310 enables line processor(s) 60 and/or the service processor 70 to communicate with a channel to/from GM.

The assembler/disassembler command register (Table XI, FIG. 28) essentially includes information indicating the number of bytes involved in a transfer, and a bit that is set by the line processor to indicate whether a transfer is a read or a write (DIR). A command bit must be set to enable any transfer (EnXfr).

The assembler/disassembler command register includes bits relating to the type of error checking to be performed on data passing between the assembler/disassembler 38 and the FIFOs 34, 36. A command register bit can also be set to indicate whether enhanced parity (EnDSP) is implemented on transfers.

The assembler/disassembler 38 in each pipeline implements in the FIFO MACHINE a substantially identical enhanced parity mechanism as implemented in the protocol engine for use when receiving data from FIFOs (on a write operation to GM), and transferring data to FIFOs (on a read operation from GM). The enhanced parity mechanism in the assembler/disassembler, like the one in the protocol engine, is configured to generate a pseudo-random number for each data byte.

As discussed, the FIFO's are 9 bits wide with the ninth bit used as parity. However, using the ninth bit as parity does not protect against getting the same byte of information twice. In addition to the parity that is written into each byte, the parity is selected as even or odd based on the order of the bytes. A linear feedback shift register (LFSR) is used to generate a pseudo random pattern. The LFSR, in both the assembler/disassembler 38 and the protocol engine 28 is a hardware implementation of a mathematical polynomial that is implementation specific. The pseudo random pattern, as described hereinbefore, is used to select whether the parity is even or odd for that particular bite.

This enriched parity is an additional check which protects against the FIFOs making a gross internal error, perpetuating an addressing error or just sending the wrong piece of data. If the pseudo random pattern does not match it will show up as a parity error and the transfer can be stopped or the data can be transferred on another channel. The enriched parity provides a way to detect if there is a failure along a pipeline, and facilitates invocation of diagnostics to determine the source of the failure.

The enhanced parity generated by the protocol engine 28, accompanying data transferred from the FIFO (on a write to GM) is exclusive-ORed with LFSR data generated by the enhanced parity circuitry in the assembler/disassembler 38 (which effectively reproduces the original parity stored with the data in the FIFO). The exclusive-OR operation effectively checks the FIFO parity information against the assembler/disassembler generated parity.

If the pointers in the FIFOs become disjoined so that data is essentially being read out-of-sequence from the FIFOs, the condition will be detected in a significant number of the cases as it shows up as a parity error in either the protocol engine or the assembler/disassembler. For example, addressing errors in the FIFOs will manifest themselves as parity errors in the assembler/disassembler 38 if the data coming from the protocol engine 28 comes through the FIFOs with opposite parity than what is computed/expected at the assembler/disassembler 38 (on a write to GM). Likewise, addressing errors in the FIFOs will manifest themselves as parity errors in the protocol engine 28 if the data coming from the assembler/disassembler 38 comes through the FIFOs with opposite parity than what is computed/expected at the protocol engine 28 (on a read from GM).

The enhanced parity is in addition to the security provided by the CRC that is accumulated on both sides of the FIFO, as described hereinbefore. An assembler/disassembler command register bit can be set to indicate whether a CRC is to be tacked onto the end of the data transfer. Eight bits in the assembler/disassembler command register (Acrc0–Acrc7) indicate the CRC word on the end of the data transfer. The assembler/disassembler calculates a running CRC on the data stream. This data is byte wide and can be inspected in the assembler/disassembler status register (Table XII, FIG. 29). The CRC is only reset by direct command (reset CRC). The CRC is never passed into the FIFO stream. The CRC can be automatically inserted into the data stream on a write (With CRC), or zeroed with an additional stream data byte on a read. The zeroing of the CRC can allow the automatic checking of the CRC by producing a resultant zero in the CRC on a successful CRC check.

The command register CRC bits can be used to provide a seed value for the CRC. That is, the CRC value can commence from a starting point other than zero. It may be desirable for each processor on an interface card to seed the CRC with a different value so that distributed seed values provide a difference in the CRC that facilitates determination of the line that is doing the transfer.

The assembler/disassembler 38 essentially handles all datapath transactions between the protocol engine 28 transmitter logic, the protocol engine 28 receiver logic, the service processor SCSI ASIC 71, the line processor data bus and the buffer Dual Port RAM 42. The assembler/disassembler 38 for each data pipeline or channel is connected between the FIFOs 34, 36 and the buffer DPR 42 (and an MDR between the SCSI ASIC 71 and the buffer DPR 42 for the Service Processor 70).

There are four possible data paths for utilization of each assembler/disassembler 38: the ESCON data path between the protocol engine 28 and the DPR 42 (referred to as the ADT path for "Automatic Data Transfer"); two DMA data paths for the line processor in each line to directly access DPR for Direct Memory Access operations (DMA0 AND DMA1), and one data path for the line processor to access the top of the FIFO (Top of FIFO).

Generally, Automatic Data Transfer (ADT) is accomplished by programming using the Middle Machine's Address Pointer, Command, and Status Registers (discussed in detail hereinafter), and programming using the ESCON receiver registers (Tables II–V, FIGS. 19–22) and/or the ESCON transmitter registers (Tables VI–X, FIGS. 23–27). The transfer will be initiated when the assembler/disassembler command register (Table XI, FIG. 28) is programmed with the transfer count number (XC[0–15], in bytes, the direction of transfer (DIR), and when the Enable Transfer (EnXfr) bit is set.

The assembler/disassembler according to the invention is configured to assemble or accumulate burst data, as opposed to moving one piece of data at a time, for transfer. Thus when a threshold quantity of data is accumulated for an efficient transfer, the assembler/disassembler passes the burst of data along the pipeline.

An ADT Write is a transfer from the ESCON protocol engine (through the receive FIFO 34 and assembler/disassembler 38) into the DPR 42. In terms of functionality, the assembler/disassembler 38 assembles the data into memory words (8 data bytes plus one parity byte) once data is written from the ESCON receiver logic in the protocol engine 28 to the receive FIFO 34. When the assembler/ disassembler 38 has assembled 8 memory words, it will send a request for transfer to the Middle Machine 48. When the requesting pipe receives an acknowledge from the Middle Machine arbitrator (on the Lower side), the assembler/ disassembler 38 will begin the data transfer burst to DPR 42.

An end of transfer signal (EOT) will automatically be sent with the last memory word transferred indicating to the Middle Machine 48 that the current burst from the assembler/disassembler 38 to the DPR 42 is complete. EOT indicates that the assembler/disassembler transfer count has expired. The Middle Machine will flush all remaining data from the DPR 42 to Global Memory upon receiving the EOT signal. The assembler/disassembler will continue reading data from the receive FIFO 34 and bursting the assembled data to DPR until its transfer counter has expired. At this time, a Command Complete (CC) indication will be written to the assembler/disassembler status register (Table XII, FIG. 29), indicating that the assembler/disassembler is idle.

An ADT Read is a transfer from the buffer DPR 42 to an ESCON channel. The assembler/disassembler 38 will request a transfer from DPR to the assembler/disassembler. Once the requesting pipe has received an acknowledge from the Middle Machine arbitrator (Lower side), the assembler/ disassembler will begin the data transfer burst from the DPR. Data is disassembled and written byte-wise to the transmit FIFO 36. The assembler/disassembler 38 will continue reading memory words from the DPR 42 and writing them byte-wise to the transmit FIFO 36 until the assembler/ disassembler's transfer counter has expired. At this point, an assembler/disassembler interrupt will be generated to the line processor, and Command Complete will be written to the assembler/disassembler status register.

There are two DMA (MDR) pipes per line processor assembler/disassembler: DMA0 and DMA1. The DMA pipes effectively permit the line processors direct access to GM for writing and reading through the buffer DPR 42. Line processor DMA Writes are handled by programming the Middle Machine's Address Pointer, Command, and Status Registers, writing the assembler/disassembler's DMA0 (or 1) MDR LSW (Least Significant Word) Register (not shown) followed by a write to the DMA0 (or 1) MDR MSW (Most Significant Word) Register (not shown). Writing to the MDR MSW Register causes the assembler/disassembler to request for transfer to the Middle Machine. When the pipe receives an acknowledge, the assembler/disassembler will transfer the data to the buffer DPR 42. There are two end of transfer (EOT) addresses in the assembler/disassembler per DMA pipe. Writing to a basic EOT address indicates that the assembler/disassembler has completed the line processor DMA transfer. Writing to an MDR-with-auto-EOT address in the assembler/disassembler will force EOT to be automatically asserted when transferred to the MM (along with the data). This will cause the MM to initiate a transfer between the line processor and Global Memory for each DMA transfer.

DMA reads are initiated by programming the Middle Machine with the address, direction of transfer, and length. Then, the data can be transferred to and read from the corresponding assembler/disassembler MDR LSW and/or MSW register. A read from the MSW register will fetch the data and return the MSW of the data, and a read from the LSW register will return the LSW from the last fetch. The LSW need not be read if the LSW of the data is not needed. At the completion of the line processor DMA read, the Middle Machine will return an interrupt that may occur before the last data is read from the MDR register. The line processor can receive errors in the form of parity errors, Middle Machine exception, or timeout. A timeout is generally the result of an error in the Middle Machine—either a reported error or the transfer length was incorrectly programmed.

A Top of FIFO (TOF) function, implemented using a Top of FIFO register in the assembler/disassembler, allows the software running on the line processor to pick off data from the head of the received stream (i.e. at the top of the receive FIFO). Similarly, data can be placed into the tail transmit stream (i.e. at the bottom of the transmit FIFO), via a Bottom of FIFO register implemented in the protocol engine transmitter logic. The positioning of this data is only relevant while the assembler/disassembler is idle. Accessing the TOF register while the assembler/disassembler is operating may produce undesired results. If the transmit FIFO is full when data is written to the TOF, the data is dropped. If the receive FIFO is empty when data is read from the TOF, the data is returned invalid. If disparity or enhanced parity is enabled, a write to full FIFO or read from an empty FIFO will cause subsequent parity failures in the FIFO data stream if the FIFO is not flushed to synchronize the stream.

A PAD bit in the assembler/disassembler command register (Table XI, FIG. 28) can be set to nullify the transfer of data to and from the FIFOs 34, 36. This feature can be used to generate a CRC calculation or to check over a Global Memory address range, or to fill a range in Global Memory with zero data. For example, the assembler/disassembler 38 on a write operation can fill or pad a portion of the data transfer with a pad byte. Similarly, the whole memory or a block of memory can be filled with a known value.

The pad feature is important for formatting a CKD frame according to a format command from the host, which requires that the data field be formatted to a given size. If the line processor during a write operation needs to write that data field with less than what was formatted, the ICDA must accommodate the transfer by filling up the rest of the data field with zeros. Such an operation is defined by the IBM ESCON stack called the "Mstack". To accommodate such an operation the software running on the line processor can be configured to program the assembler/disassembler with the size of the data transfer and then once that data transfer completes, it will then fill the remainder of the required data with pad data.

In such a transfer the pad operation facilitates determination of a CRC on the partial transfer, i.e. on the actual customer data, by not transferring the CRC at the end of the actual data. Rather, the assembler/disassembler 38 stores the CRC that was transferred at the end but it does not transfer it to memory. When the transfer is completed to memory with the pad data to fill the required data field, the assembler/ disassembler will transfer all the zeroes, which do not affect the CRC, and then at the end of the required size data block it will append the CRC.

On a read the pad operation may also be implicated, as the line processor may not ask for the whole record, for example it may request only the first 1k of the record. In order to do the error detection, the CRC is at the end of the record. Thus after the 1k is read, the rest of the data is screened through just to calculate out the CRC to make sure that, overall, the CRC is right. That is, on a read operation when the pad bit is set, the assembler/disassembler keeps reading the data beyond that which is requested by the line processor, but it does not put it into the FIFO. The assembler/disassembler just calculates up the CRC and checks the CRC at the end to return good or bad status based on how it ended up. In this manner the assembler/disassembler does a lot of the processing that in known systems is done all by the CPU. In order to do this in an existing system, the CPU typically has to do DMA reads and go through the entire memory itself to calculate the CRC and make sure it was right for the rest of memory to the end record. The pad operation in the assembler/disassembler according to the invention offloads some of this operation into the hardware.

The Buffer Dual Port Ram

The buffer dual port ram (DPR) 42 (best illustrated in FIG. 3a), is configured to receive data for buffering read operations from and write operations to the GM. Data is transferred between the assembler/disassembler and the buffer DPR efficiently with a maximum burst size of sixteen, 64 bit memory words. The DPR is used to buffer and speed-isolate the different transfer rates of the backplane to/from GM and various data paths on the ESCON interface circuit board. Data transfers between the assembler/disassembler and the buffer DPR pass through Error Detection And Correction circuitry (EDAC) 44 implementing a modified hamming algorithm as known in the art. In this illustrative embodiment, the DPR is divided into sixteen 2k entities. Each of those 2k are divided into 128 bytes of 32×8 bytes.

Data Transfer State Machines

The plurality of state machines comprising the data transfer state machines are arranged into three functional units, the Upper Machine 50, the Middle Machine 48 and the Lower Machine 46, as illustrated in FIGS. 3a and 7. These state machines facilitate movement of user data between the buffer DPR 42 and the Global Memory (GM, not shown).

Generally, the Middle Machine 48 controls all data movement to and from the GM. Although not directly in the data path, it is responsible for coordinating control between the various elements that comprise the data transfer channels as described. The Middle Machine is interconnected to the Upper Machine 50 and Lower Machine 46, and to various global memory and line processor interface, address and control elements.

The Middle Machine 48 provides control and coordination between the Upper and Lower sides of the buffer DPR 42. The Lower Machine 46 connects to the assembler/disassembler 38 of each pipe and controls the EDAC 44. The Upper machine 50 connects to the backplane, which in turn connexts to Global Memory. The actual data transfers between the buffer DPR 42 and GM are controlled by the Upper Machine 50 and Lower Machine 46.

One the Lower side, the Lower Machine handles the handshake protocol between the assembler/disassembler, the EDAC and the DPR. When an assembler/disassembler needs to transfer data, it sends a request to the Middle Machine. The Middle Machine arbitrates among the plurality of Lower side requesters, and begins a Lower grant cycle. The Middle Machine provides the number of the pipe that won the arbitration (the "won pipe number"), along with a Dual Port RAM pointer to the Lower Machine. When the Lower Machine accepts this data, it sends an acknowledge back to the assembler/disassembler which won the arbitration, and begins a data transfer between the assembler/disassembler and the DPR, through the EDAC. Upon completion of the transfer, status and ending pointer information are returned to the Middle Machine.

Similarly, the Upper Machine implements the backplane protocol to accomplish data transfers between the Global Memory connected to the backplane and the buffer DPR on the ESCON interface according to the invention. The Middle Machine determines a pipe that needs servicing. When the Middle Machine finds a candidate it provides the won pipe number along with a DPR pointer to the Upper Machine. The Upper Machine requests backplane access and provides the address, command and transfer length to the backplane. When the data transfer phase begins, the Upper Machine manages the DPR address and control signals. Upon completion of the transfer, status and ending pointer information are returned to the Middle Machine Status Register.

The Middle Machine 48, as generally described provides control and coordination between the Upper Machine 50 effecting the transfer protocol between the buffer DPR 42 and the backplane (GM), and the Lower Machine 46 effecting the transfer protocol between the buffer DPR 42 and the assembler/disassembler 38. As described, the Middle Machine is responsible for coordinating transfers between the upper and lower sides of the buffer DPR 42.

Figure 8:
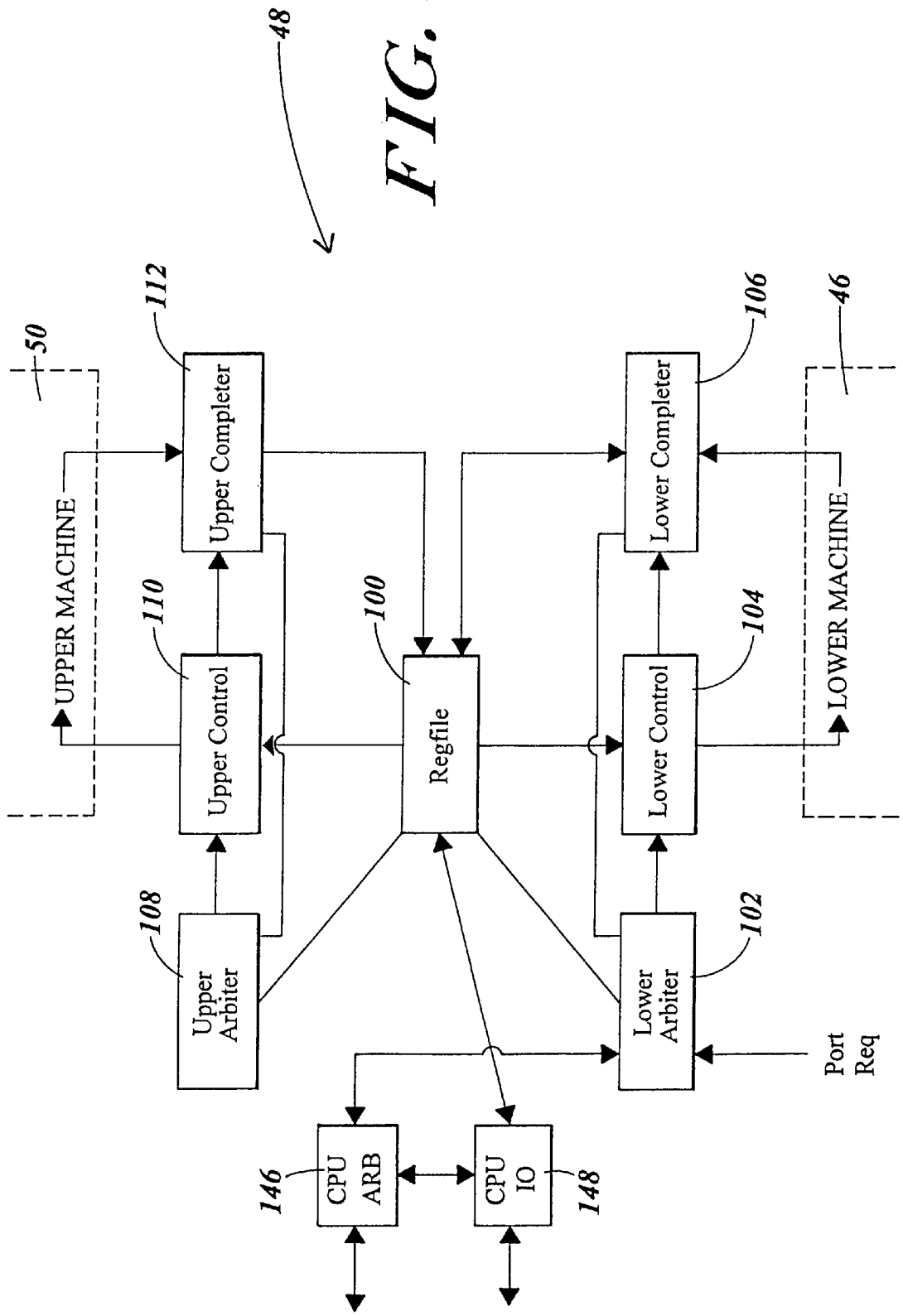
FIG. 8 is a block diagram of a middle machine in a plurality of data transfer state machines according to the invention.

The Middle Machine 48 itself comprises a register file 100, and a plurality of state machines, as illustrated in FIG. 8. The register file 100 contains four registers per pipeline. The registers include a primary address register Table XIII, FIG. 30 a secondary or mirror address register Table XIV, FIG. 31 a command register Table XV, FIG. 32 and a status register Table XVI, FIG. 33. Each line processor effecting a transfer has its respective set of registers in the register file that will be affected by the processor undertaking a transfer.

Generally, control over the data transfers is effected in these registers in the register file 100 in the Middle Machine. The transfers will ultimately be carried out by upper and lower machine protocols, however, these four registers are the means of communication between the middle machine and the upper and lower machines for controlling the data transfer. The register file in the Middle Machine, for each pipe, maintains a transfer counter which is used to pace a transfer and to calculate appropriate backplane burst sizes. The Middle Machine register file is further used for error management. When an error occurs during a transfer (either Upper or Lower), the Middle Machine will collect status from the Upper and Lower machines, appropriately post the error condition in the Status Register for the pertinent pipe, and disable the current transfers. There are some ancillary registers, not shown, used for interrupt status or chip configuration, which is done on a global basis.

In an ESCON write situation data is transferred from the host ESCON I/O to global memory. The first thing the software does is clear the status register for the appropriate pipe by writing zero to the status register. Secondly, the software programs the middle machine's primary address pointer with a global memory address. It determines that there is a portion of memory allocated to the data transfer and places that address in the primary address pointer. The second part of the information provided to the Middle Machine may be a mirror pointer.

When the address is written into the address register the hardware makes a copy of the lower 5 bits of the address register into the lower 5 bits of the upper and the lower pointer which are contained in the status register. Therefore, bits 25 through 31 of the address pointer are copied into the upper pointer bits 3 through 7 and lower pointer bits 3 through 7. Then the most significant bits of the upper and lower pointer are set to zero. When all the transfers are done the hardware will check to make sure that the final lower 5 bits of the address pointer, the final 5 bits of the upper pointer and the final 5 bits of the lower pointer are all the same. If they are not all the same then something miscounted, too high or too low, or something is still not complete. This provides a simple hardware check which is used as a double check against counting faults, hardware faults, misclocks or the like.

The command register in the register file 100 is written to contain a transfer length which is the number of double words, i.e. 72 bit entities which are to be transferred. It will also contain a set of command bits which will describe things which are common to the global memory protocol such as whether it is a read or a write, whether or not it is a lock operation or whether it is a service cycle. There are twelve command bits, bits 20 through 31. These writes to the register file 100 in the middle machine 48 prepare for the transfer.

Again, the Middle Machine is the entity which controls all data movement to and from the global memory. The Middle Machine provides control and coordination between the Upper and Lower sides of the DPR.

On the lower side of the DPR, when an Assembler/Disassembler 38 needs to transfer data, it sends a request to the Middle Machine. The Middle Machine arbitrate among the 16 Lower side requesters, and based on its pointer processing logic, it begins a Lower grant cycle. The Middle Machine will provide the won pipe number along with a DPR pointer to the Lower Machine. When the Lower Machine 46 accepts this data, it sends an acknowledge back to the assembler/disassembler 38 which won the arbitration, and begins a data transfer between an assembler/disassembler and the DPR. The Lower Machine 46 will provide the DPR address and monitor the EDACs to determine if there are any parity errors (on a write), or any single or Multi-bit errors (on a read). Upon completion of the transfer, status and ending pointer information are returned to the Middle Machine. The ending status and pointer information are stored back into the status register in the register file 100.

Very similarly, on the upper side of the DPR the Upper Machine implements the backplane protocol to accomplish data transfers between global memory and the ESCON board. The Middle Machine sequentially polls the internal Command registers of all 16 pipes to determine if any pipe needs servicing. This is indicated by the Command Register having both the IEC and EC bits set. When the Middle Machine 48 finds a candidate (and the Lower/Upper pointer processing logic allows the transfer), the Middle Machine will provide the won pipe number along with a DPR pointer to the Upper Machine 50. The Upper Machine will then request backplane access, and provide the address, command and transfer length to the backplane. When the data transfer phase begins, the Upper Machine 50 manages the DPR address and control signals. Upon completion of the transfer, status and ending pointer information are returned to the Middle Machine. The ending status and pointer information are stored back into the Status Register for the transferring pipe in the register file 100.

The Middle Machine maintains the transfer counter in the register file, which is used to pace a transfer and to calculate appropriate backplane burst sizes. With this information, and in conjunction with hardware End of Transfer (EOT) signaling, the Middle Machine is able to handle any burst size from 1–32 Dwords, misaligned memory transfers, and "hanging" EOT cycles (auto-EOT). The Middle Machine is further responsible for error management. When an error occurs during a transfer (either Upper or Lower), the Middle Machine will collect status from the Upper and Lower machines, appropriately post the error condition in the Status Register, and disable the current transfers. Errors which invoke this logic include Parity Errors, EDAC error, and count misses.

Figure 9:
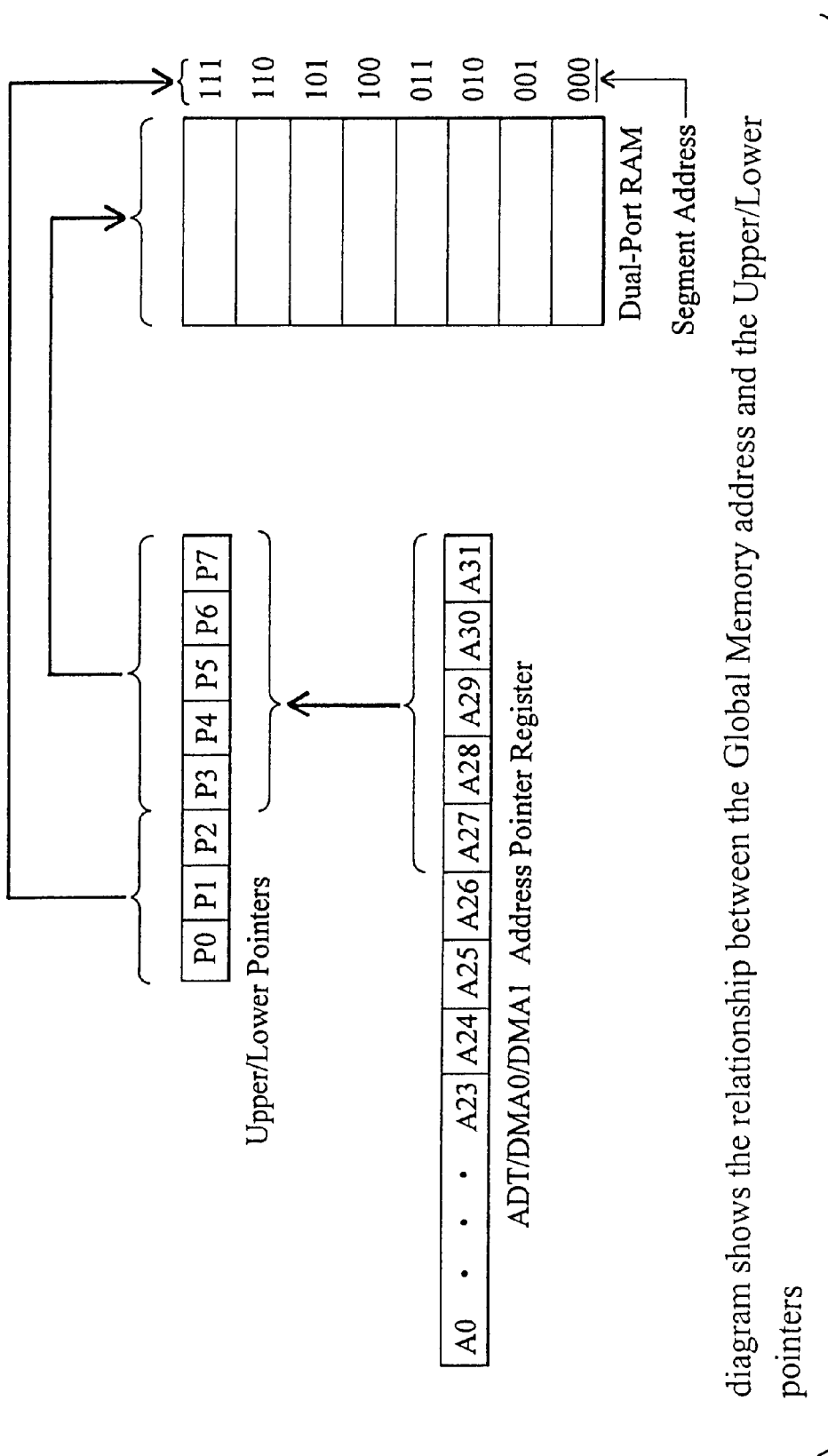
FIG. 9 is a diagram illustrating the relationship of Global Memory addresses and upper and lower pointers for tracking data transfers according to the invention.

One of the responsibilities of the Middle Machine is to manage the backplane address along with the Upper and Lower pointers. As previously indicated, the Dual Port RAM is used to buffer and speed-isolate the Global Memory transfers to and from the on-board systems. This is accomplished through a pointer management algorithm. FIG. 9 illustrates the relationship between the Global Memory address and the pointer addresses. In this illustrative embodiment, the DPR 42 is segmented such that each pipe receives 8 buffers of 256 bytes apiece. This translates into 8 full backplane bursts of 32 Dwords. When a line processor writes an address into the Address Pointer Register, the hardware mirror-writes the lower 5 bits of address into the Status/Upper & Lower Pointers Register. The three most significant bits of the Upper/Lower pointers (P0–P2) are written to '0's. This provides the beginning point in Dual Port memory for a transfer to occur. If the Global Memory address bits A27–A31 are all '0', the transfer is considered to be aligned (since the address lies on a natural 32-Dword Global Memory "page"). If any of the 5 LSBs are nonzero, then the first transfer will be a misaligned transfer. The Middle Machine will automatically determine this, and based on the programmed Maximum Burst Size for the backplane, it will calculate the appropriate beginning burst size to align itself onto a natural Global Memory page. The three MSBs of the pointers are used to move through the 8 Dual Port RAM segments. As a transfer progresses, the addresses are incremented. For transfers longer than 2k, the pointer will wrap.

Figure 10:
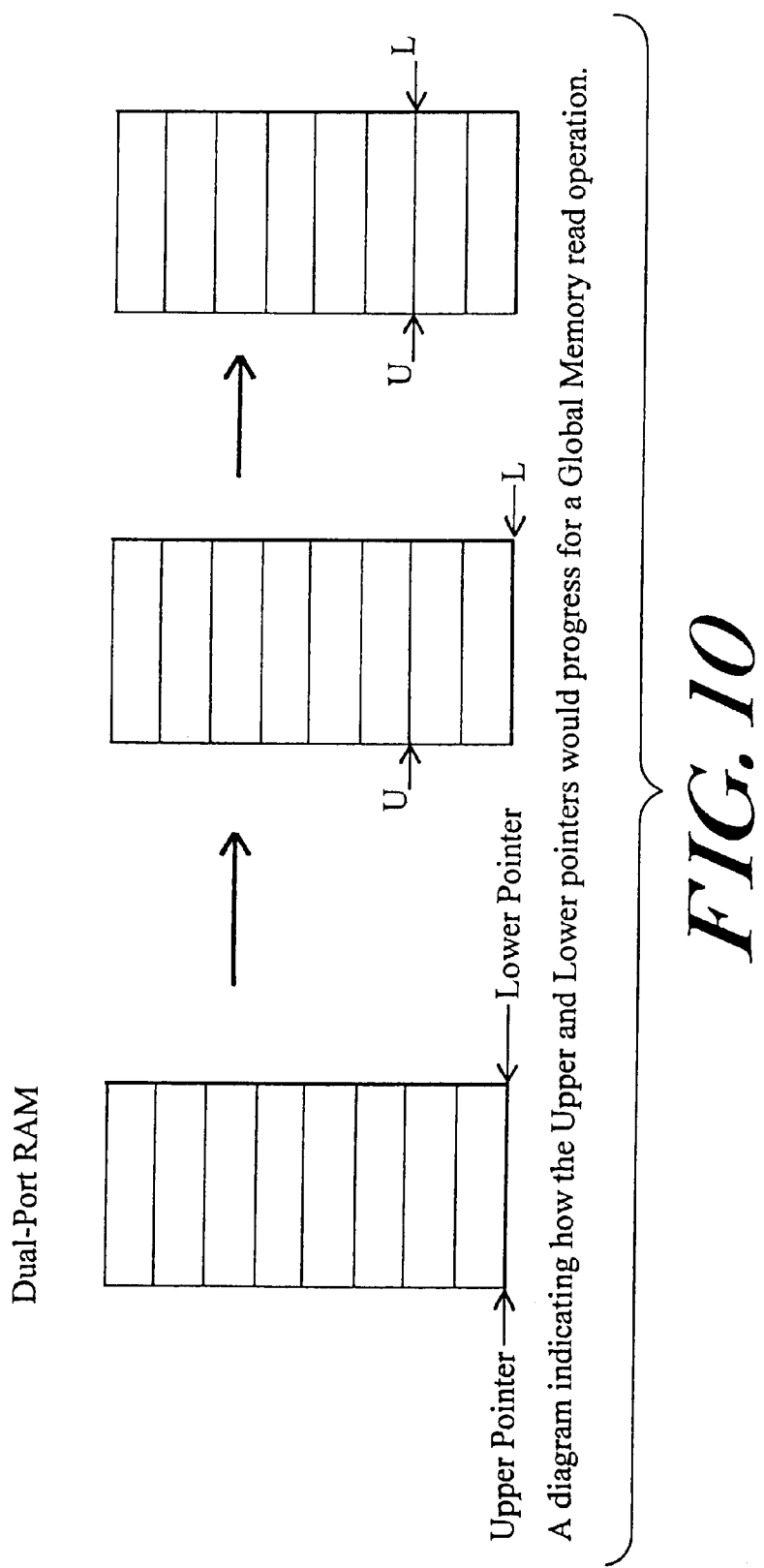
FIG. 10 is a diagram illustrating upper and lower pointer progression in data transfers according to the invention.

Given the possibility of pointer wrapping, there must be some management to prevent data over or under runs. The Middle Machine uses the 3 MSBs of the Upper and Lower pointers to determine whether a transfer should begin or not, thereby preventing data corruption. FIG. 10, illustrates how the pointer management scheme operates. Assume that the Middle Machine has been appropriately programmed to initiate a Global Memory read operation via a DMA pipe. The Upper and Lower pointers begin aligned to the same segment in the DPR. The Middle Machine will not grant any Lower requests yet, since it knows that the data requested is not yet in the DPR. This prevents the assembler/disassembler from retrieving "garbage" data from the DPR. This is depicted in the leftmost part of the diagram of FIG. 10. Once the Upper Machine transfers at least one segment-worth of data into the DPR, then the Middle Machine will allow the Lower Machine to operate. This is shown in the center part of the diagram of FIG. 10. If the Lower pointer "catches up" with the Upper pointer (for example, the Global Memory stalled), then the Middle Machine will again prevent Lower requests from being granted.

Note that the same logic holds true for the Upper pointer. Since a backplane transfer is initiated immediately after a valid Read command is written into the Command Register, it is possible that the 8 segments of the Dual Port RAM may fill before a single word is read from the Lower side. The Middle Machine will pause any transfers on the Upper side until a full segment has been freed by the Lower side.

Write operations work very much the same, except that the "pointer chasing" has turned around, i.e. the Upper pointer lags the Lower pointer.

Note that the Upper and Lower pointers can be written by the CPU into the Status Register. This allows several levels of flexibility. For diagnostic purposes, count miss errors can be induced by forcing the lower 5 bits of the pointers to a value other than the lower 5 bits of the Global Memory address. For on-board memory testing, the CPU can move the Upper pointer to a segment other than that of the Lower pointer, thereby allowing Lower Machine access without initiating backplane transfers. For emulation purposes, it may be useful to manually move the Lower pointer to various places in the DPR. For example, if the address offsets of a table in the DPR were known, they could be used to program the Lower pointer thereby eliminating the need to repeatedly read the memory via an MDR until the data of interest is transferred.

Generally, the middle machine is responsible for arbitration. It is responsible for determination of control. It does that algorithm work to determine whether or not a particular requesting pipe should be granted. It then passes a packet of information to the lower machine for it to do work. The lower machine will do the work but it also has to report back status to the middle machine. The lower machine tells the middle machine whether or not there were errors that occurred during the transfer [determines errors] and reports back the ending pointer. Because the lower machine has to transfer one or more words of data to the DPR it contains the counter which increments the address to the DPR. Therefore, the lower machine sends a packet of information back to the middle machine containing status information. There is another handshake which occurs between the lower machine and the middle machine after the transfer is completed. In that handshake the lower machine indicates that it is done with its transfers and the middle machine will request that information. The lower machine will then transfer a packet of information to the middle machine and then the lower machine is again freed. After the transfer the lower machine is free to do another transfer.

The middle machine is architected to do parallel processing. The middle machine is described hereinafter and illustrated in more detail in FIGS. 8 and 11–15. The middle machine comprises six state machines, in addition to the register file 100. The six state machines are segregated into an upper side and a lower side.

Figure 11:
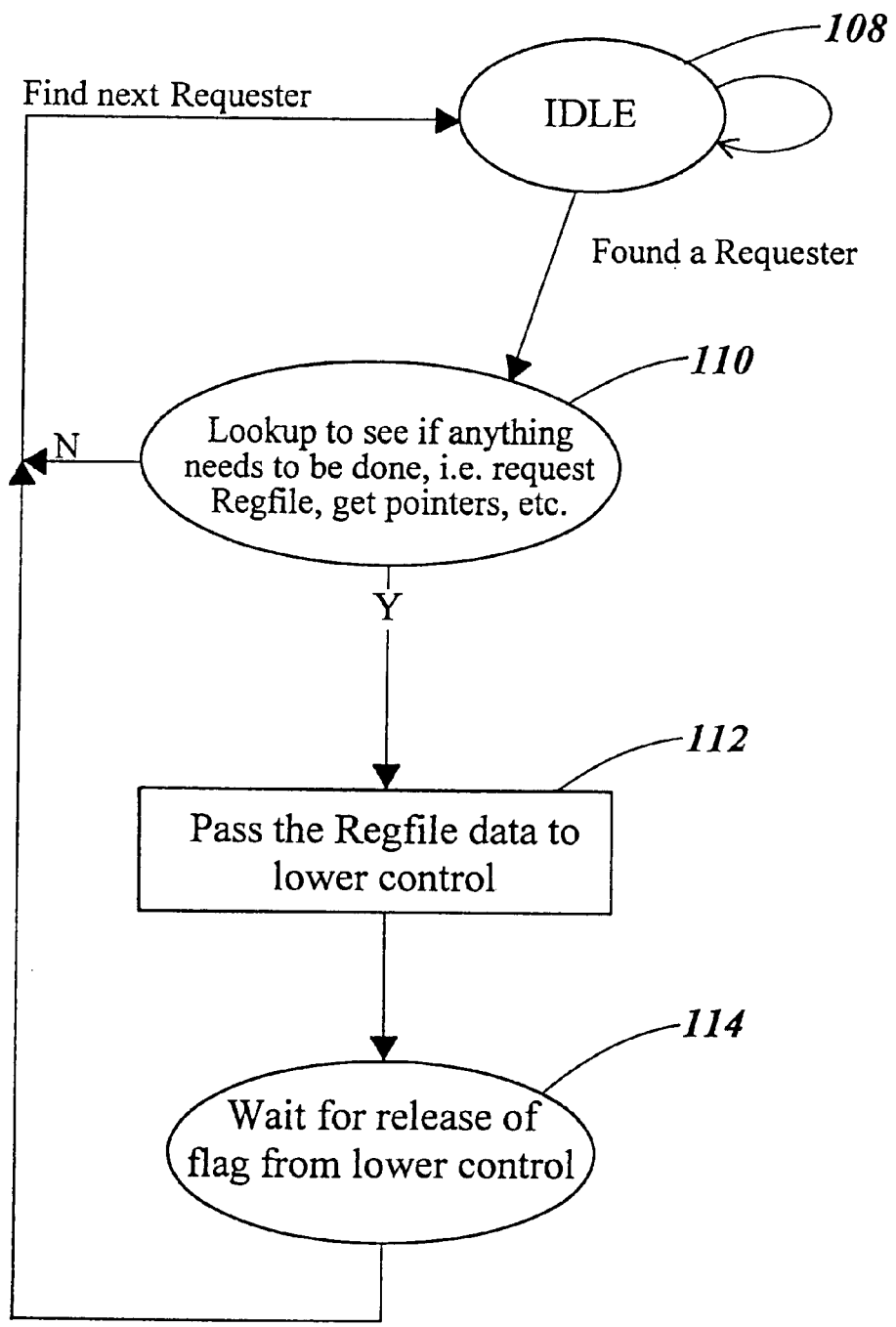
FIG. 11 is a state diagram of a lower arbiter state machine of the middle machine of FIG. 8.
Figure 12:
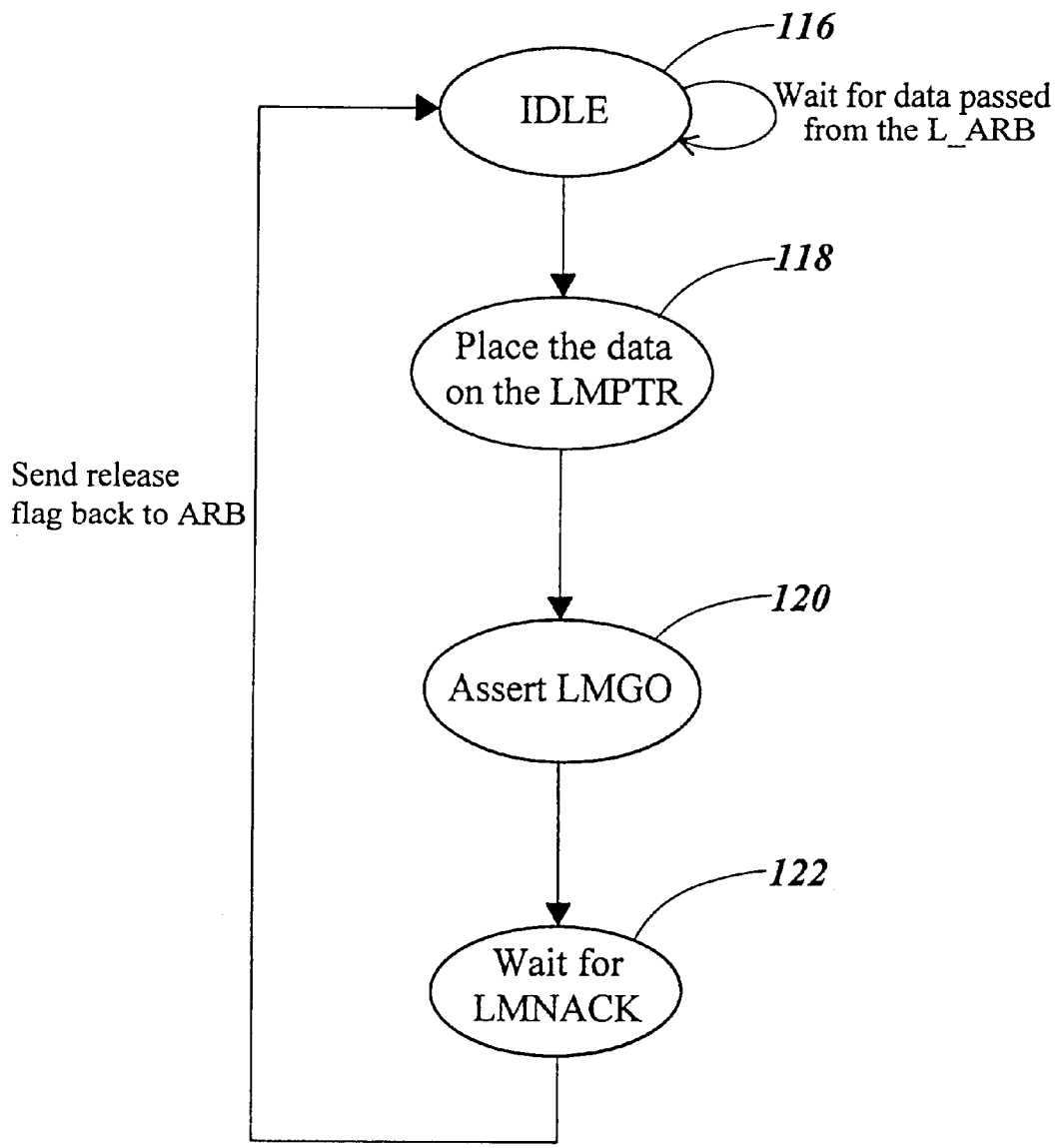
FIG. 12 is a state diagram of a lower control state machine of the middle machine of FIG. 8.

The lower side of the middle machine consists of three different control machines, the lower arbiter 102, the lower control machine 104 and the lower completer 106. They each run simultaneously and somewhat independently. They each maintain indexes into the register file 100. The lower arbiter 102, which is a state machine the functionality of which is illustrated in FIG. 11, initially is in an idle mode 108 and looks for pipes requesting a transfer. It extracts data from the register file 100 of the middle machine and determines whether or not a particular pipe has to transfer 110 from the lower side into DPR. If a transfer is indicated, the lower arbiter 102 passes 112 relevant information from the register file 100 to the lower control machine 104. Thereafter, the lower arbiter 102 waits for a handshake 114 from the lower control, and then returns to the idle mode 108 to look for pipes requesting a transfer 108.

The lower control machine 104 implements the first part of the handshake between the lower machine 46 and the middle machine 48. It waits in an idle state 116 for information from the register file to be passed from the lower arbiter 102. The lower control machine 104 passes a packet of information to the lower machine by putting the information 118 on a lower machine pointer bus (LMPTR), and issuing a signal 120 telling the lower machine to go (LMGO). Then the lower control machine 104 waits 122 for an acknowledge (LMGAC) from the lower machine 46 indicating that the packet of information starting the transfer was received. When lower control machine 104 receives the acknowledge it will pass the packet of information to the lower completer 106, and send a release flag back to the lower arbiter 102.

Figure 13:
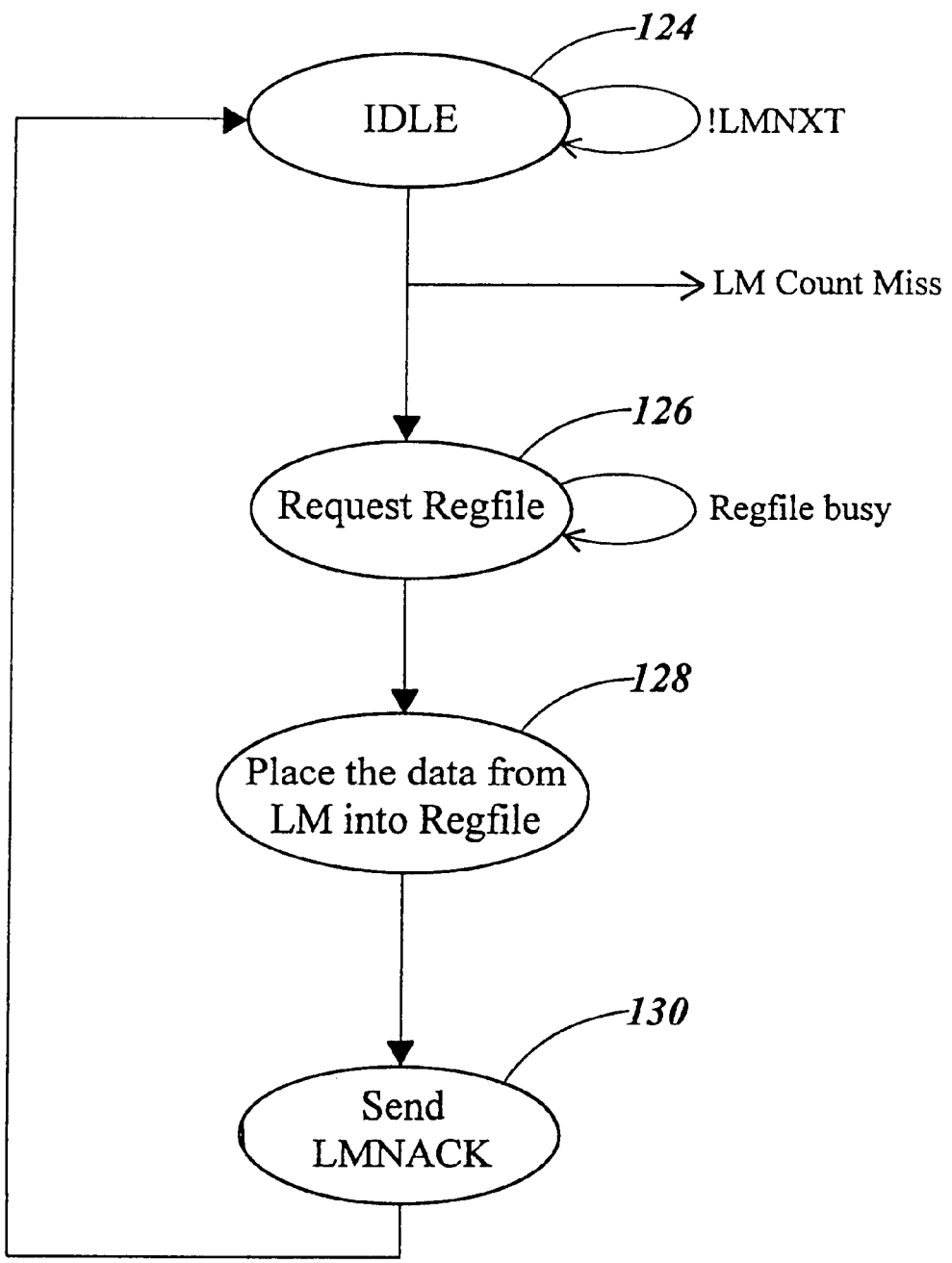
FIG. 13 is a state diagram of a lower completer state machine of the middle machine of FIG. 8.
Figure 14:
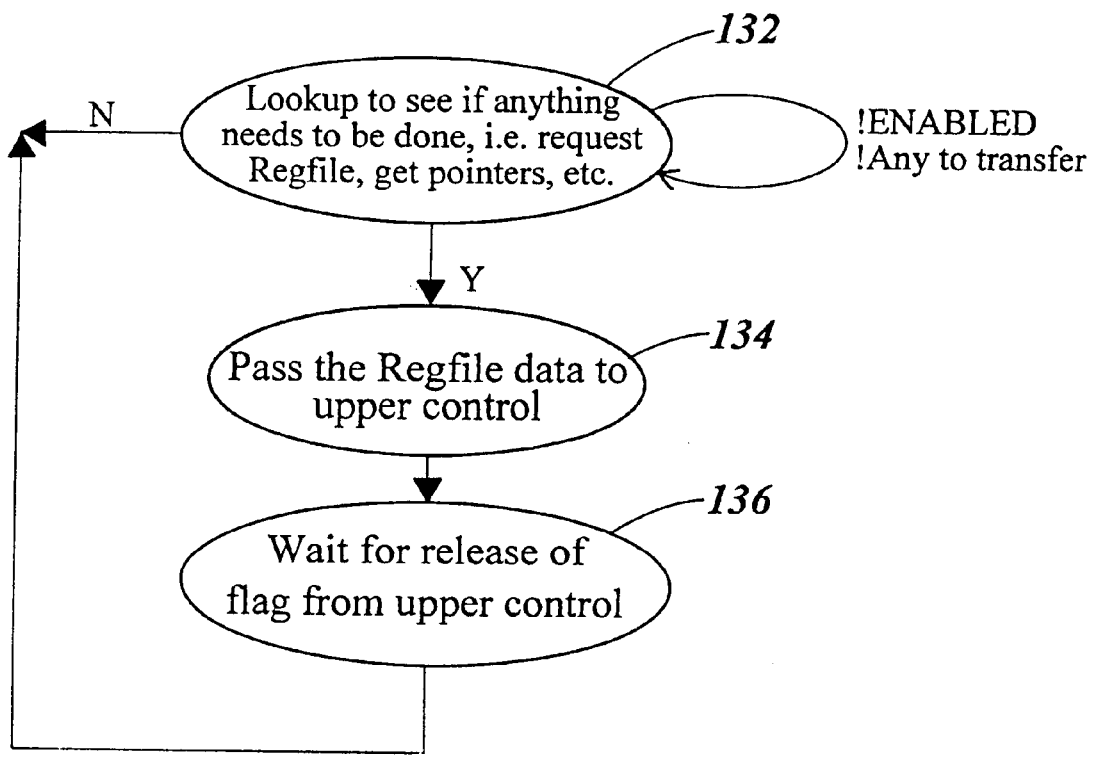
FIG. 14 is a state diagram of an upper arbiter state machine of the middle machine of FIG. 8.

The lower completer 106, the functionality of which is illustrated in FIG. 13, is waiting in an idle state 124 for an indication that the lower control machine has some activity. It receives a signal !LMNXT first from the lower control machine 104 and then a packet from the lower machine 46. The packet from the lower machine is the information regarding the transfer, from the lower machine 46 to be put in the register file 100. The lower completer requests the register file 126 and when it can access it, it puts 128 the information from the lower machine into the register file. Thereafter it issues a next acknowledge signal (LMNACK) 130 to the lower machine to complete the handshaking. The lower completer 106 then returns to the idle state 124.

In the process of accessing register file information, the information is checked to effect operations indicated by the nature of the bits set as described hereinbefore with respect to the register file contents. Upon completion, the packet of information that is transferred between the lower machine and the middle machine contains the status and the pointers. The lower machine reports back to the middle machine requesting pointer information. The lower machine captures parity errors that occurred while the transfer is in progress that would be reported by the EDAC. In the read case the lower machine determines whether there are single or multi-bit errors based on the ECC code. There are protocol errors that can be reported if the lower machine detects something in error on the lower SDIO transfer protocol. The lower machine can abort the transfer and report back status regarding the abort.

The lower completer receives a packet of information back from the lower machine. It is responsible for putting the information back in the register file memory inside the middle machine. Therefore, the lower completer takes the pointer and puts it back into the lower pointer location of the status register. The lower completer will then look at the error bits. If there were errors that were reported by the lower machine the lower completer will set the appropriate error flags in the status register. Depending on the severity of the error it will stop the transfer. If the lower completer has to stop the transfer it will also write to the command register.

Referring to FIGS. 8 and 14–16, the upper side of the middle machine 48 comprises a plurality of state machines including an upper arbiter 108, an upper control machine 110 and an upper completer 112. Rather than looping in an idle state, the upper arbiter, a state machine illustrated in FIG. 14, looks 132 at the command registers of the pipes to determine what actions to take. Part of its function is to walk through command registers of the pipes in the register file 100, continuously looking for commands that have to be executed. The upper arbiter looks at the Internal Enable Channel (IEC) bit 21 and the Enable Channel(EC) bit 31. The upper arbiter is continuously looking through 16 memory locations which contain 16 different command registers looking for those command registers that contain the IEC and the EC bits set. When both of those bits are set that will indicate to the upper arbiter that there is work to do in this pipe.

Another part of the upper arbiter function is looking to make sure that no error bits are set. If the fatal error [FE] bit is set then the upper arbiter ignores that pipe.

When the upper arbiter 108 finds a pipe with the IEC and the EC bits set it will initiate a protocol based on pointer management, described hereinbefore, to determine whether or not this is a pipe which is allowed to be granted. The upper machine does a pointer management function to determine whether or not a transfer can now be made from the DPR to the backplane. The upper machine is looking to see if there is enough data in the DPR to do a complete burst across the backplane without underflowing. An underflow occurs when there is not enough data, e.g., if 32 double words of data were expected but there are only 16 double words of data in the DPR. There is nothing in the protocol to stop the burst so there must be enough data to satisfy the full burst.

The upper arbiter 108 then makes sure that the pointers are such that there will not be an overlap case. It looks to see that the segment addresses for the upper and lower pointer are different. There are 8 segments and they have a binary address 0–8 essentially. The upper arbiter makes sure that the upper and lower pointer have different segment addresses and that the lower pointer is leading by at least one full buffer. As soon as the lower pointer leads the upper pointer by at least one full buffer the protocol tells the upper arbiter that it is clear to write. At that point a packet of information is passed to the upper control machine 110, that tells the upper control machine the pipe number and the command data.

Figure 15:
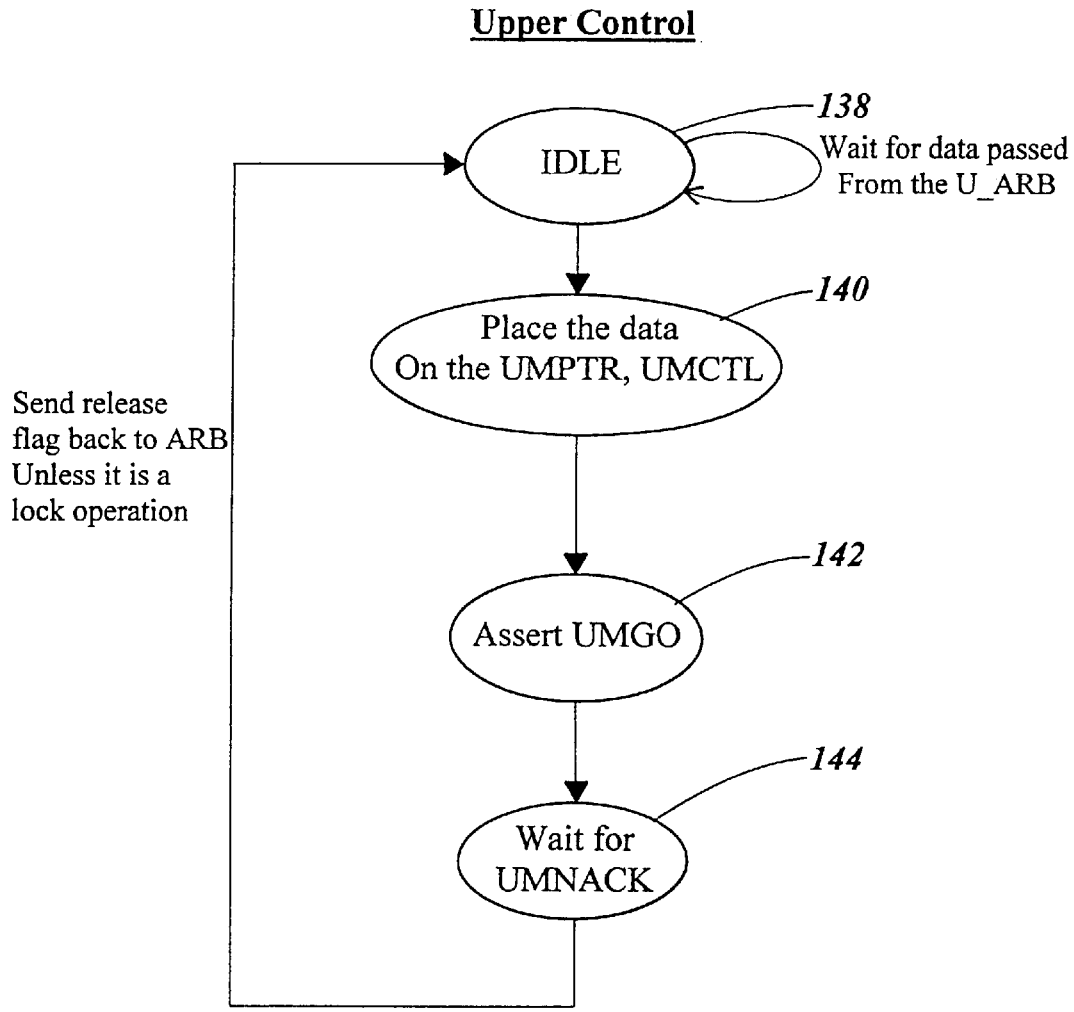
FIG. 15 is a state diagram of an upper control state machine of the middle machine of FIG. 8.
Figure 16:
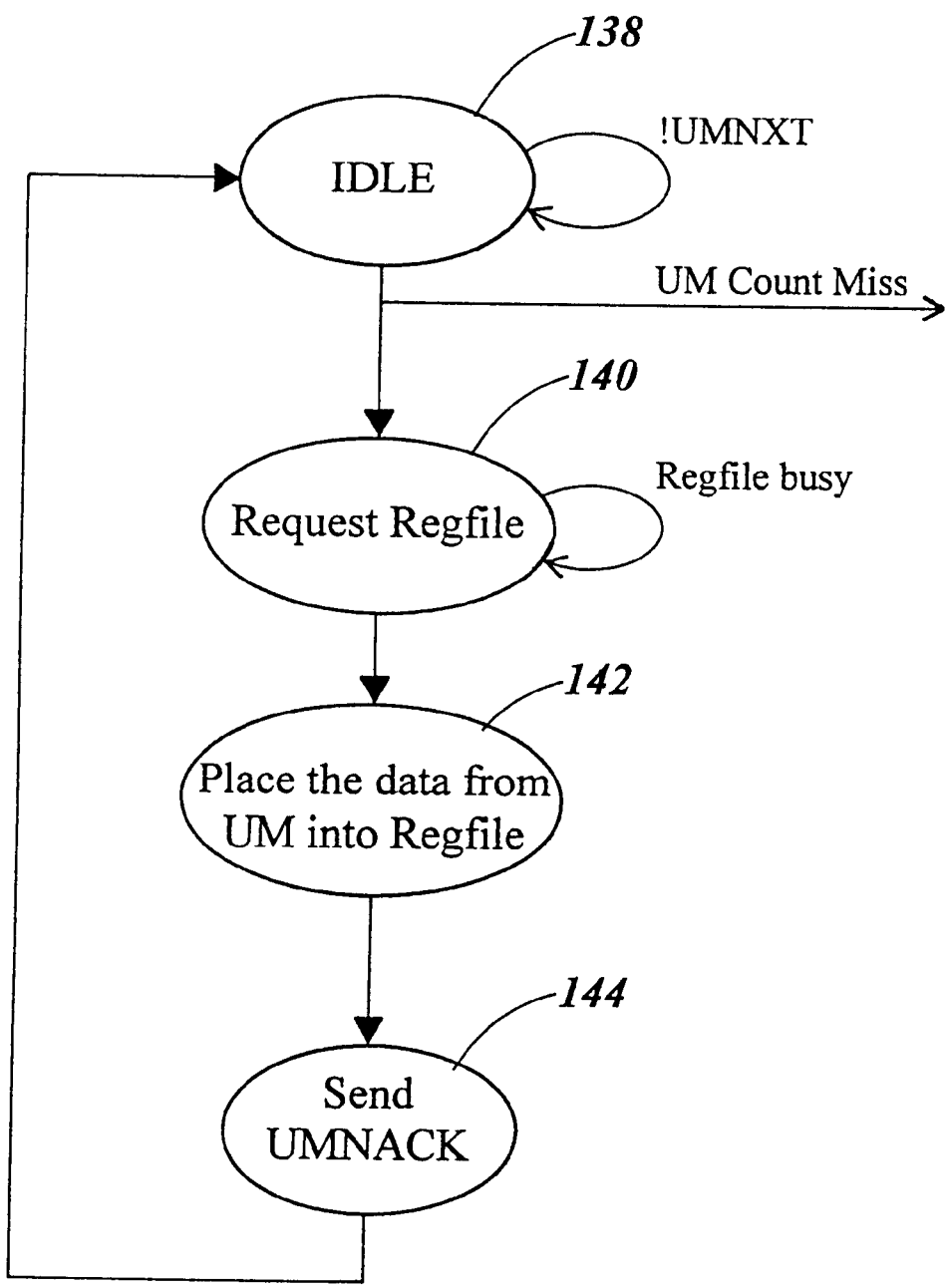
FIG. 16 is a state diagram of an upper completer state machine of the middle machine of FIG. 8.

The upper control machine 110, is a state machine illustrated in FIG. 15 which generally functions like the lower control machine discussed hereinbefore. Initially, it is waiting 138 for the command and pipe information to be passed to it from the upper arbiter 108. When it receives information from the upper arbiter it places 140 the information on a bus to the upper machine 50. Thereafter it asserts 142 a signal UMGO telling the upper machine to go, and then waits 144 for an acknowledge, after which the upper control machine will send a release flag back to the upper arbiter 108.

Additionally, the upper control machine 110 is concerned with global memory alignment. The global memory has a natural alignment of 32 double words. Every 32 double words or chunks of memory is a natural boundary where the lower 5 bits are all zeros. That is, if the lower 5 bits are all zeros in the address register then it is aligned on a natural memory block boundary. because the maximum burst size that goes across the backplane is 32 double words the only way that a full 32 double word burst can be done is if the burst starts at the base on a natural memory boundary. The best utilization of the backplane occurs when as many transfers as possible occur with a full 32 double word burst. Therefore, the upper control machine performs the necessary calculations to ensure that happens.

For example, if a transfer starts misaligned, where the first 5 bits are not zero, the upper control machine 110 will do the necessary math to figure out how to get itself back onto a boundary. It will transfer just enough data to get itself back onto a boundary and from that point on to the end of the transfer it will do full bursts of data, in order to maximize throughput.

The upper control machine 110 also does burst size calculations to tell the upper machine 50 exactly how much data it is going to be bursting. Also, there is a configuration register that is set on a global level in the middle machine that can tell the middle machine how many double words it is allowed to burst. The upper control machine will take that into consideration as well when it does burst size calculations. Once it calculates the burst size, the upper control machine 110 will increment the address pointer by the number of double words that it will tell the upper machine 50 to transfer.

In the data transfer state machine implementation according to the invention, there are two sets of handshakes. There is one that initiates the upper machine 50 transfer and one that terminates with status. As discussed, the upper control machine 110 initiates the upper machine 50 transfer. The upper completer 112, a state machine illustrated in FIG. 16, functions substantially like the lower completer described hereinbefore. Initially, it is waiting in an idle state 138 for an indication that the upper control machine 110 has some activity.

The upper completer 112 receives a signal !UMNXT first from the upper control machine 110 and then a packet from the upper machine 50. The packet from the upper machine is the information regarding the transfer to be put in the register file 100. The upper completer 112 requests 140 the register file 100 and when it can access it, it puts 142 the information from the upper machine into the register file 100. Thereafter it issues a next acknowledge signal (UMNACK) 144 to the upper machine to complete the handshaking. The upper completer 112 then returns to the idle state 138.

In the process of accessing register file information, the information is checked to effect operations indicated by the nature of the bits set as described hereinbefore with respect to the register file contents. Upon completion, the packet of information that is transferred between the upper machine and the middle machine contains the status and the pointers. The upper machine reports back to the middle machine requesting pointer information. The upper machine captures errors that occurred while the transfer is in progress. There are protocol errors that can be reported if the upper machine detects something in error in transfer protocol. The upper machine, like the lower machine, can abort the transfer and report back status regarding the abort.

The upper completer 112 ultimately receives back a packet of information from the upper machine 50 containing error status information and DPR pointer information and it is responsible for putting the information back in the register file memory 100 inside the middle machine 48. Therefore, the upper completer 112 puts the pointer into the pointer location in the status register. The upper completer will then look at the error bits. If there were errors that were reported by the upper machine the upper completer will set the appropriate error flags in the status register. At this point in a write operation there is data on the backplane and it will be transferred to global memory. When the global memory returns status information the upper machine 50 captures that and will send a packet to the upper completer 112.

The lower machine functionality is substantially similar whether you are reading or writing. The upper machine has intelligence built in that if a read from global memory is being done the transfer length register indicates how much to read from global memory. A 2k buffer is transferred on the upper side of the middle machine, thus the upper machine will prefetch and fill that 2k of DPR as soon as the command register is programmed. On a read from global memory the address, the transfer length, and how much memory is available in DPR is known. The upper machine can do a prefetch and fill 8 buffers if it has that much data to transfer. Thus the data is in the DPR and ready for the lower machine to go. As the lower machine starts taking data from the DPR and a buffer becomes available the upper machine will fill it again. Accordingly, the amount of latency is reduced by keeping as much data as is possible in the DPR for read transfers. Similarly, with the state machine configuration described hereinbefore, bandwidth is increased by having these independent simultaneous processing machines. By passing packets of information from machine to machine the previous stage is free to do more work.

For DPR coherency purposes, the Middle Machine uses the FP bit in the Command & Transfer Length Register, along with the Upper and Lower pointers, to determine the current DPR buffer status during a read or write operation. This bit can be used by software to monitor the current status of an operation.

During a read operation, the FP bit will be set by the hardware when the Lower Machine side of the hardware (the CPU side) is faster than the Upper Machine side of the hardware (the Global Memory side). If this bit is set, it indicates that there is no data available to be read (buffer empty), unless this is the last transfer.

As described, basic Global Memory read operations are initiated by the Middle Machine, and begin immediately after the ED and IEC bits are set in the Middle Machine Command Register. In other words, the Middle Machine will automatically begin prefetching data (up to the programmed transfer length) as soon as it is enabled. The data will be placed in the DPR for an ADT or DMA pipe. Initiation of a READ operation requires the following steps.

Write '0000 000h' to the Middle Machine Interrupt Status Register to clear any pending interrupts for this processor.

Write '0000 000h' to the Middle Machine Status Register to clear the ending status of a previous transfer.

Write a valid 32-bit Dword address to the Middle Machine Primary Address Pointer.

Write 'xxxx 0C41h' to the Middle Machine Command Register to initiate a Read Command (where 'xxxx' is the size of data to transfer).

If the transfer length is 2K bytes or less, either wait for an interrupt or poll the Middle Machine Interrupt Status Register until the appropriate interrupt bit is set. If the transfer length is greater than 2K bytes, check the current transfer count in the Middle Machine Command Register to determine if data is available to read.

If an interrupt occurred, write '0000 0000h' to the Middle Machine Interrupt Status Register to clear the pending interrupt for this processor.

Read the Middle Machine Status Register to determine ending status of the data transfer.

During a write operation, the FP bit will be set by the hardware when the Upper Machine side of the hardware is faster than the Lower Machine side. If this bit is set, it indicates that there is not enough data to initiate a Global Memory backplane cycle (buffer empty). "Fullness" can be determined by comparing UP0–UP2 and LP0–LP2 in the Middle Machine Status Register.

Similar to read operations, for write operations the Middle Machine must be programmed with a transfer length and the EC and IEC bits set in the Middle Machine Command Register. However, data movement will not progress until: (a) at least one of the eight buffer segments fills (via the ADT or DMA pipes), or (b) an EOT is encountered. The middle Machine will decrement the transfer counter with each Global Memory transfer, and will automatically stop when the count reaches zero. Furthermore, if an EOT is detected from the ADT or DMA pipe and the transfer count is not zero, the Middle Machine will post an Ending Transfer Count Not Zero error in the Status Register (ETNZ bit). Initiation of a WRITE operation requires the following steps.

Write '0000 000h' to the Middle Machine Interrupt Status Register to clear any pending interrupt for this processor.

Write '0000 0000h' to the Middle Machine Status Register to clear the ending status of a previous transfer.

Write a valid 32-bit Dword address to the Middle Machine Primary Address Pointer.

Write 'xxxx 0C01h' to the Middle Machine command Register to initiate a Write Command (where 'xxxx' is the size of the data to transfer).

Either wait for an interrupt or poll the Middle Machine Interrupt Status Register until the appropriate interrupt bit is set.

Write '0000 0000h' to the Middle Machine Interrupt Status Register to clear the pending interrupt for this processor.

Read the Middle Machine Status Register to determine ending status of the data transfer.

The Middle Machine contains hardware which permits the same data to be written automatically to two separate Global Memory addresses, an operation referred to as a "mirrored write". The hardware will perform two backplane write bursts, the first to the Primary Address and the second immediately following to the Mirror Address. The remainder of the write operations remains the same as described hereinabove. For Mirror Writes to function properly, the Primary and Mirror Addresses must be on the same Global Memory alignment (the lower 5 bits of the Primary and Mirror Addressed must be the same). If not a count miss will occur, To initiate a Mirror WRITE operation, follow these steps:

Write '0000 0000h' to the Middle Machine Interrupt Status Register to clear any pending interrupts for this processor.

Write '0000 0000h' to the Middle Machine Status Register to clear the ending status of a previous transfer.

Write a valid 32-bit Dword address to the Middle Machine Primary Address Pointer.

Write a valid 32-bit Dword address to the Middle Machine Mirror/Copy Address Pointer.

Write 'xxxx 0C81h' to the Middle Machine Command Register to initiate a Mirror Write Command (where 'xxxx' is the size of data to transfer).

Either wait for an interrupt or poll the Middle Machine Interrupt Status Register until the appropriate bit is set.

If polling, wait until the DMC bit or the Middle Machine Status register is set.

Write '0000 000h' to the Middle Machine Interrupt Status Register to clear the pending interrupt for this processor.

Read the Middle Machine Status Register to determine ending status of the data transfer.

The Middle Machine can also be programmed to operate as a true DMA (Direct Memory Access) machine. In this mode, the hardware can perform direct memory transfers from any Global Memory Address to any other Global Memory Address. Given a transfer Length register of 14 bits, the hardware can transfer up to 16k Memory Dwords at a line (128k of data). This function may be useful, for example, to perform block copies of data from one memory region to another or to quickly initialize memory (by copying an initialized block of memory to other regions). As with Mirror Writes, for Copy to function properly, the Primary and Copy addresses must be on the same Global Memory alignment (the lower 5 bits of the Primary and Copy Addresses must be the same). If not, a count miss will occur. To initiate a COPY operation, follow these steps:

Write '0000 0000h' to the Middle Machine Interrupt Status Register to clear any pending interrupts for this processor.

Write '0000 0000h' to the Middle Machine Status Register to clear the ending status of a previous transfer.

Write a valid 32-bit Dword address to the Middle Machine Primary Address Pointer. This becomes the Source (READ) Address.

Write a valid 32-bit Dword address to the Middle Machine Mirror/Copy Address Pointer. This becomes the Destination (WRITE) Address.

Write 'xxxx 0C45h' to the Middle Machine Command Register to initiate a Mirror Write Command (where 'xxxx' is the size of data to copy). It should be noted that the RW bit must be set for Copy to operate correctly.

Write '0000 000h' to the Middle Machine Interrupt Status Register to clear the pending interrupt for this processor.

Read the Middle Machine Status Register to determine ending status of the data transfer.

Referring again to FIG. 8, in addition to the "round robin" arbitration that is effected in the data transfer state machines described hereinbefore, a line processor arbitration mechanism, the CPU arbiter, 146 is provided in the Middle Machine 48. The CPU arbiter 146 interfaces to the lower arbiter 102, and basically arbitrates among the line processors and service processor for access to the data transfer state machines.

A CPU I/O (input/output port) 148 is also configured into the lower side to effect direct processor access to the DPR and/or global memory through the middle machine 48.

Service Processor and Messaging

Referring back to FIG. 3b, the shared resources portion of the ESCON interface according to the invention includes the service processor 70 in addition to the line processors 60. The service processor 70 is a "shared resource" that is responsible for starting the operation(s) of the ESCON interface at the beginning of time when the ESCON interface is first powered on. The service processor 70 prepares the board, loads all the FPGAs, brings up the board, runs diagnostics, and then once it has determined that everything is functional it will turn on the line processors. The service processor is a high end, low power, high performance and low cost processor with the ability to be interfaced into a system, such as a power PC 603E or the like.

The service processor 70 also performs system wide services. When there is a system wide interrupt it is delivered to the service processor 70, which acts upon the interrupt. The service processor 70 determines whether it is appropriate to interrupt the data transfer that is in progress or not.

The service processor 70 has a Small Computer System Interface (SCSI) port. In the case of a power failure the service processor 70 shuts down the ESCON line(s) and then dumps the data to disk.

The service processor 70 is further responsible for consolidating some of the operations from each of the line interfaces/processors 60. If all of the line processors performed all of the accesses to the backplane themselves there would be numerous accesses. The line processors defer and consolidate their actions onto the service processor 70 so that the service processor can do the operation on behalf of the whole card. If two line processors were to access memory it would require twice the bandwidth than if the service processor accessed memory on behalf of them.

Figure 17:
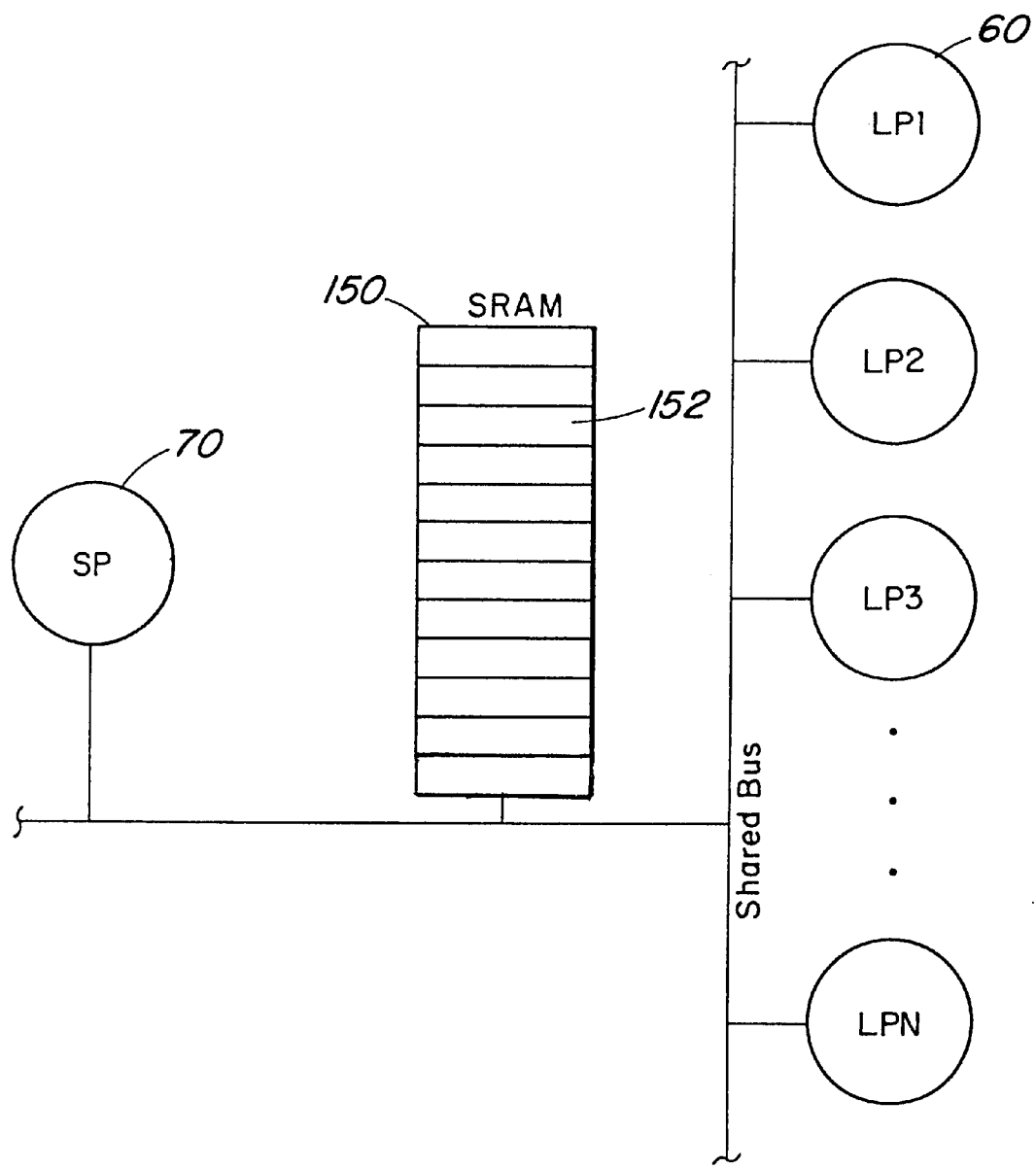
FIG. 17 is a block diagram of a messaging configuration using a service processor as a central point of contract for a plurality of line processors according to the invention.

The service processor 70 provides a central communications point between all the line processors in the rest of the system. A messaging system, as illustrated in FIG. 17, is implemented according to the invention to get the messages from the line processors 60 to the service processor, to tell it the service processor that at least one of the lines has an operation that has to be performed. Similarly, the messaging mechanism is used to return values or give information to the line processors.

The messaging mechanism uses shared, low latency, Static RAM 150 in effect as a mailbox, accessible to the line processors 60 and the service processor 70 over the shared bus. The shared SRAM 150 is divided into "mailboxes" 152, i.e. addresses or address ranges. Some of the addresses are available for reading and writing (inbound and outbound) by the service processor 70 and reading by a respective line processor. Other addresses in the shared SRAM are available for writing by the respective line processor(s) 60 and reading by the service processor 70.

The service processor and all the line processors have access to the shared SRAM 150. There is a secondary mechanism on the power PC, used as line and service processors, in which each line processor has an interrupt, called a system management interrupt. These system management interrupts are used to create a simple messaging arrangement between the service processor 70 and the line processors 60. The mailboxes in memory are effectively reserved for each respective processor, so that the service processor can put a message for a particular line processor into its respective mailbox 152. Once the service processor 70 writes the message in the mailbox 152 it pulls the interrupt line(s) on the applicable line processor(s).

The respective line processor then receives the interrupt, goes to the code for the interrupt vector, which is an instruction to retrieve the message and decode it. The line processor decodes the message and performs the requested operation.

The line processor can then put a result back into another memory location which is reserved for the service processor, and then pull the interrupt to the service processor. The service processor retrieves its message which would be the return codes of whatever operation was performed. This messaging scheme saves the processors the trouble of having to poll the shared memory all the time to see if there is a message in its mailbox location. However, it should be appreciated that mailboxes can be dedicated for writing (inbound) by the line processors 60 and be polled periodically by the service processor 70 (outbound).

A primary function of this messaging system is when the ICDA is loaded with traffic, i.e. requests to memory, the service processor can be basically used as a consolidator to condense the operations. In the illustrative ICDA, when the host makes a request for data the line processor looks to see if it is in global memory or whether it is on the disc. When the line processor is looking to see if it is in global memory it is a very fast operation. There are 2 DMA pipes coming from each line, a high priority and a low priority. The line processor will go down the high priority line to see if the data it is looking for is in global memory. If the data is in global memory then the line processor will perform the data transfer autonomously.

However, if the data is not in global memory then the line processor has a second option depending on how the ICDA is loaded. That is, when one of the line processors gets a request from the host it looks in global memory for the data. If the data requested is not in global memory it may be desirable for the line processor to give the service processor the message to go get the data off the disc while the line processor does other things. Therefore, the line processor sets up an instruction in the service processor's mailbox in shared memory that in effect is a request to go get data from the disc drive. The instruction issued by the requesting line processor to the service processor provides an indication of the data that is requested, and other information that accompanies a data request.

The line processor then sends the service processor an interrupt to alert it to check the shared memory for the message. Meanwhile the line processor is going to go through the operation of disconnecting from the host and preparing for another connection. The line processor might get another connection and start performing other transfers. If the next data that is requested is not in global memory then the line processor may again defer to the service processor as described, via the messaging mechanism. All of the line processors are doing this so there will be a list of requests which the service processor will consolidate.

The software running on the service processor can be configured to determine how best to consolidate the requests. If some of the requests are for data that has contiguous locations, or is from the same disc card or is just closer to other data being retrieved the service processor can determine the best order to process the requests to optimize system performance.

The messaging scheme can be implemented to give priority to desired operations to enhance overall system performance. A pure data request coming from the host machine would have the ultimate priority to enhance throughput. That data would be delivered immediately to the global memory. The secondary priority could be given to the service processor to perform its interfaces with the global memory because the service processor transfers are performed on behalf of the four processors. Last on the priority list would be each of the line processors going to disc for information directly, because it would only compromise the performance on one line for a brief period of time.

If the line processor has not performed an operation in a long time, set by a software timer, and it appears that the ICDA is lightly loaded, the line processor can decide that it is going to handle the operation itself even though the data is not in global memory. The line processor does not defer to the service processor because that would just add additional delay. Because the line processor was not busy it would not save time to consolidate the operation to the service processor. A Boolean flag can be set in the software telling the line processor to just do everything itself, and it will use the low priority line to go to the memory. Under the low priority request into the global memory if there is a higher priority request the line processor will have to wait.

The Global Memory in the referenced ICDA includes a lock feature to facilitate read and write operations. It is designed to prevent the overwriting of data by more than one line interface accessing global memory at the same time. When a lock is asserted on one of the ports, the memory board will not allow access through the other ports until the lock condition is cleared again.

In order to put these requests into a queue it is necessary to lock the global memory while the queue and the pointer that points to the end of the queue are updated. Because the memory is a shared resource at that point it must be locked to prevent an overwrite of data. The service processor can lock the memory, write all of the requests and then unlock the memory. It is a shorter operation then if each one of the line processors locked the memory and wrote the data, because there is an overhead associated with each operation of locking and unlocking. If the service processor can perform the transfer on behalf of all the line processors it is quicker than each operation individually. If the service processor delivers several requests at one time it can burst the data into memory.

As described, when a selected threshold of activity is reached in the ICDA the service processor invokes the messaging system at a point that efficiency is gained by consolidating. Additionally, the messaging mechanism also gets invoked for other things as well, for instance to display anything on a console connected to the central point of communication, i.e. service processor. The service processor is the only one that is attached to the outside world so it is the only one that is attached to the terminal. If a line processor for instance detects a fault or an error the only way it can report that to the world is to tell the service processor to display it on the console.

The line processor with the error to display passes a message to the service processor that requests the display and indicates the message for the console. The service processor will display it on the console, while sending the message to other shared resources for data logging.

Although the processors described herein are power PC's (MPC603E-66/100) one skilled in the art would appreciate that other processors such as Intel Pentium, Motorola or other processors could be used.

Although the adapter architecture is described herein as receiving data from a host with ESCON I/O, it will be appreciated the architecture could be implemented generally in a SCSI or parallel channel adapter, or the like.

Although the enhanced parity is described herein with respect to FIFO integrity in the context of a data transfer pipeline in an ESCON interface for an ICDA, it will be appreciated by one skilled in the art that it could be applicable other contexts as well.

Although the messaging mechanism described herein is implemented with respect to an ESCON adapter it willed be appreciated that it could be implemented in other systems, such as on an SCSI or fiber channel adapter.

Although the lower, middle and upper machines described herein are implemented in a FPGA (field programmable gate array) it willed be appreciated that other programmable devices, large scale integrated circuits and/or application specific integrated circuits could be used to implement the functionality described herein.

Similarly, while the functionality described herein in the various components is described as implemented primarily in hardware, it will be appreciated that such functionality can be implemented as well in software modules, as any of various hardware implementations as described above, and/or as combinations of hardware, software and firmware.

Although the invention has been shown and described with respect to exemplary embodiments thereof, various other changes, omissions and additions in the form and detail thereof may be made therein without departing from the spirit and scope of the invention.

What is claimed is:

1. A mechanism for use in a pipeline of a host-storage system interface to global memory, said mechanism processing information as data and control information, said mechanism comprising:

a data assembler/disassembler;

at least one protocol engine receiving information going to said global memory and stripping control information from said information, said protocol engine receiving data from said global memory and adding control information thereto;

first data FIFOs receiving data from said protocol engine and transferring said data on a write operation to said global memory;

second data FIFOs receiving data on a read operation from global memory and transferring said data to said protocol engine;

an enhanced parity mechanism operable to generate a pseudo-random number for said data element such that parity accompanying data transferred from said first data FIFO is exclusive-ORed with LFSR (Linear Feedback Shift Register) data generated by enhanced parity circuitry in said assembler/disassembler to effectively check parity for the data; and at least one dual port RAM receiving said control information from said protocol engine on a write operation to said global memory.

2. The mechanism of claim 1, further comprising registers operable to provide a pathway for a respective line processor for accessing a selected data string, and enabling the processor to access the global memory.

3. The mechanism of claim 1, further comprising a counter mechanism that counts and controls the amount of data that is read into and out of the FIFOs.

4. The mechanism of claim 3 wherein when the data transfer starts, a respective line processor is selectively operable to set said counter mechanism to a quantity of data to be transferred to and from memory in and out of the FIFOs, said counter mechanism facilitating the data transfer permitting the entire data transfer to effectively run independent of said respective line processor.

5. The mechanism of claim 4 wherein when the counter mechanism reaches a predetermined transfer count, associated pipeline hardware is enabled to flush the data to memory and initiate end of transfer checks.

6. The mechanism of claim 5, wherein when the predetermined transfer count is reached on a write to global memory, the assembler/disassembler passes a burst of data along the pipeline.

* * * * *